US006012048A

United States Patent [19]

Gustin et al.

[11] Patent Number: 6,012,048

[45] Date of Patent: Jan. 4, 2000

[54] AUTOMATED BANKING SYSTEM FOR DISPENSING MONEY ORDERS, WIRE TRANSFER AND BILL PAYMENT

[75] Inventors: Robin Haley Gustin, Chicago; Troy W. Livingston, Northbrook; Namsoo Park, Schaumburg, all of Ill.

[73] Assignee: Capital Security Systems, Inc., Chicago, Ill.

[21] Appl. No.: 08/866,140

[22] Filed: May 30, 1997

[51] Int. Cl.[7] ...................................................... G06F 17/60

[52] U.S. Cl. .......................... 705/39; 109/24.1; 235/379; 705/43; 705/44

[58] Field of Search ................................. 705/30, 33, 34, 705/35, 39, 40, 41, 42, 43, 45; 235/379, 380; 382/112, 119, 135, 137, 138, 139, 140; 109/24.1; 194/206; 379/93.12

[56] References Cited

U.S. PATENT DOCUMENTS

| | | | |
|---|---|---|---|
| 3,648,020 | 3/1972 | Tateisi et al. | 705/43 |
| 3,943,335 | 3/1976 | Kinker et al. | 235/379 |
| 4,023,013 | 5/1977 | Kinker | 235/379 |
| 4,085,687 | 4/1978 | Beck et al. | 109/24.1 |
| 4,134,537 | 1/1979 | Glaser et al. | 235/379 |
| 4,179,723 | 12/1979 | Spencer | 361/687 |
| 4,430,562 | 2/1984 | Lundblad | 235/379 |
| 4,434,359 | 2/1984 | Watanabe | 235/379 |
| 4,497,261 | 2/1985 | Ferris et al. | 109/2 |
| 4,516,015 | 5/1985 | Uchida et al. | 235/379 |
| 4,585,928 | 4/1986 | Watanabe | 235/379 |
| 4,600,828 | 7/1986 | Nogami et al. | 235/379 |
| 4,617,457 | 10/1986 | Granzow et al. | 235/379 |
| 4,628,532 | 12/1986 | Stone et al. | 382/197 |
| 4,634,845 | 1/1987 | Hale et al. | 235/380 |
| 4,649,832 | 3/1987 | Hain et al. | 109/24.1 |
| 4,680,728 | 7/1987 | Davis, II et al. | 345/141 |
| 4,689,478 | 8/1987 | Hale et al. | 235/380 |
| 4,701,747 | 10/1987 | Isherwood et al. | 341/24 |
| 4,719,338 | 1/1988 | Avery et al. | 235/380 |
| 4,729,128 | 3/1988 | Grimes et al. | 382/116 |
| 4,733,765 | 3/1988 | Watanabe | 194/206 |
| 4,743,743 | 5/1988 | Fukatsu | 235/379 |

(List continued on next page.)

OTHER PUBLICATIONS

"Once–Reserved Fed Leads the Charge for Change", *Checks and Checking, Bank Technology News*, pp. 14–15, Apr. 1996.

R. Weatherington, "EBT Exploding, But Savings May be Myth," *Checklist*, pp. 12, 14, 16, Winter 1996.

M. Robertson, "Stem the Tide of Internal Theft," *Checklist*, pp. 24, 26, Spring 1996.

H. Shyne, "ATM Surcharges Target of Controlling Acts, " *Checklist*, p. 32, Summer 1996.

"New ATM Fees Have Spread Fast," *Money*, p. 56, Dec. 1996.

J. Schmeltzer, "Currency Exchanges Move Into New Territory," Sec. 5, *Chicago Tribune,* Dec.15, 1996.

"More ATMs Levy Fees on Customers From Other Banks," *Wall Street Journal*, Section B, p. 11B, Oct. 4, 1996.

Iversen, W.R., "How ATMs Fit Into An On–Line World", *Financial Service On–Line,* p. 39–48, Sep./Oct. 1996.

*Primary Examiner*—Stephen R. Tkacs

*Attorney, Agent, or Firm*—Fletcher, Even, Tabin & Flannery

[57] ABSTRACT

An automated banking system for wire transfer of funds is provided with a machine where the user has a card to identify the user as being qualified to use the banking system. The user must know and be provided with the transferee's bank number and the transferee's account number. Preferably, the user knows the routing number and the user inputs the routing number at the machine which is preferably an ATM machine that accepts and dispenses cash. The user may pay for the wire transfer at the machine by cash, a credit card, debit card, smart card or a withdrawal from the user's account. The machine has card readers and means for writing down on a card the amount paid therefrom for this wire transaction. The user is assured by the verification that the wire transfer is to the proper receiving account.

19 Claims, 61 Drawing Sheets

U.S. PATENT DOCUMENTS

| | | | |
|---|---|---|---|
| 4,754,126 | 6/1988 | Caldwell | 235/379 |
| 4,926,173 | 5/1990 | Frielink | 341/22 |
| 4,936,564 | 6/1990 | Hain | 271/3.19 |
| 4,989,520 | 2/1991 | Hain | 109/24.1 |
| 4,997,176 | 3/1991 | Hain | 271/180 |
| 5,013,896 | 5/1991 | Ono et al. | 235/381 |
| 5,018,720 | 5/1991 | Whittaker | 271/272 |
| 5,099,423 | 3/1992 | Graef et al. | 705/30 |
| 5,136,144 | 8/1992 | Swinton et al. | 235/379 |
| 5,233,547 | 8/1993 | Kapp et al. | 364/705.02 |
| 5,238,143 | 8/1993 | Crighton | 221/7 |
| 5,271,613 | 12/1993 | Hain | 271/3.12 |
| 5,297,030 | 3/1994 | Vassigh et al. | 705/25 |
| 5,335,484 | 8/1994 | Hain | 53/582 |
| 5,386,104 | 1/1995 | Sime | 235/379 |
| 5,389,773 | 2/1995 | Coutts et al. | 705/43 |
| 5,408,417 | 4/1995 | Wilder | 705/5 |
| 5,412,189 | 5/1995 | Cragun | 235/379 |
| 5,428,684 | 6/1995 | Akiyama et al. | 380/25 |
| 5,459,957 | 10/1995 | Winer | 42/70.11 |
| 5,465,206 | 11/1995 | Hilt et al. | 705/40 |
| 5,546,523 | 8/1996 | Gatto | 345/352 |
| 5,650,604 | 7/1997 | Marcous et al. | 235/379 |
| 5,686,713 | 11/1997 | Rivera | 235/380 |
| 5,751,842 | 5/1998 | Riach et al. | 382/137 |

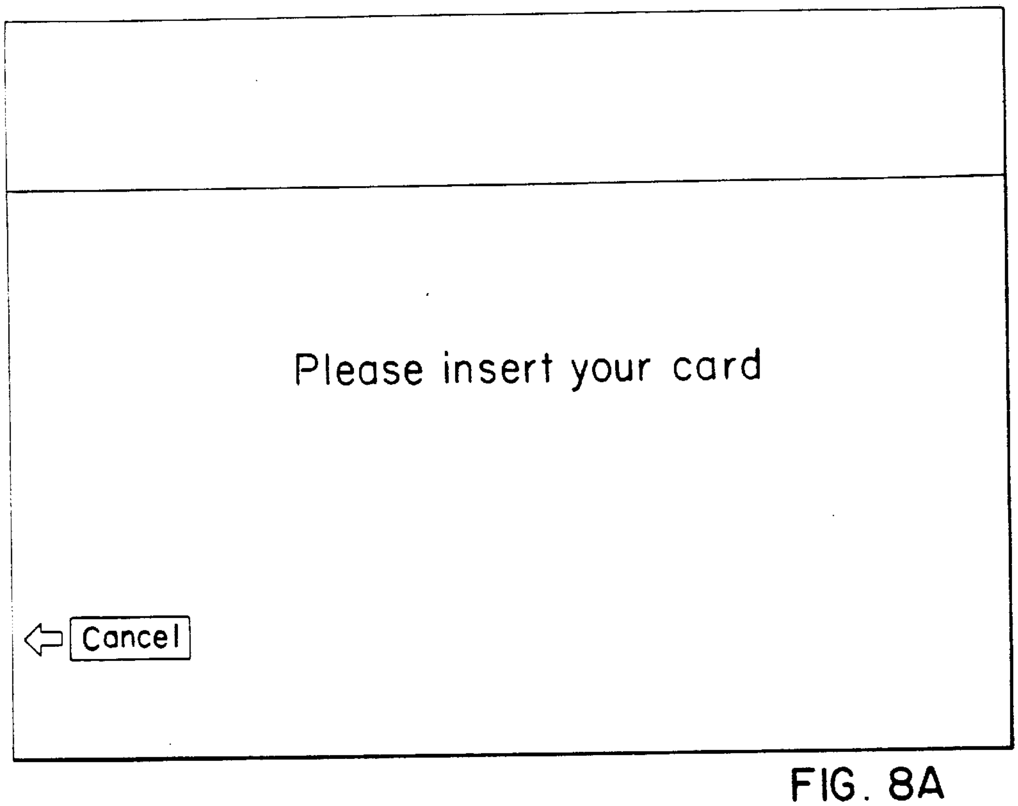
FIG. 8A
FIG. 8B
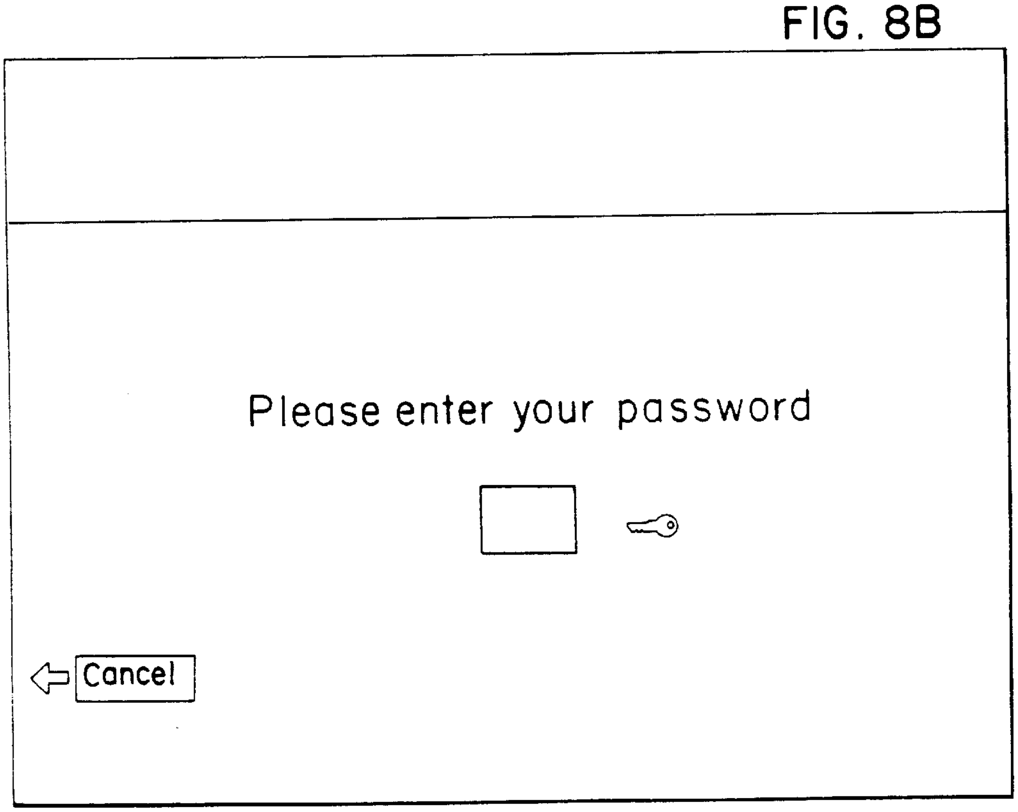

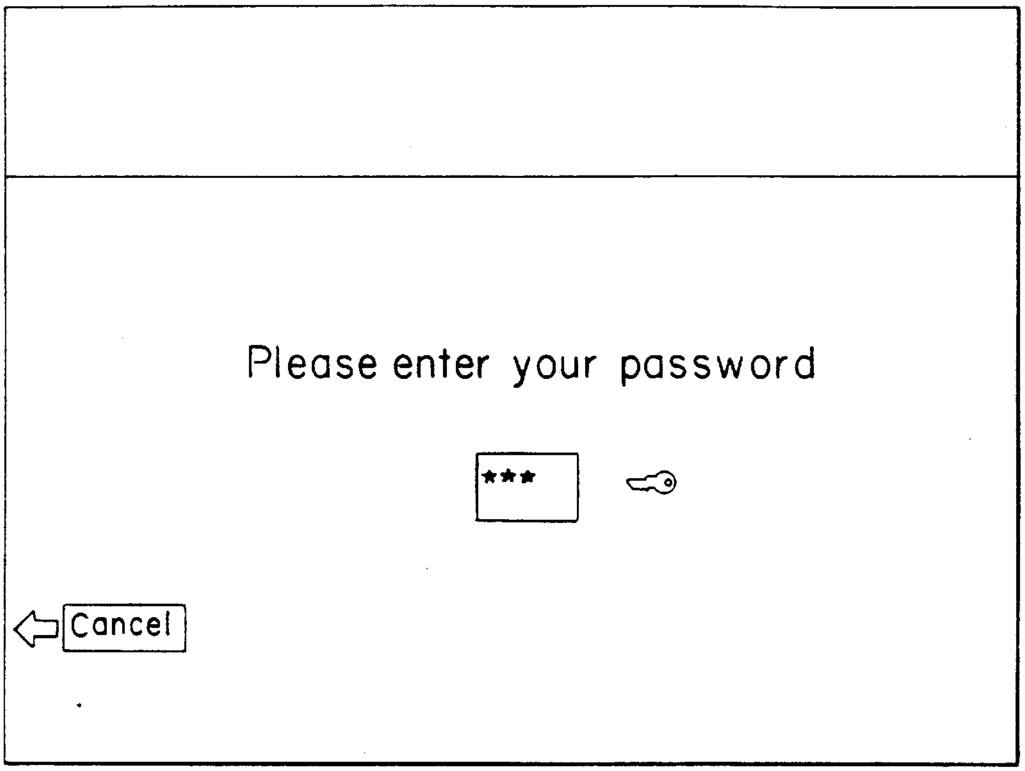
FIG. 8C
FIG. 8D
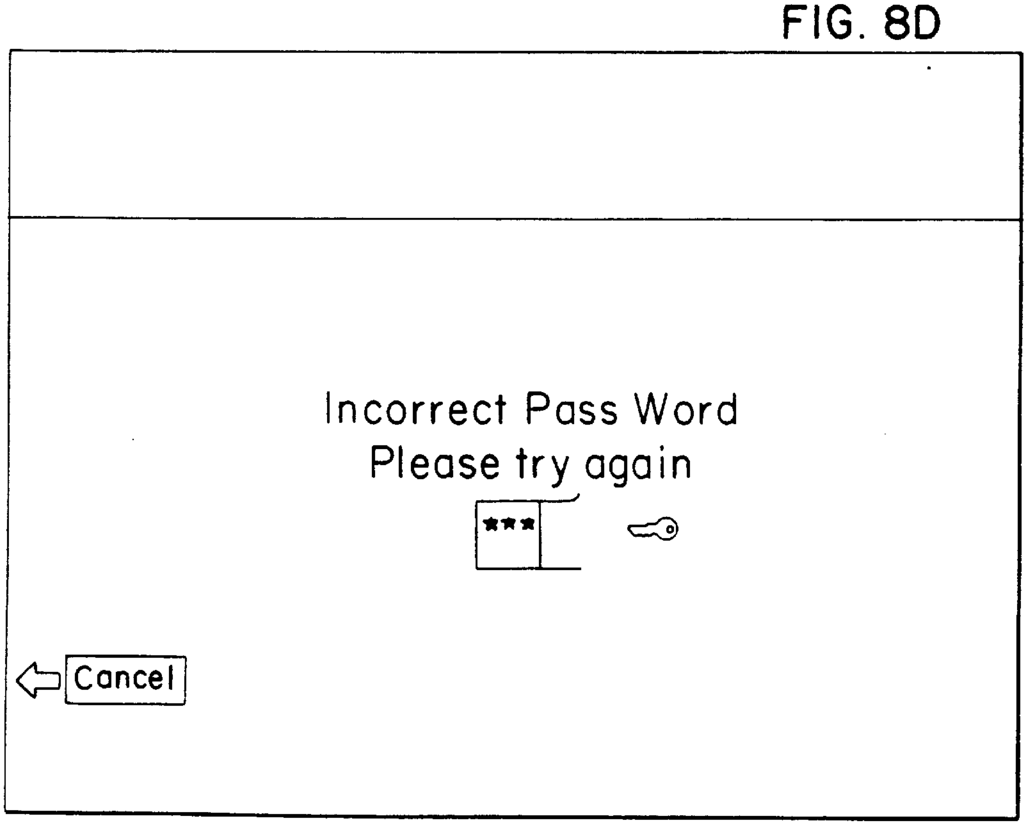

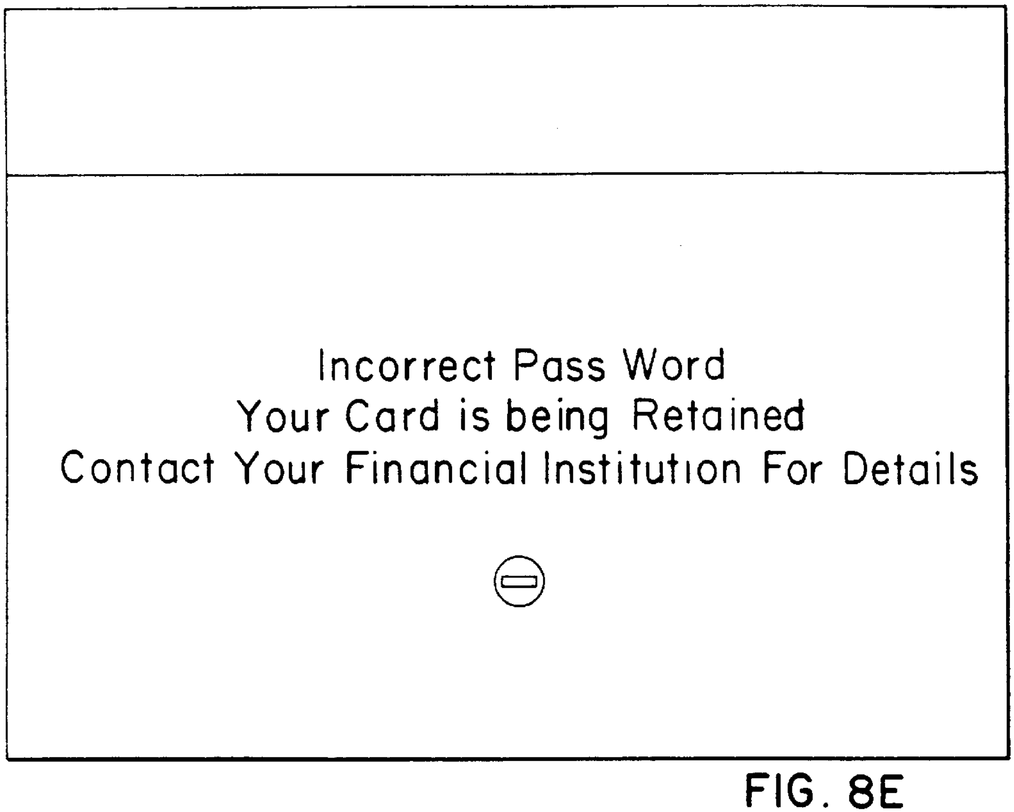
FIG. 8E
FIG. 8F
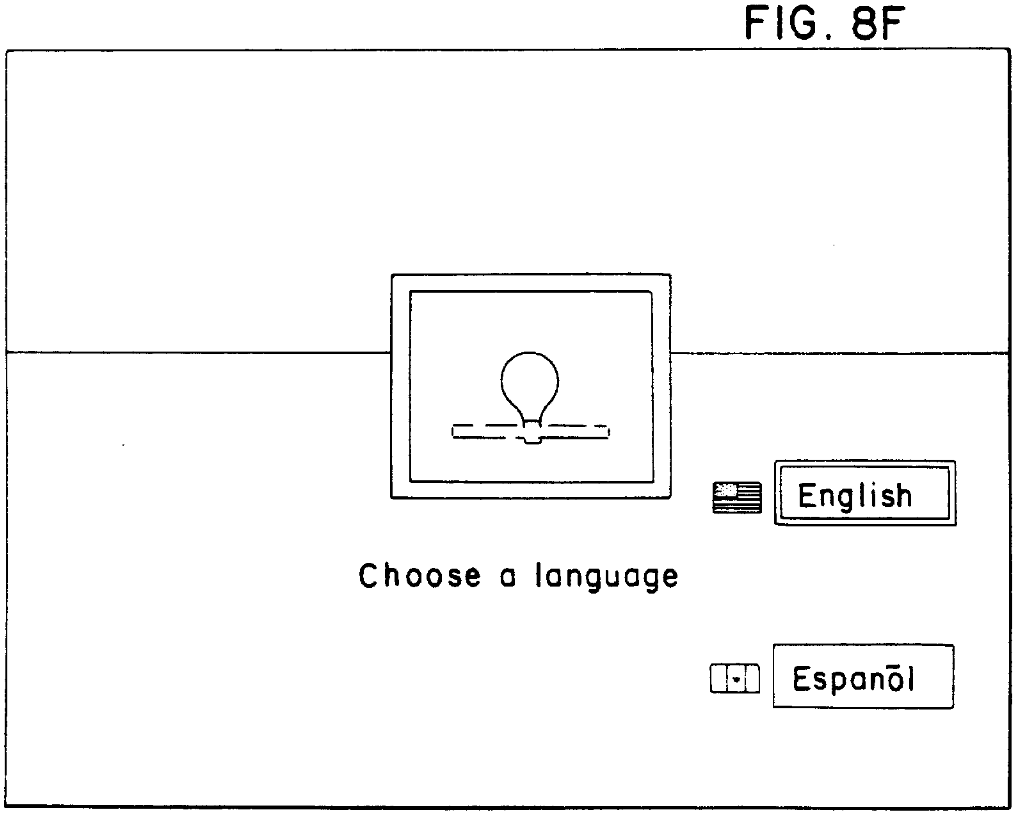

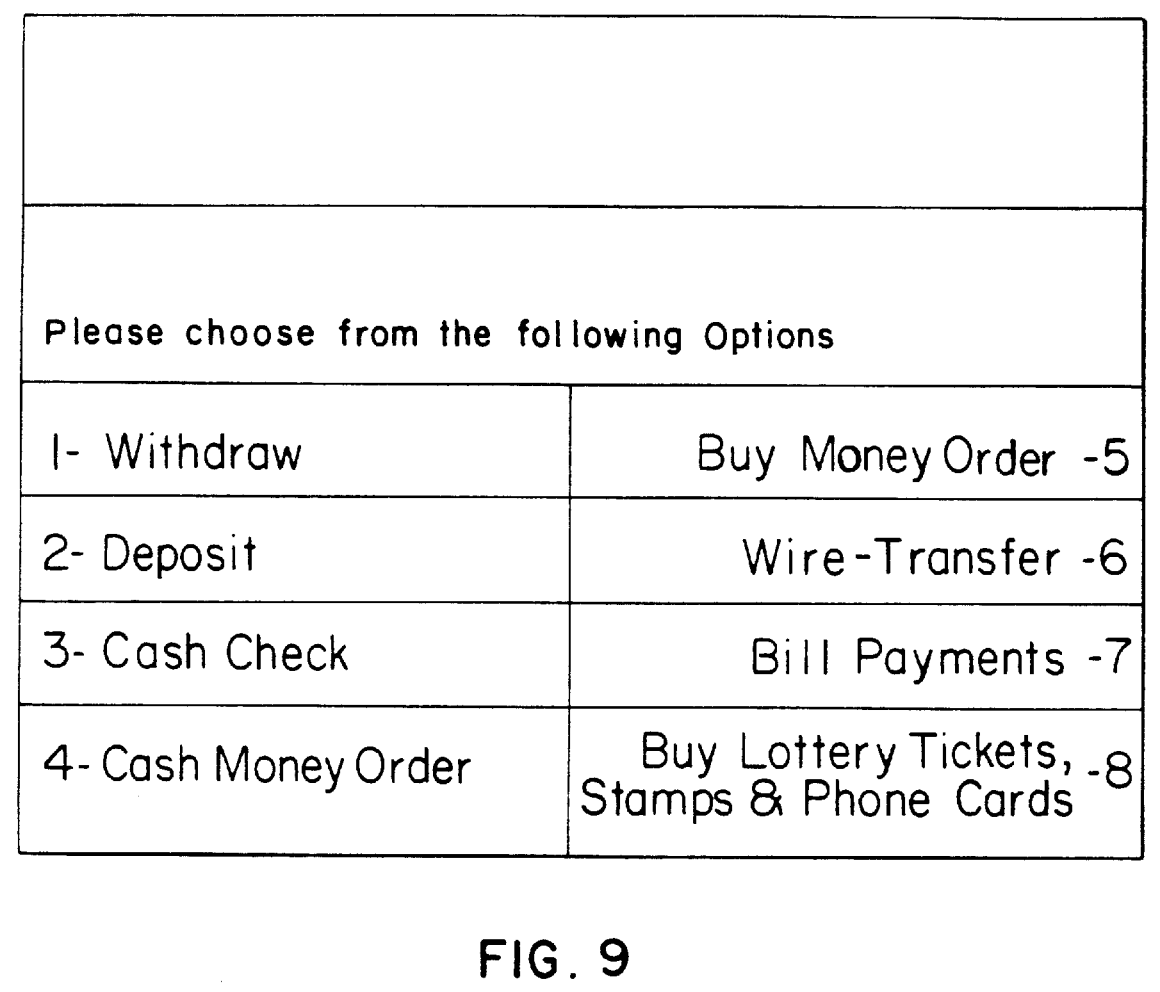

Please choose from the following Options

| | |
|---|---|
| 1- Withdraw | Buy Money Order -5 |
| 2- Deposit | Wire-Transfer -6 |
| 3- Cash Check | Bill Payments -7 |
| 4- Cash Money Order | Buy Lottery Tickets, Stamps & Phone Cards -8 |

FIG. 9

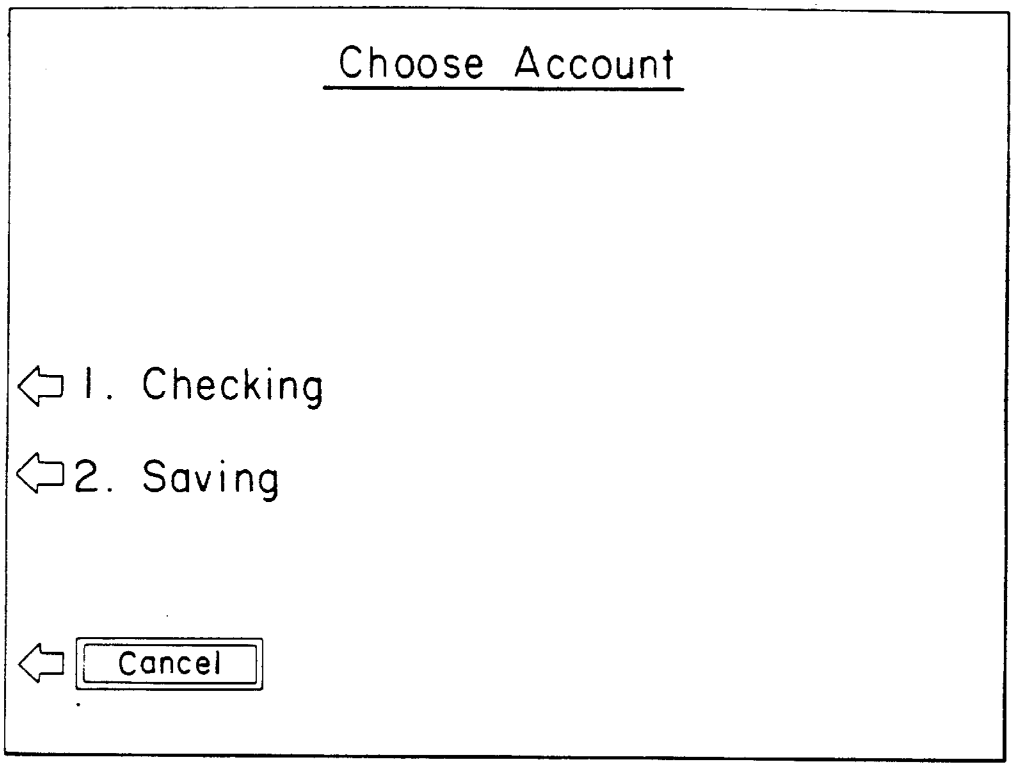
FIG. 10
FIG. 11
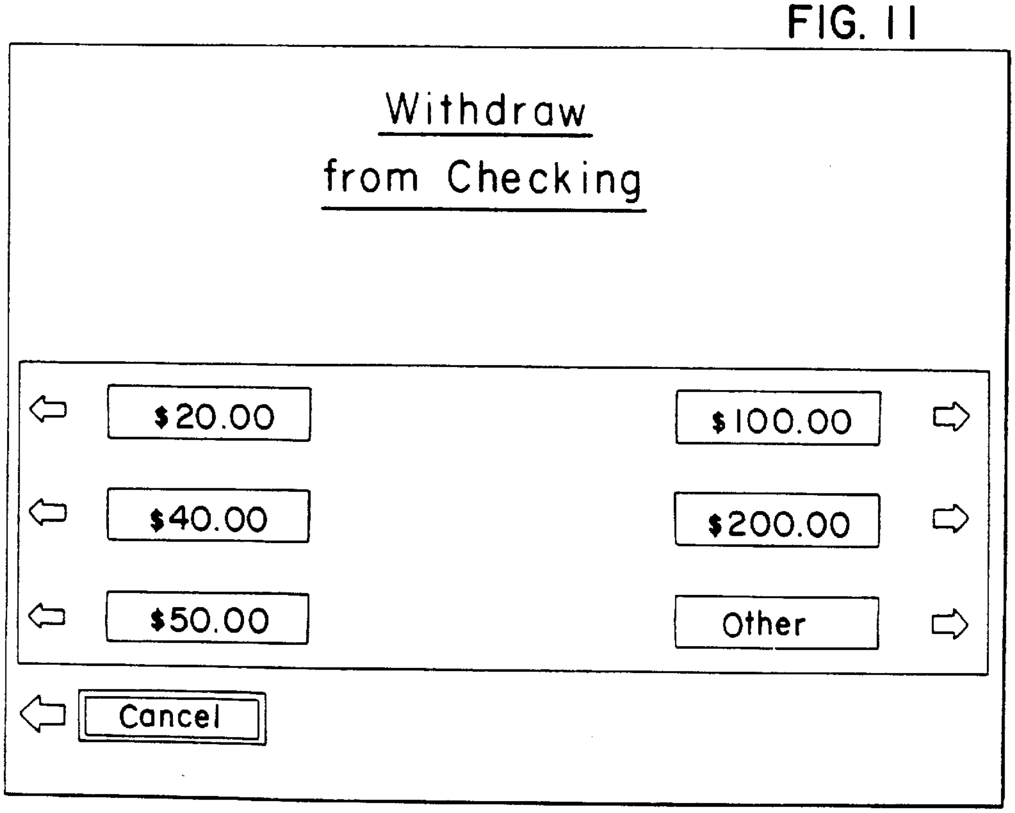

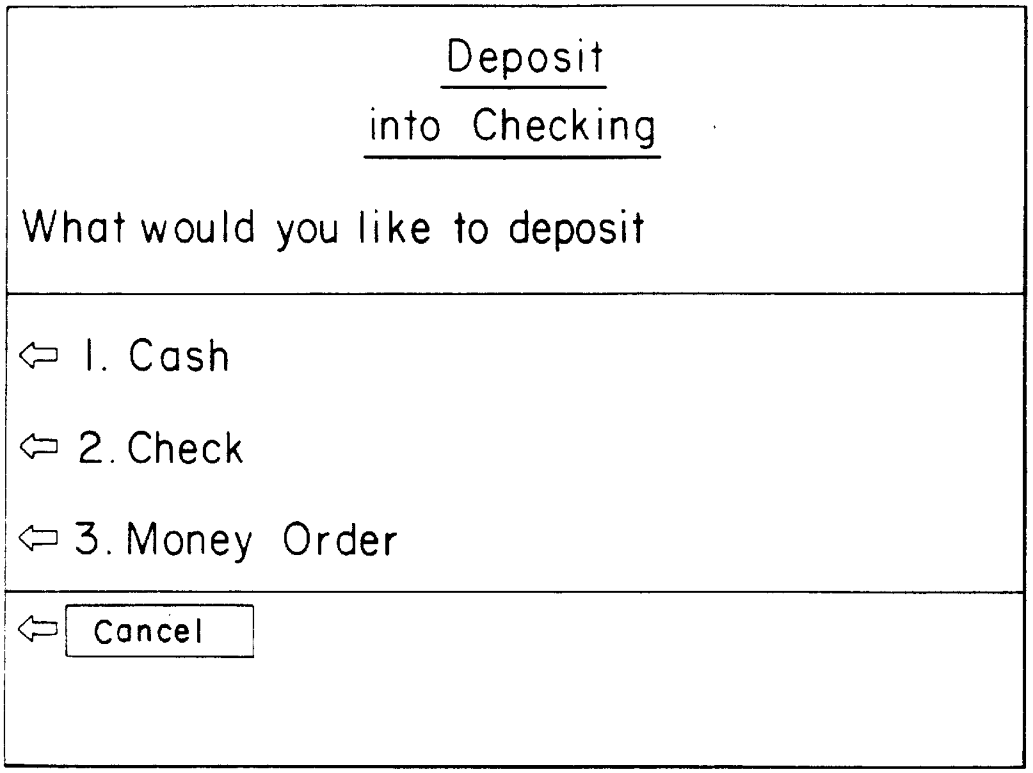
FIG. 13A
FIG. 13B
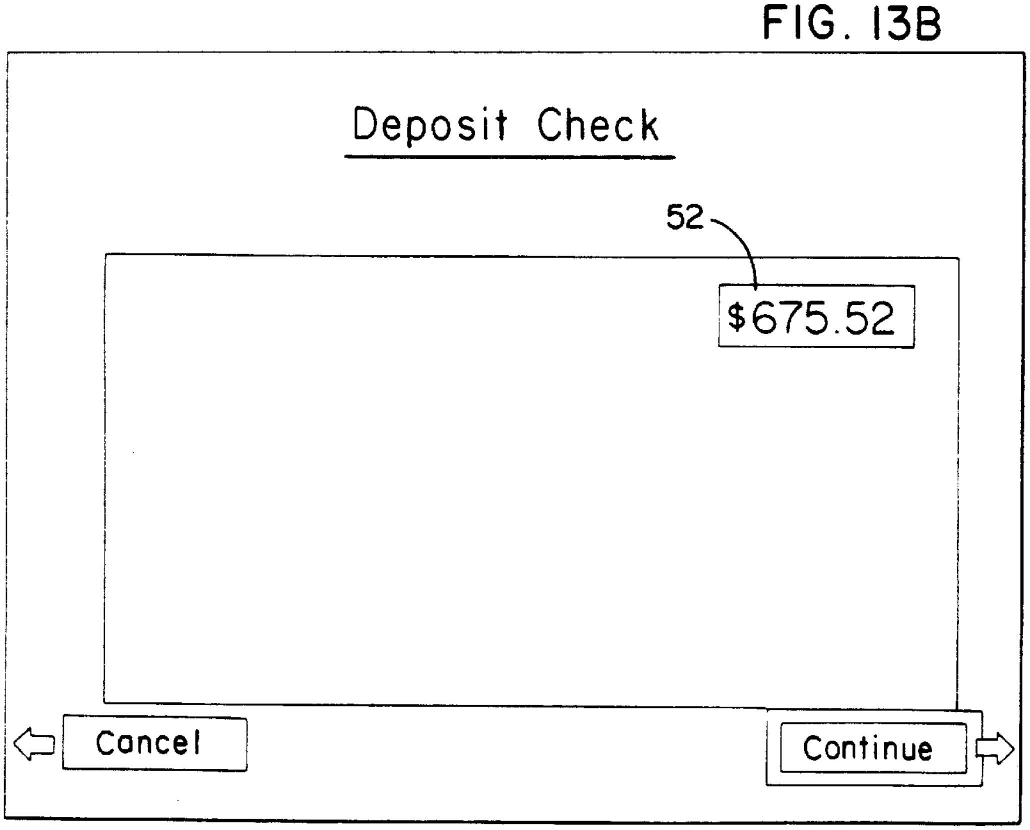

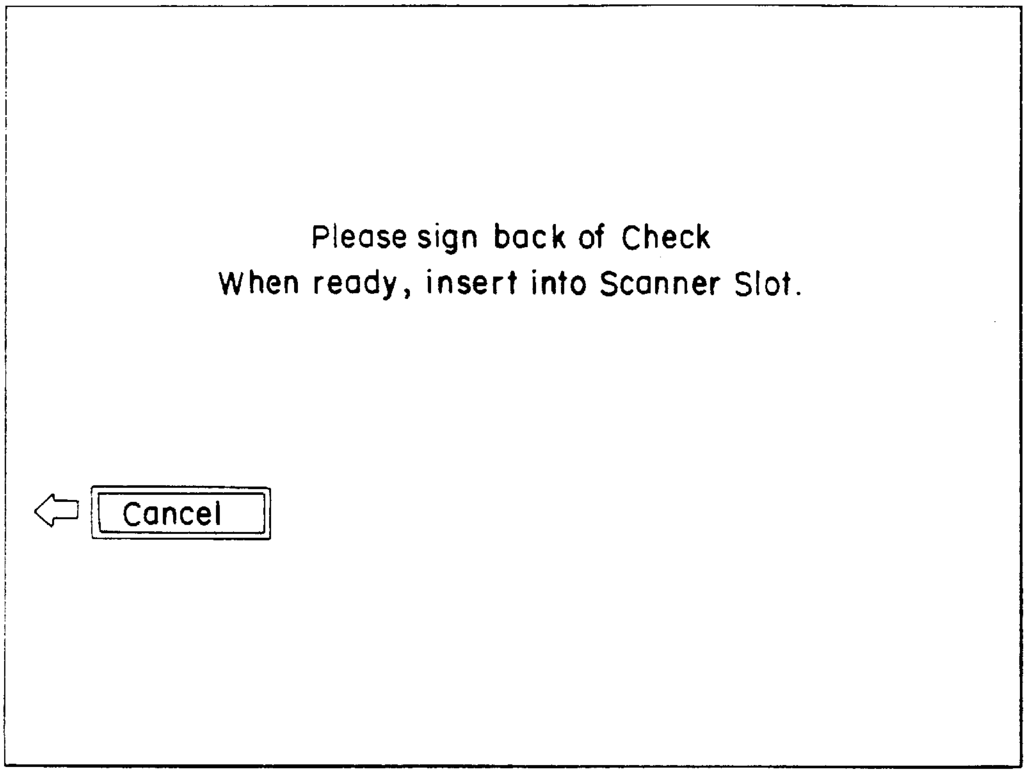
FIG. 13C
FIG. 13D
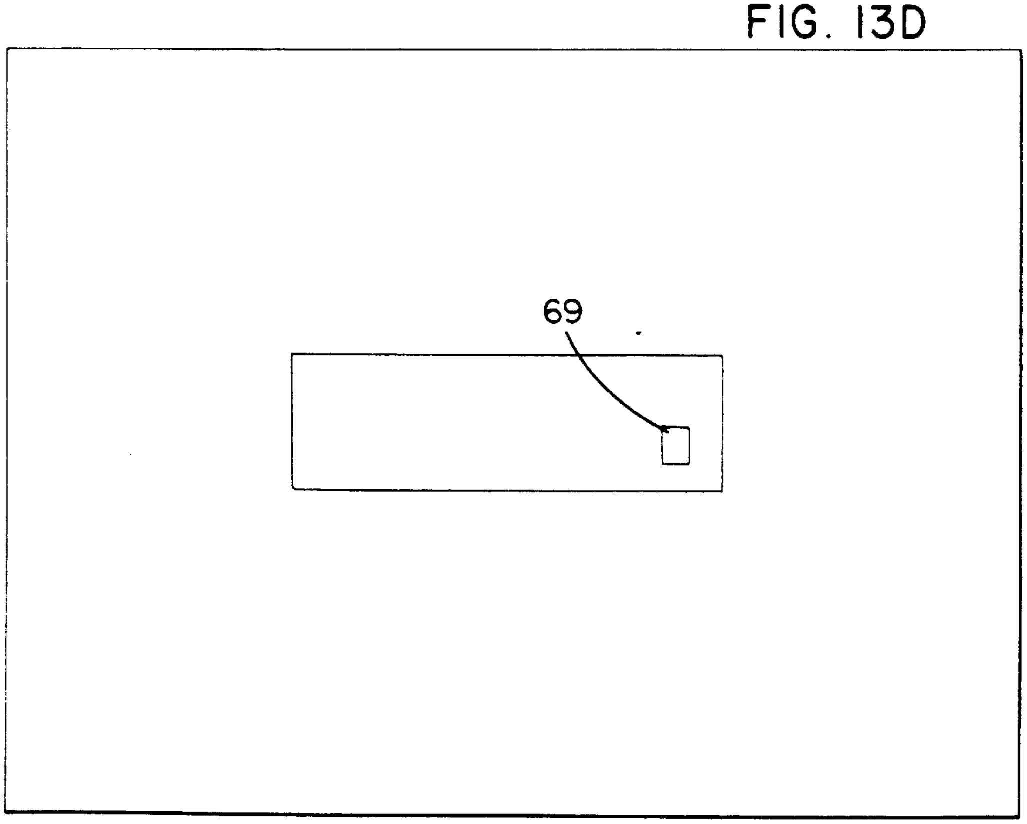

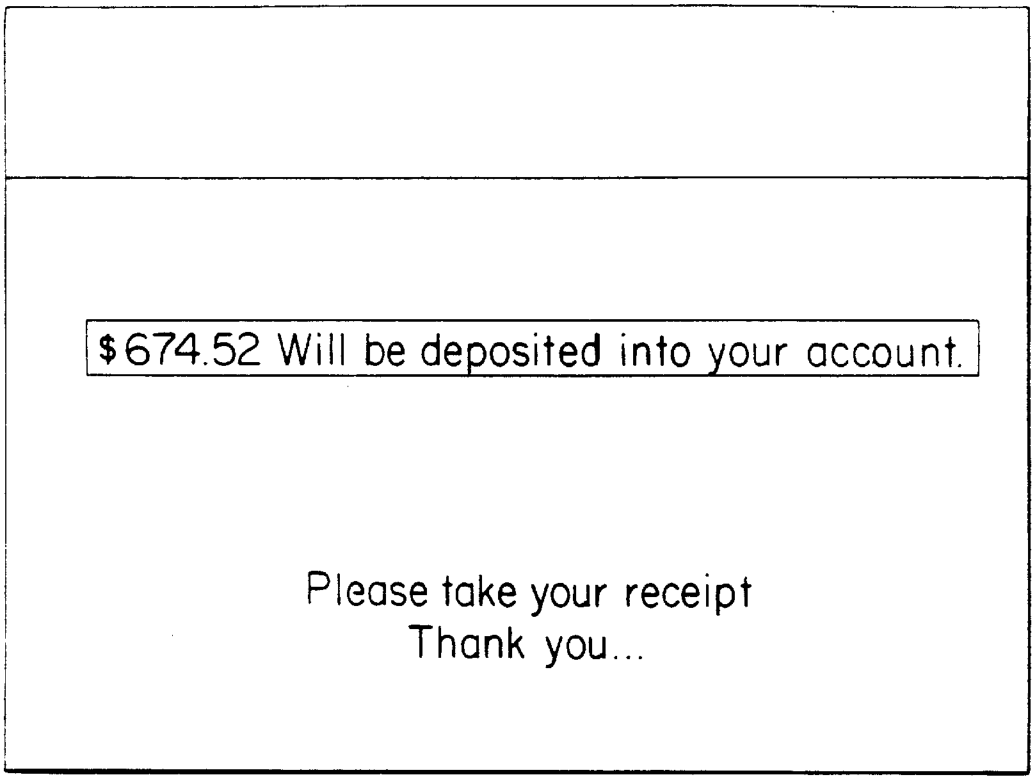
FIG. 13E
FIG. 13F
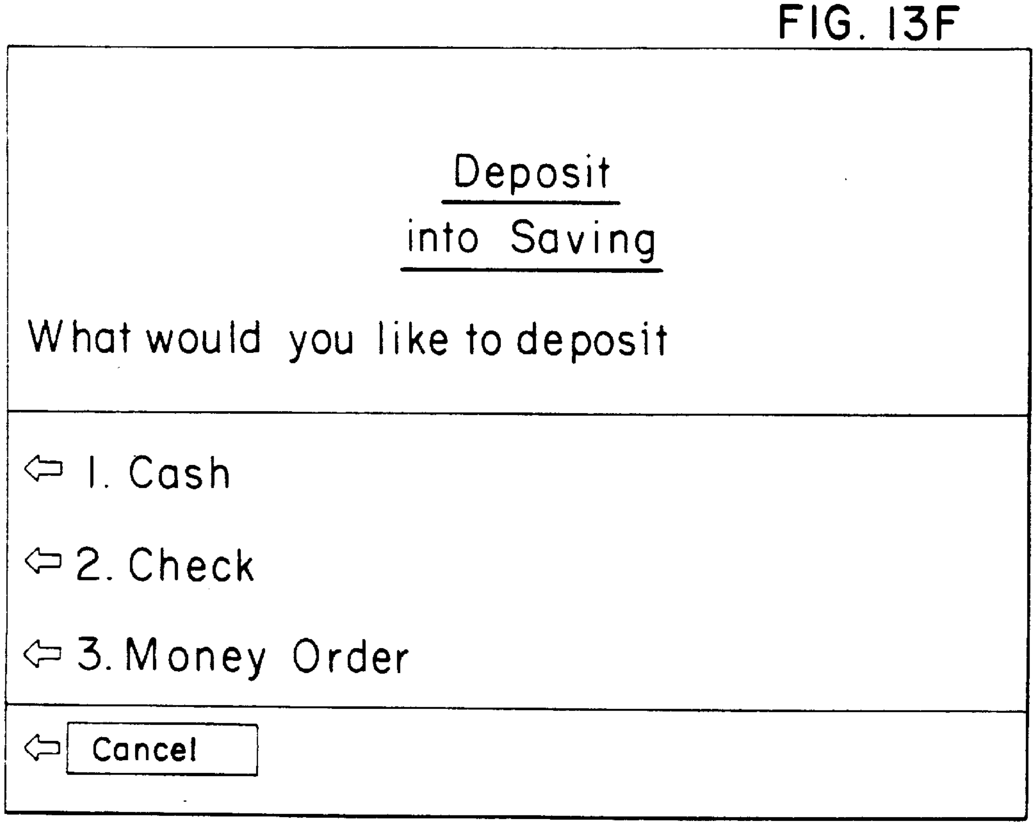

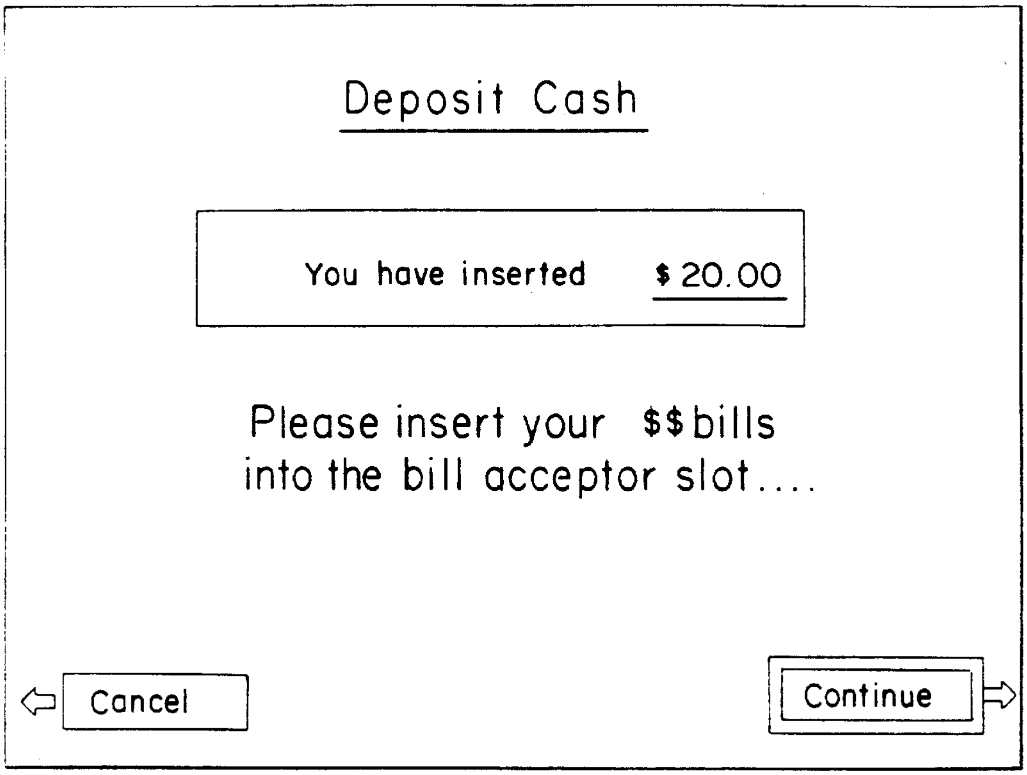
FIG. 13I
FIG. 13J
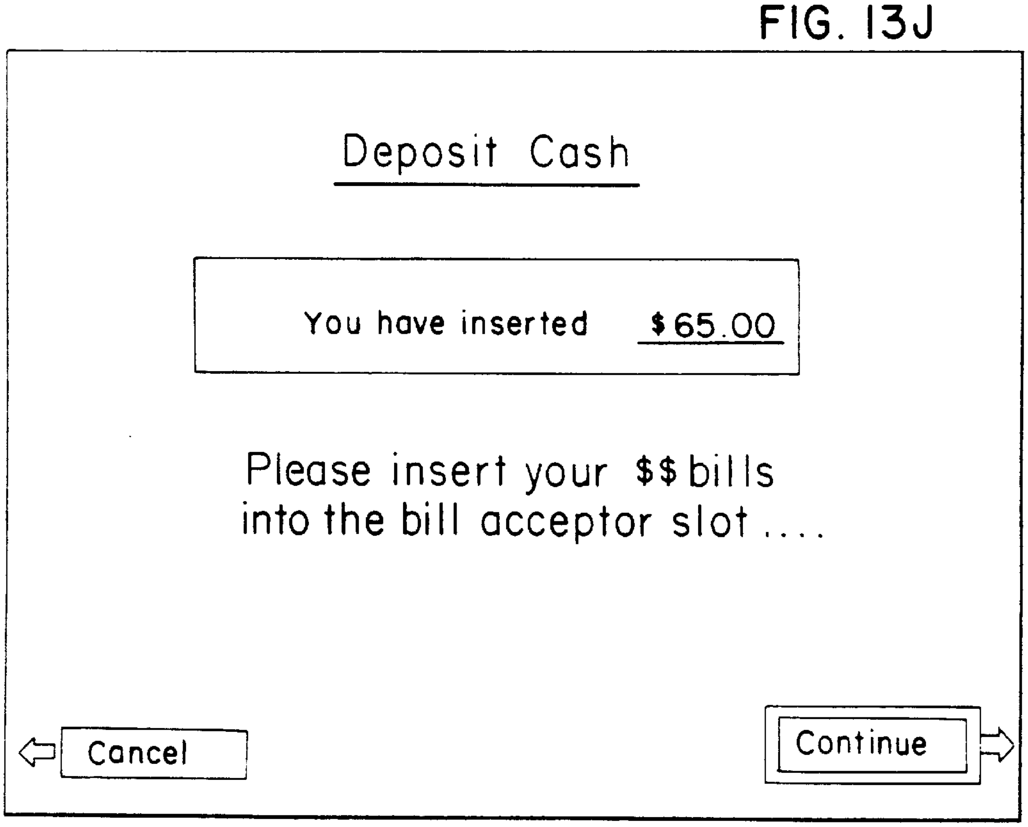

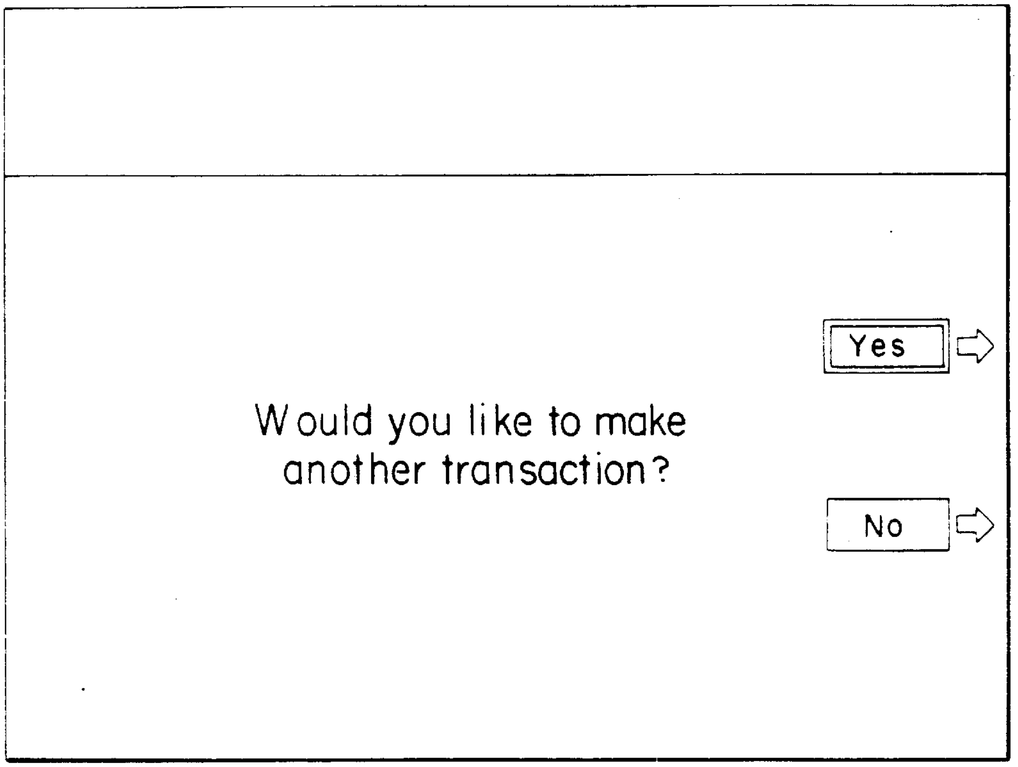
FIG. 15A
FIG. 15B
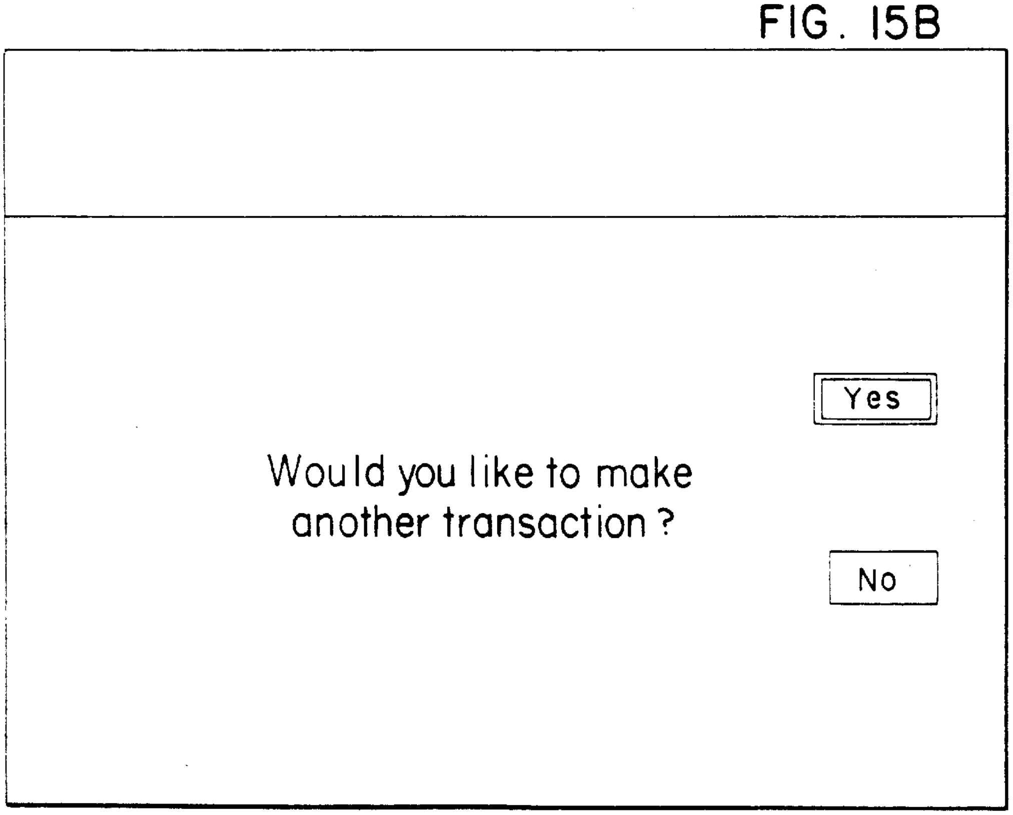

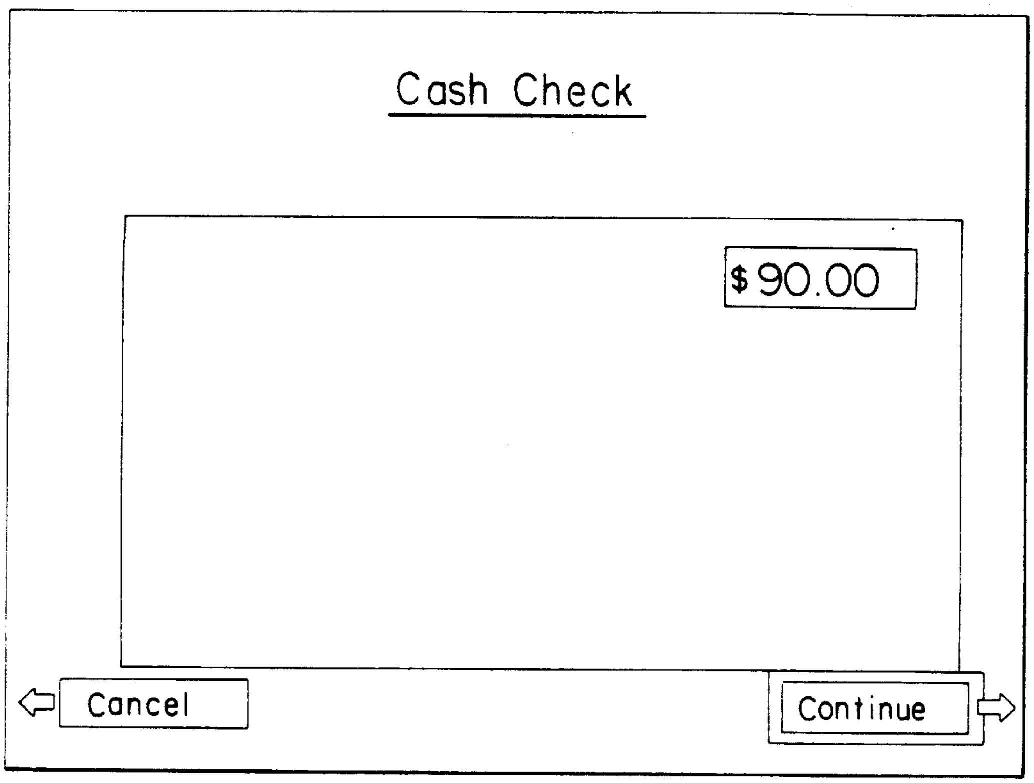
FIG. 16B
FIG. 16C
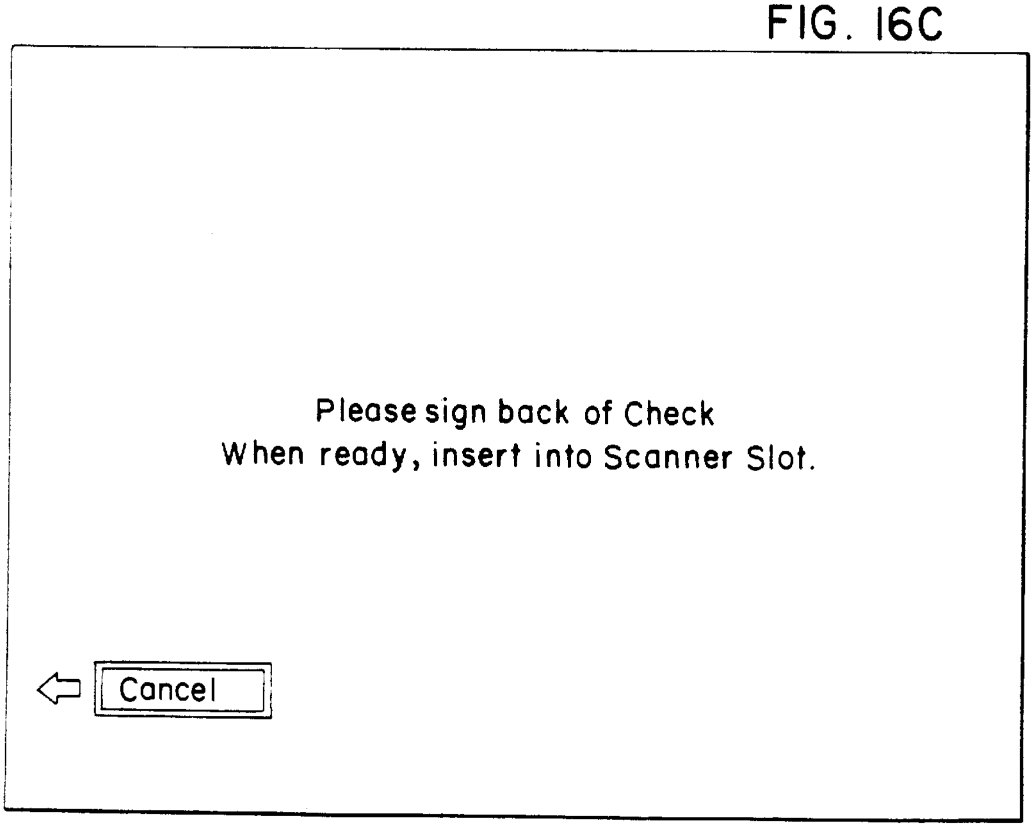

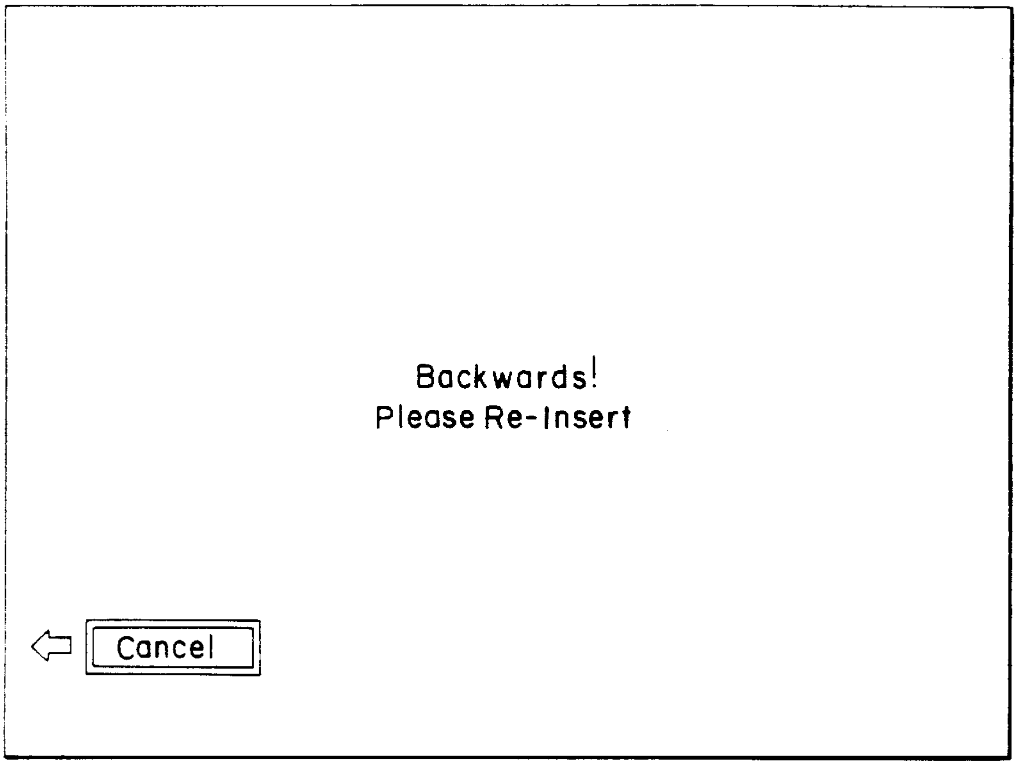
FIG. 16D
FIG. 16DD
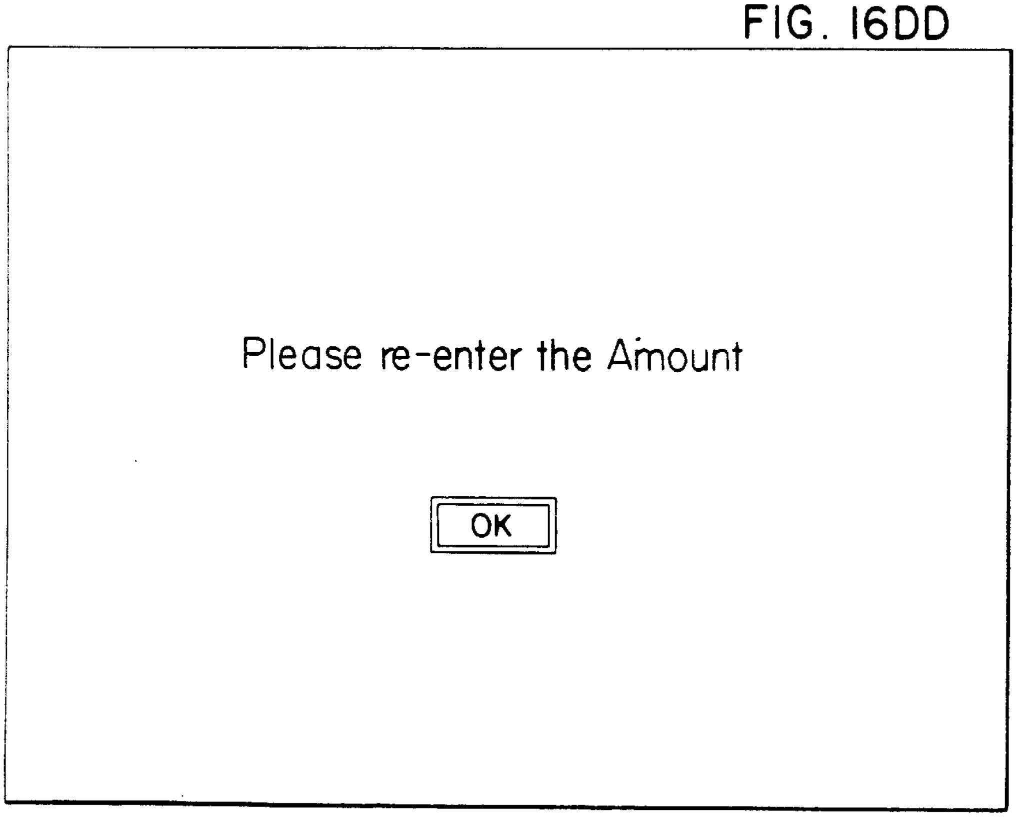

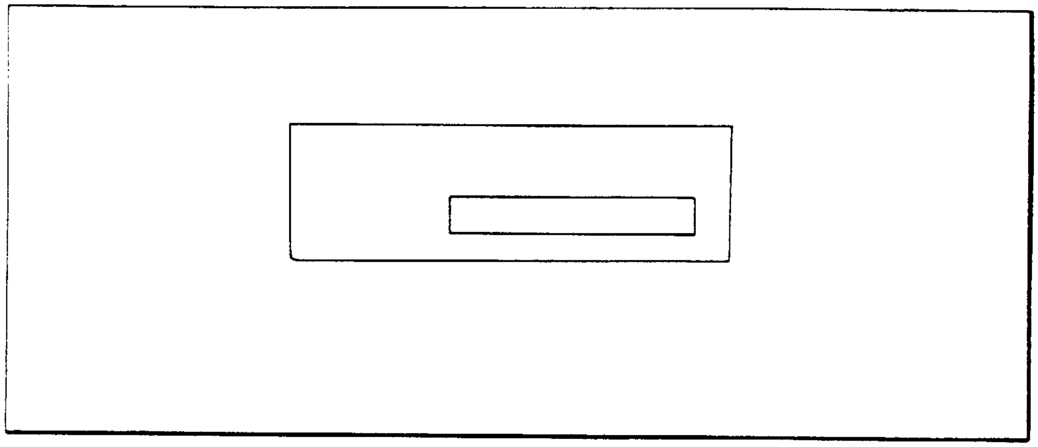
FIG. 16E
FIG. 16F
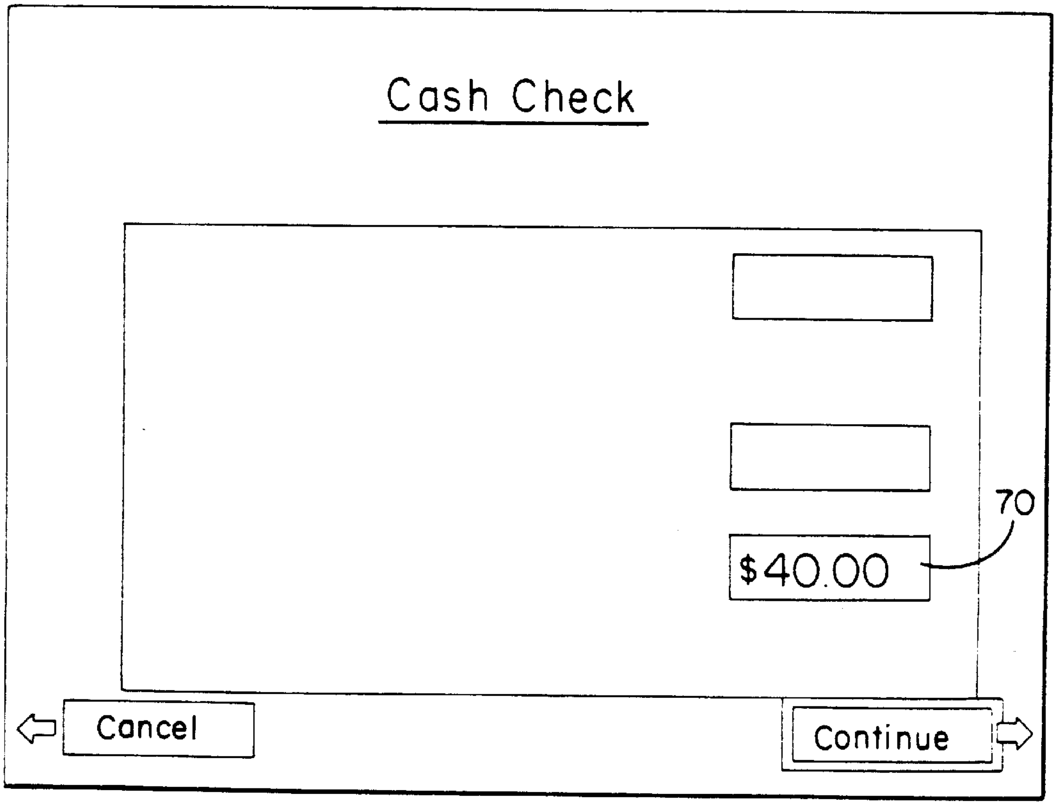

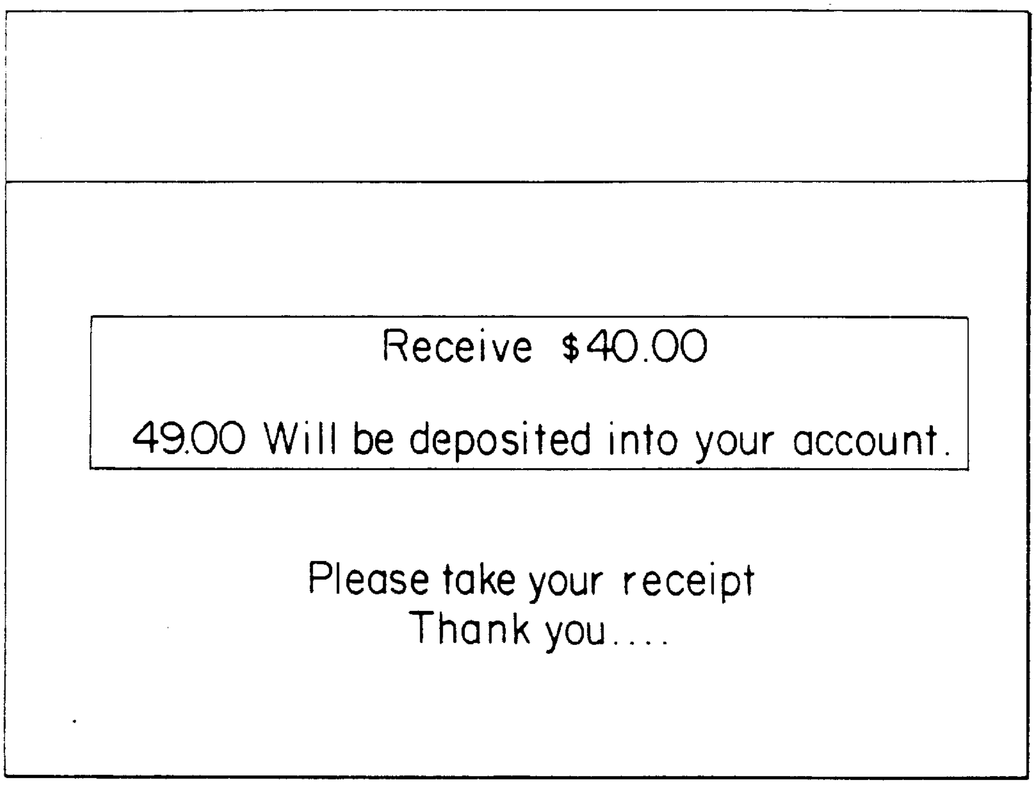
FIG. 16G
FIG. 16H
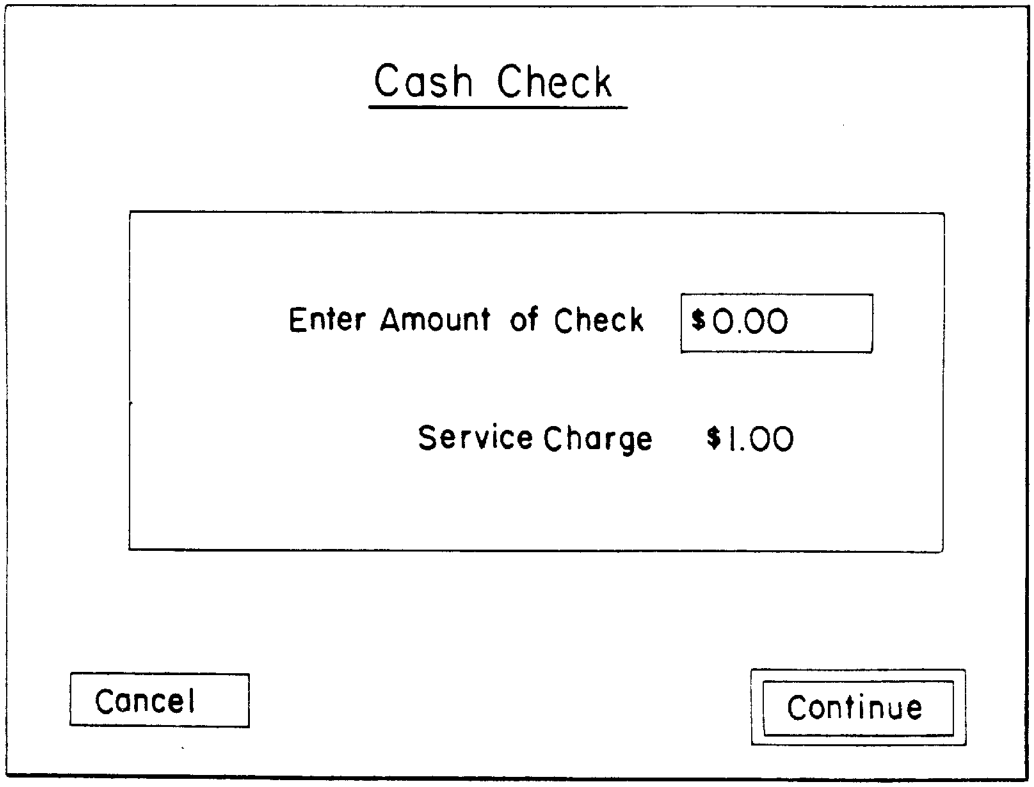

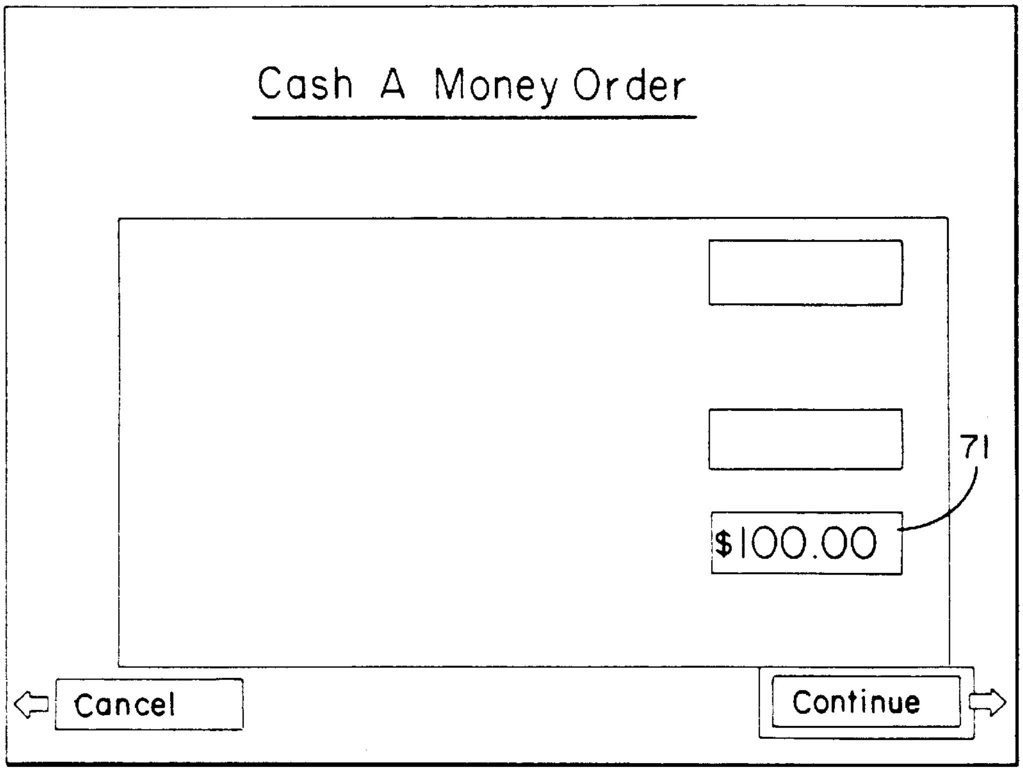
FIG. 17A
FIG. 17B
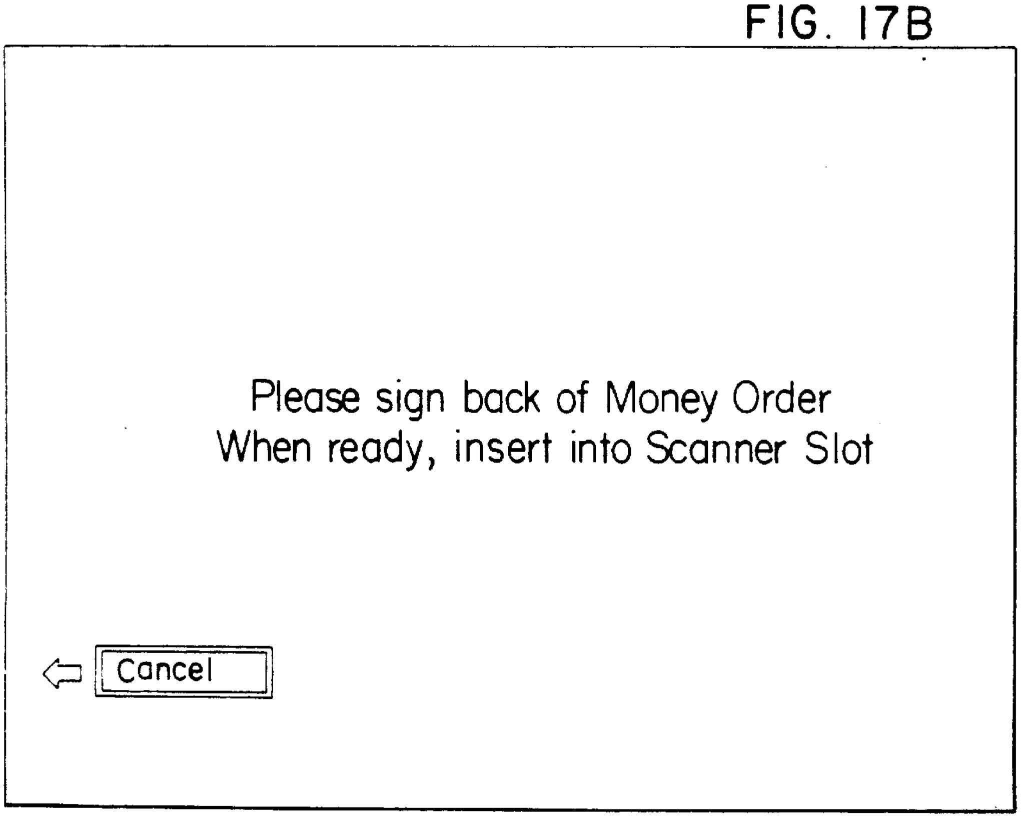

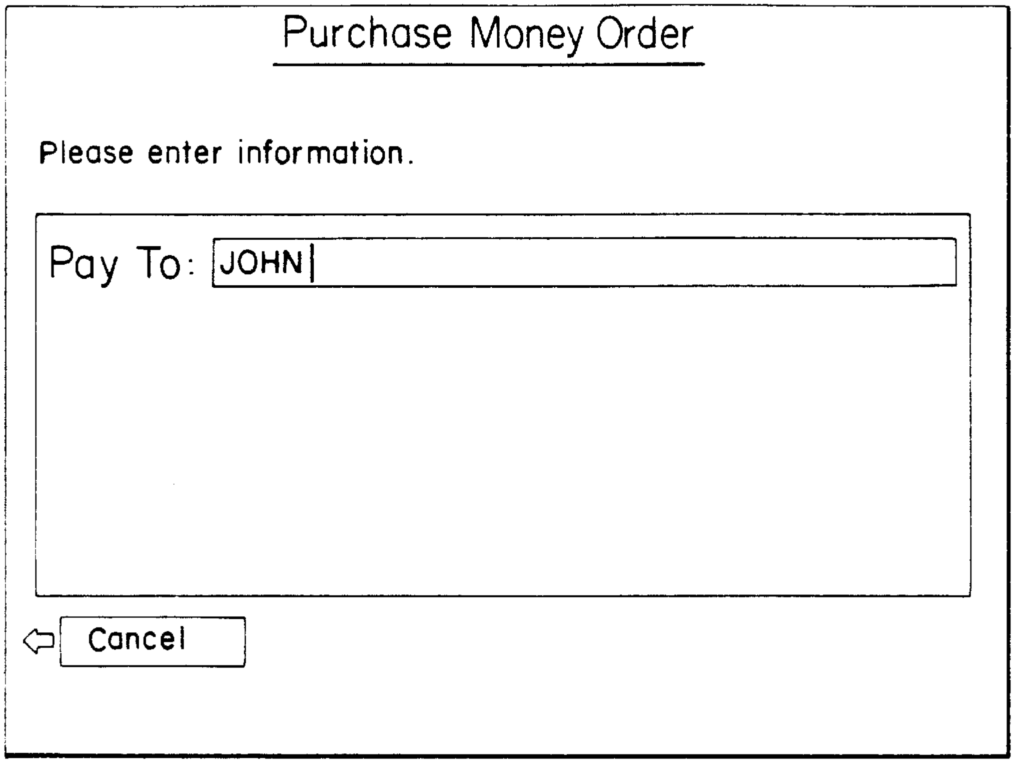
FIG. 18
FIG. 18A
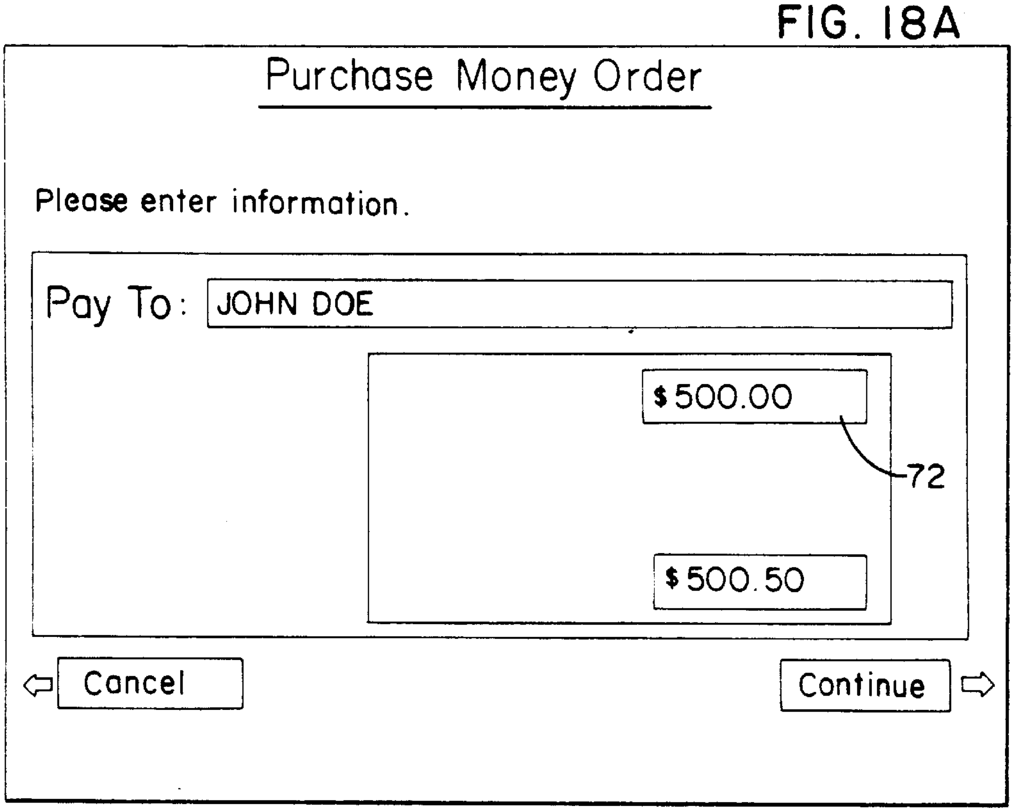
Purchase Money Order
Please enter information.
Pay To: JOHN
[Cancel]
Purchase Money Order
Please enter information.
Pay To: JOHN DOE
$500.00 —72
$500.50
[Cancel]   [Continue]

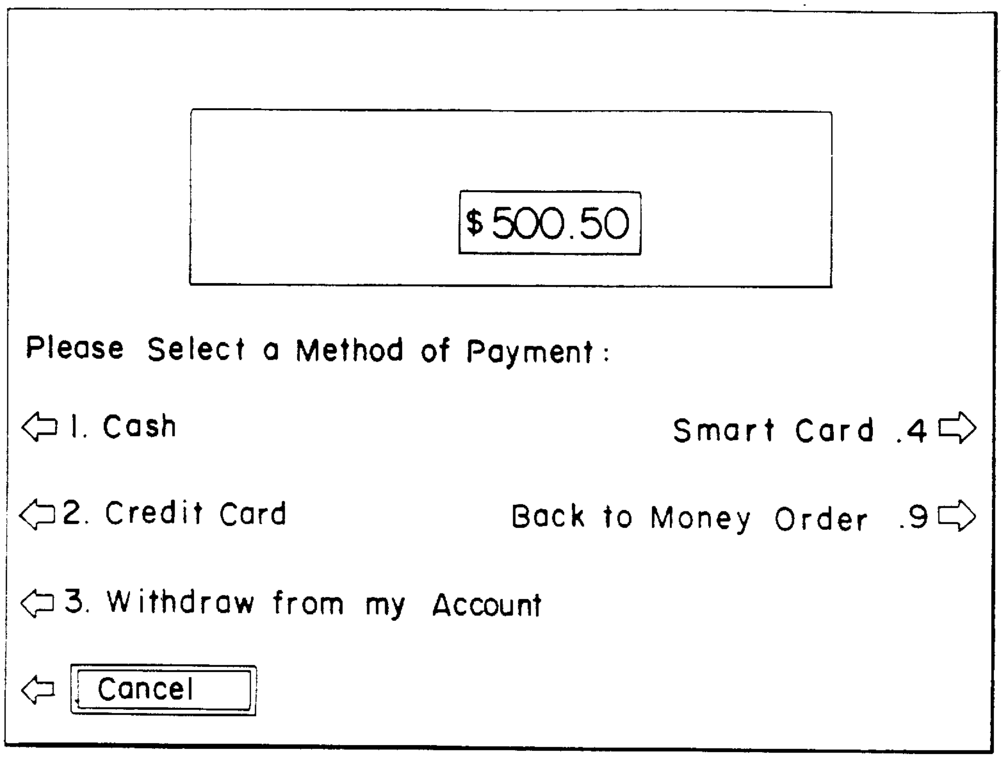
FIG. 18C
FIG. 18D
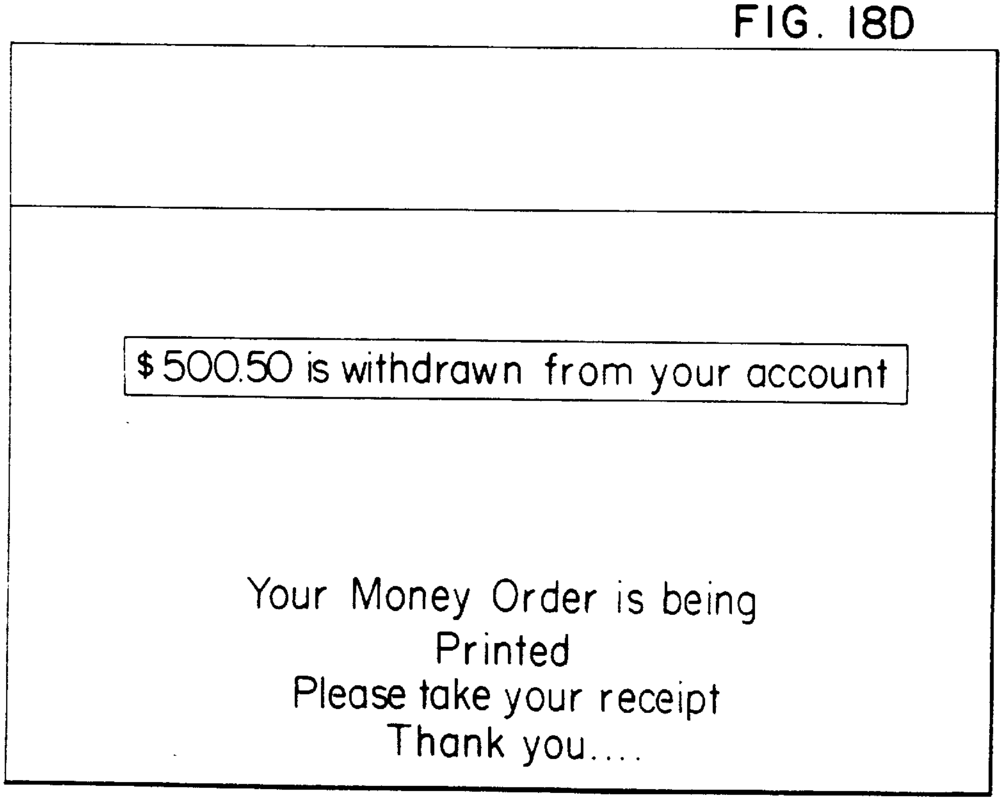

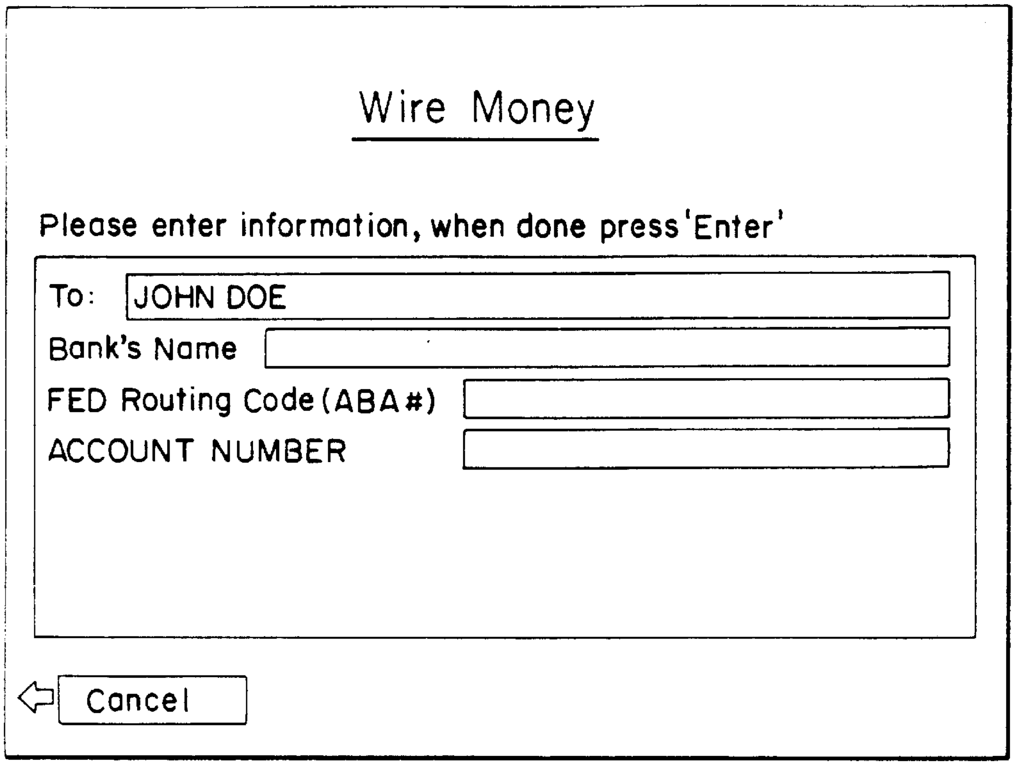
FIG. 19
FIG. 19A
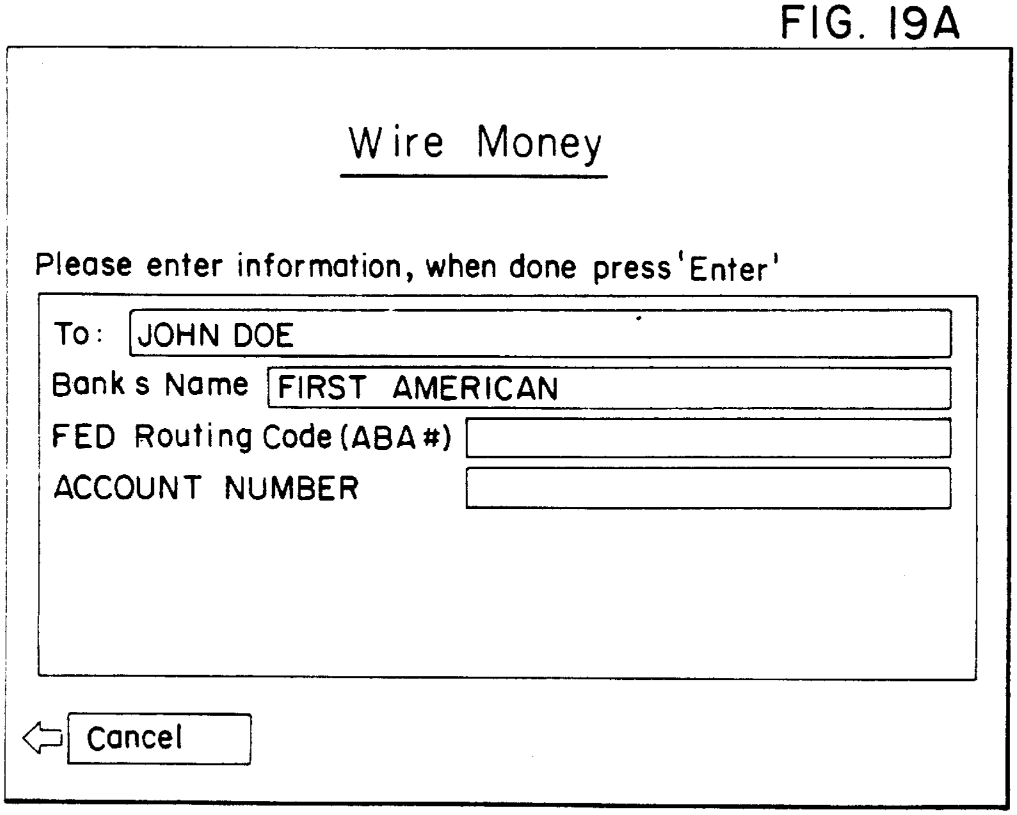
Wire Money
Please enter information, when done press 'Enter'
To: JOHN DOE
Bank's Name:
FED Routing Code (ABA#):
ACCOUNT NUMBER:
⇐ Cancel
Wire Money
Please enter information, when done press 'Enter'
To: JOHN DOE
Bank's Name: FIRST AMERICAN
FED Routing Code (ABA#):
ACCOUNT NUMBER:
⇐ Cancel

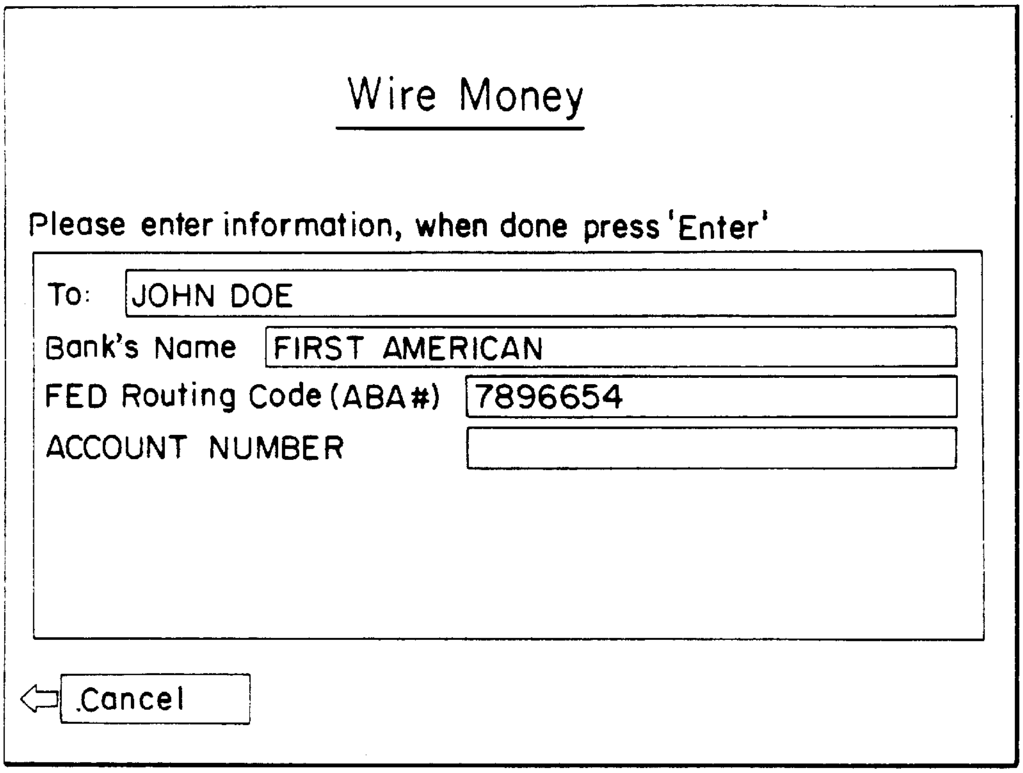
FIG. 19B
FIG. 19C
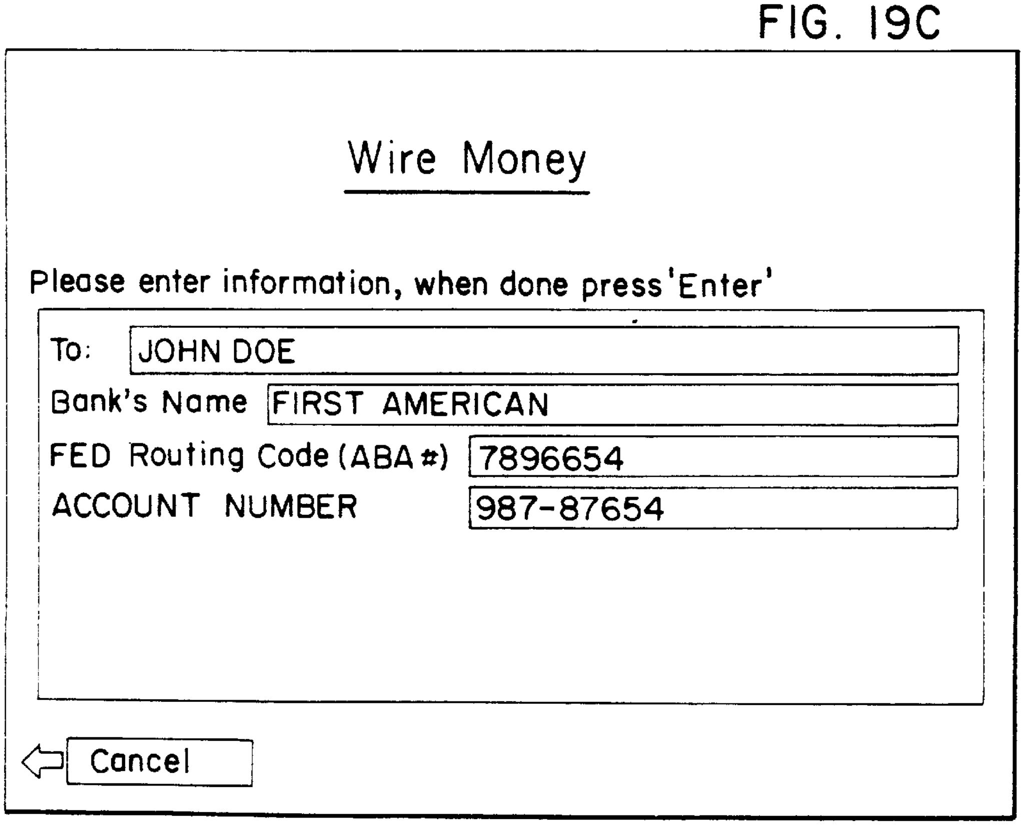
Wire Money
Please enter information, when done press 'Enter'
| To: | JOHN DOE |
|---|---|
| Bank's Name | FIRST AMERICAN |
| FED Routing Code (ABA#) | 7896654 |
| ACCOUNT NUMBER | |
⇦ Cancel
Wire Money
Please enter information, when done press 'Enter'
| To: | JOHN DOE |
|---|---|
| Bank's Name | FIRST AMERICAN |
| FED Routing Code (ABA#) | 7896654 |
| ACCOUNT NUMBER | 987-87654 |
⇦ Cancel

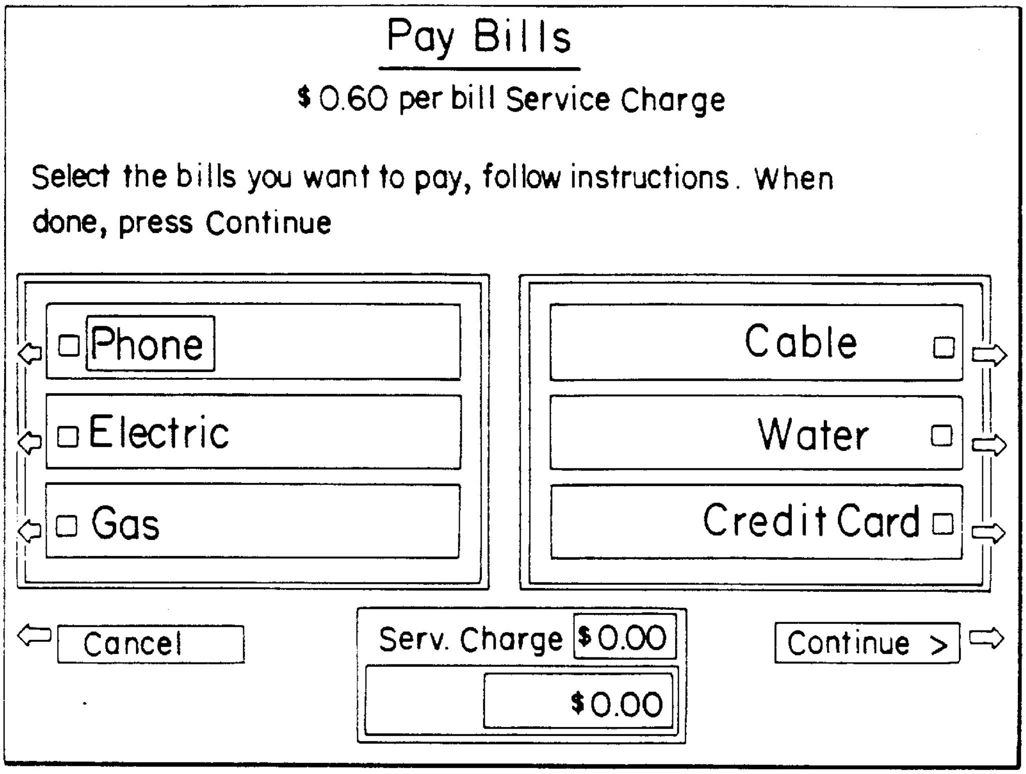

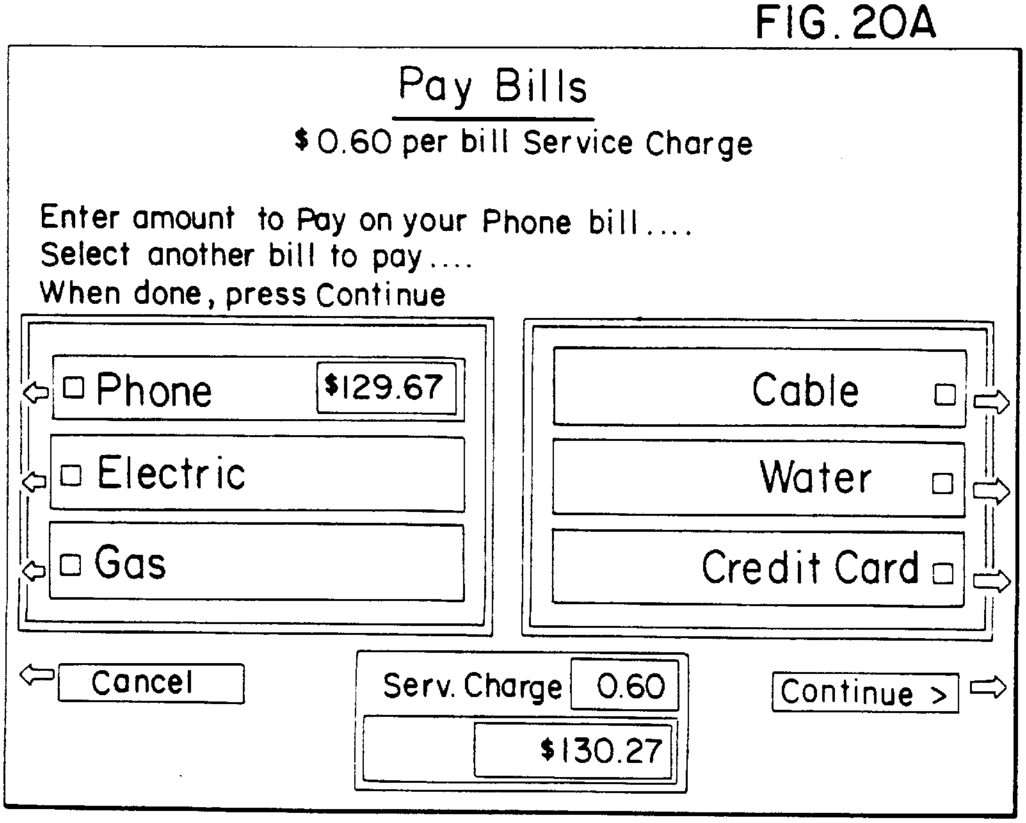

Pay Bills
$ 0.60 per bill Service Charge

Select the bills you want to pay, follow instructions. When done, press Continue

- ☐ Phone
- ☐ Electric
- ☐ Gas
- Cable ☐
- Water ☐
- Credit Card ☐

Cancel        Serv. Charge  $ 0.00        Continue >
              $ 0.00

Pay Bills
$ 0.60 per bill Service Charge

Enter amount to Pay on your Phone bill....
Select another bill to pay....
When done, press Continue

- ☐ Phone  $129.67
- ☐ Electric
- ☐ Gas
- Cable ☐
- Water ☐
- Credit Card ☐

Cancel        Serv. Charge  0.60        Continue >
              $130.27

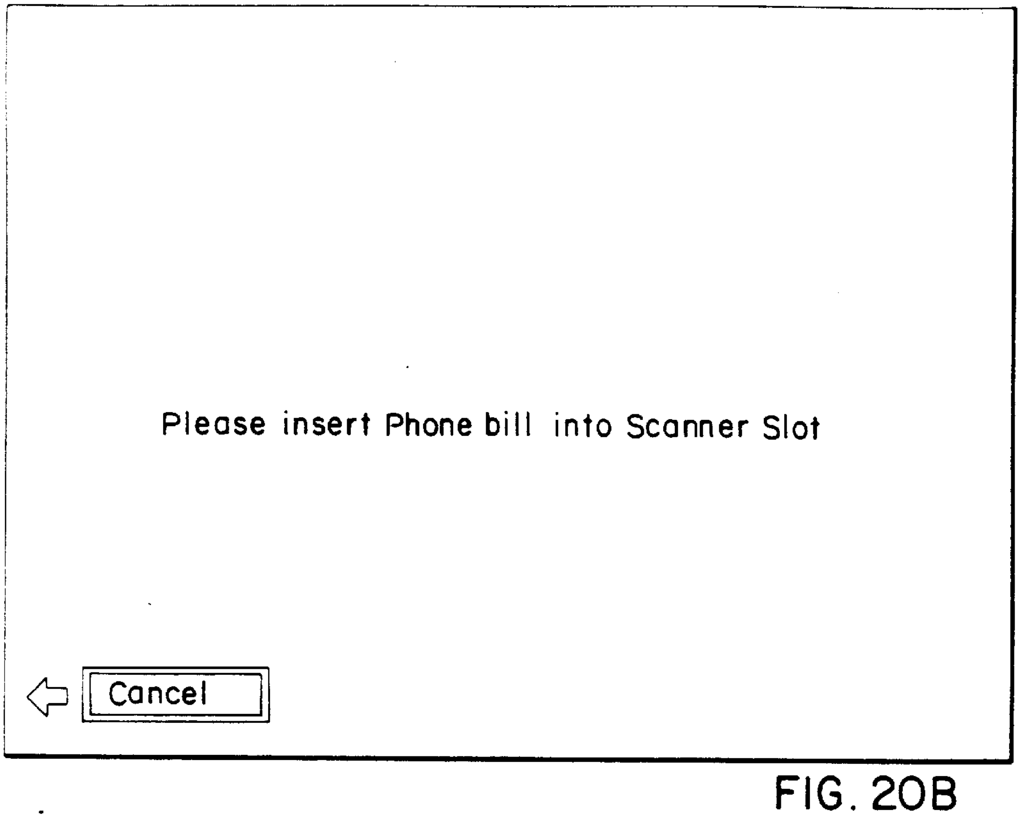
FIG. 20B
FIG. 20C
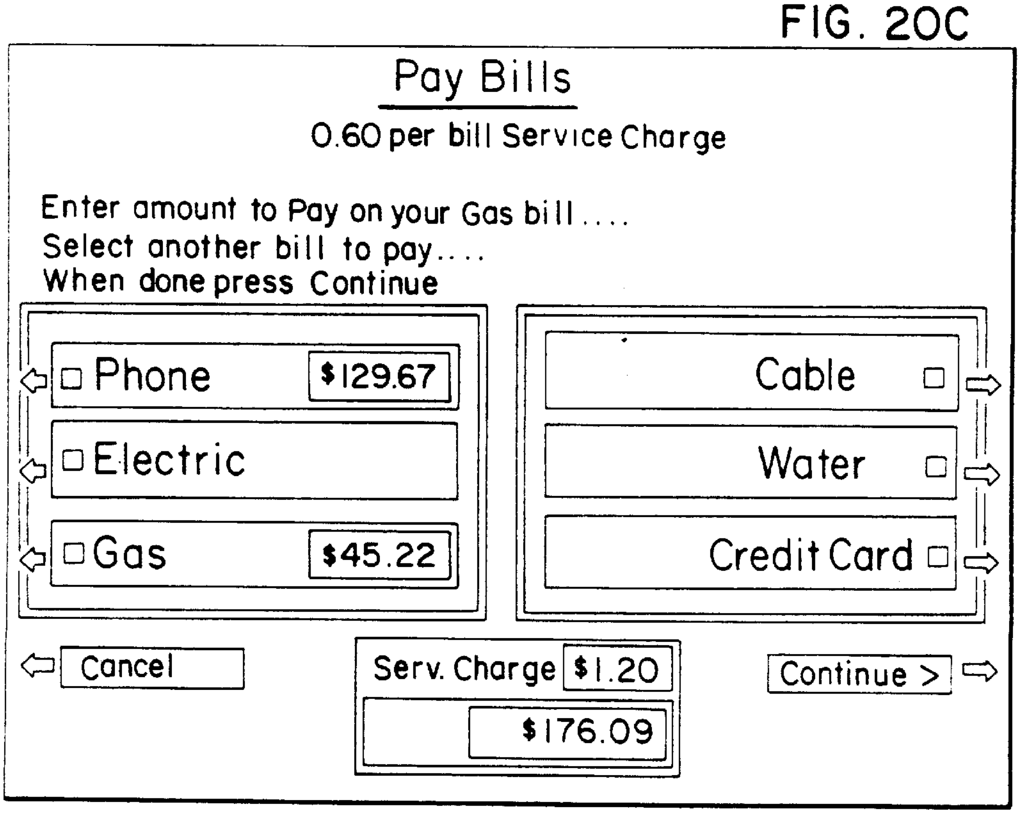

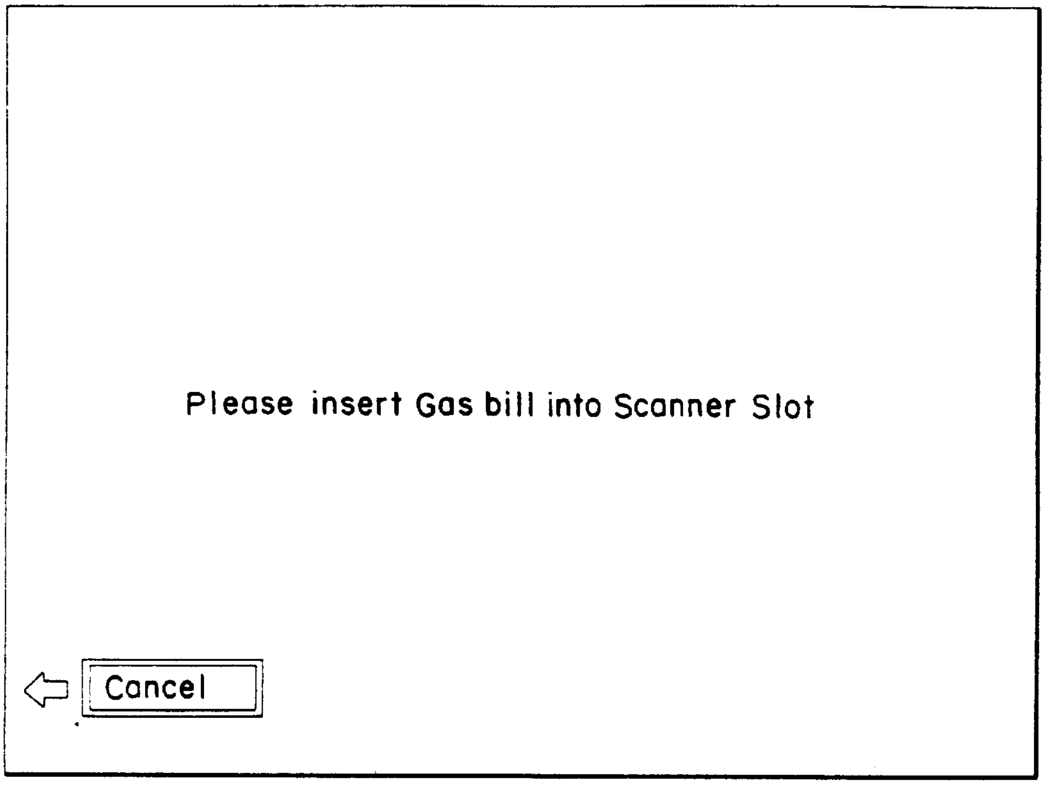
FIG. 20D
FIG. 20E
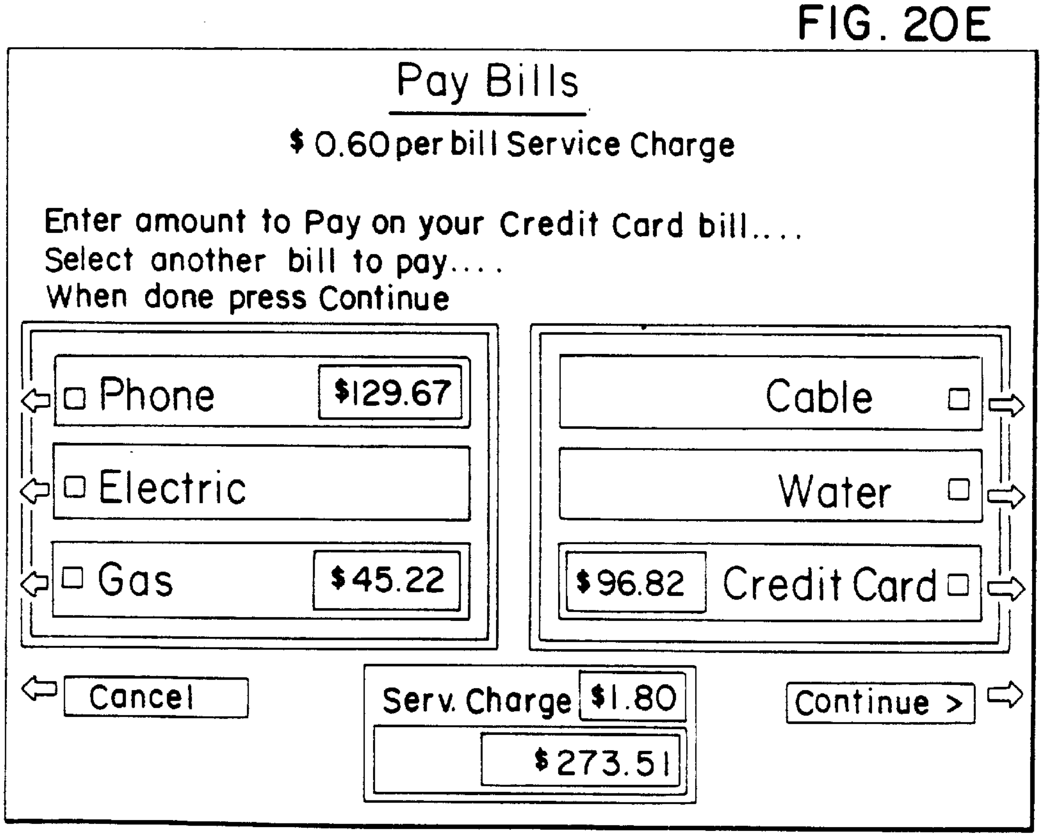

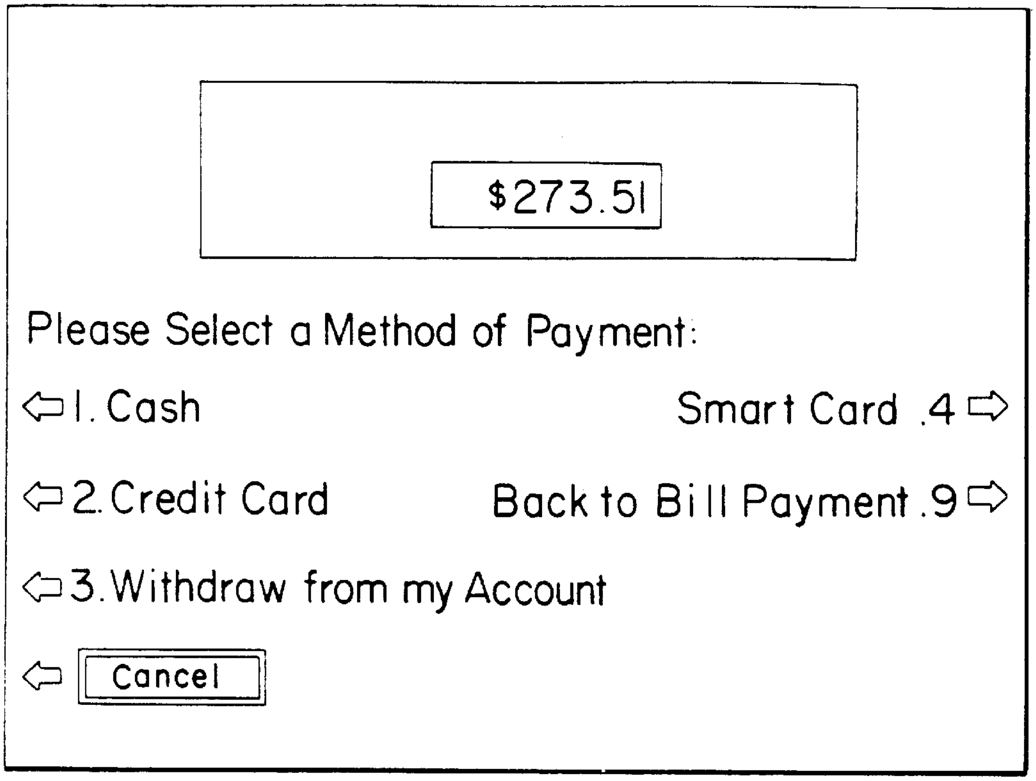
FIG. 20F
FIG. 20G
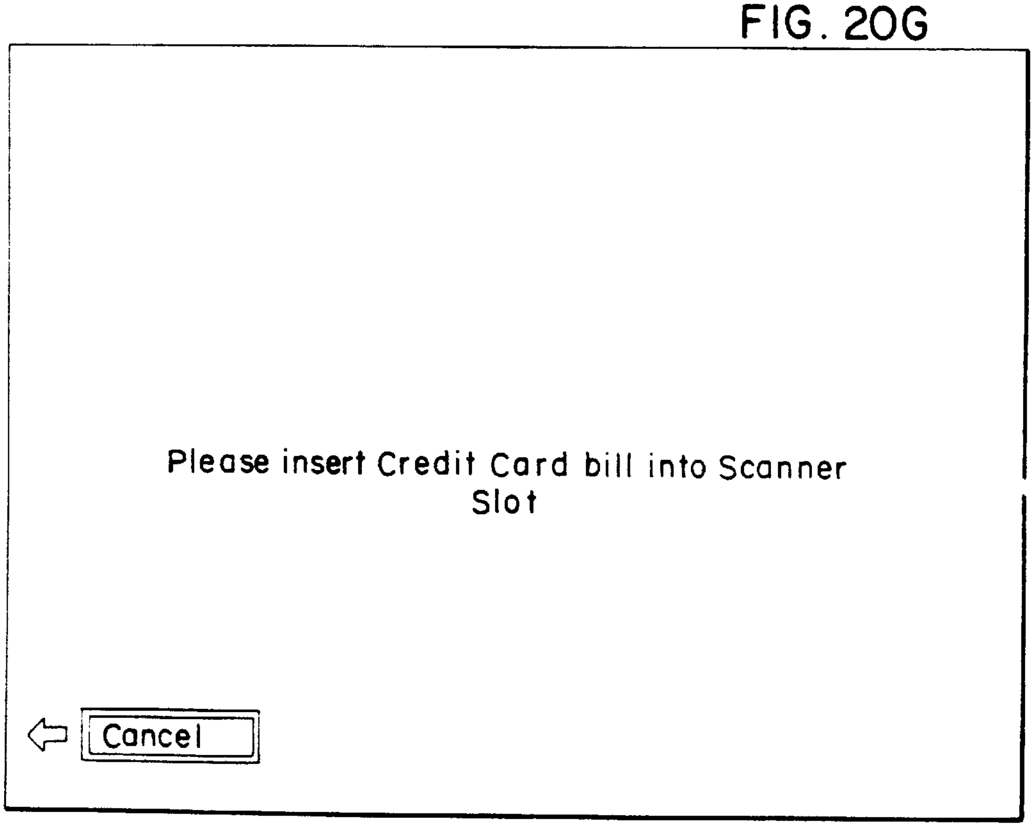

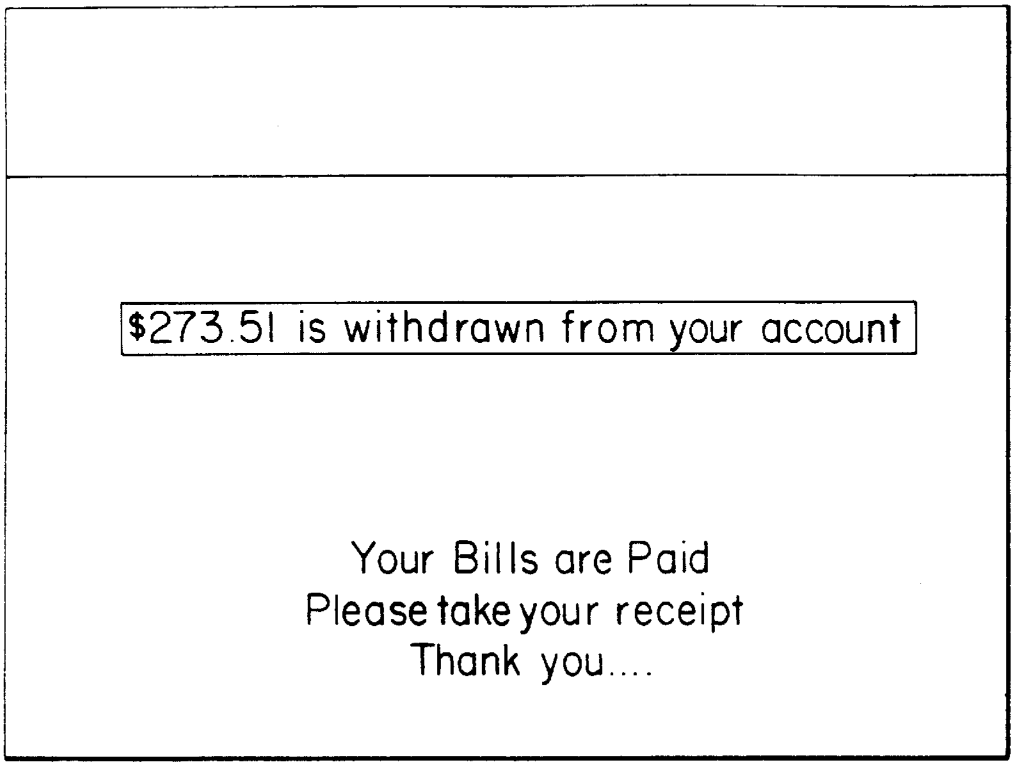
FIG. 20I
FIG. 20J
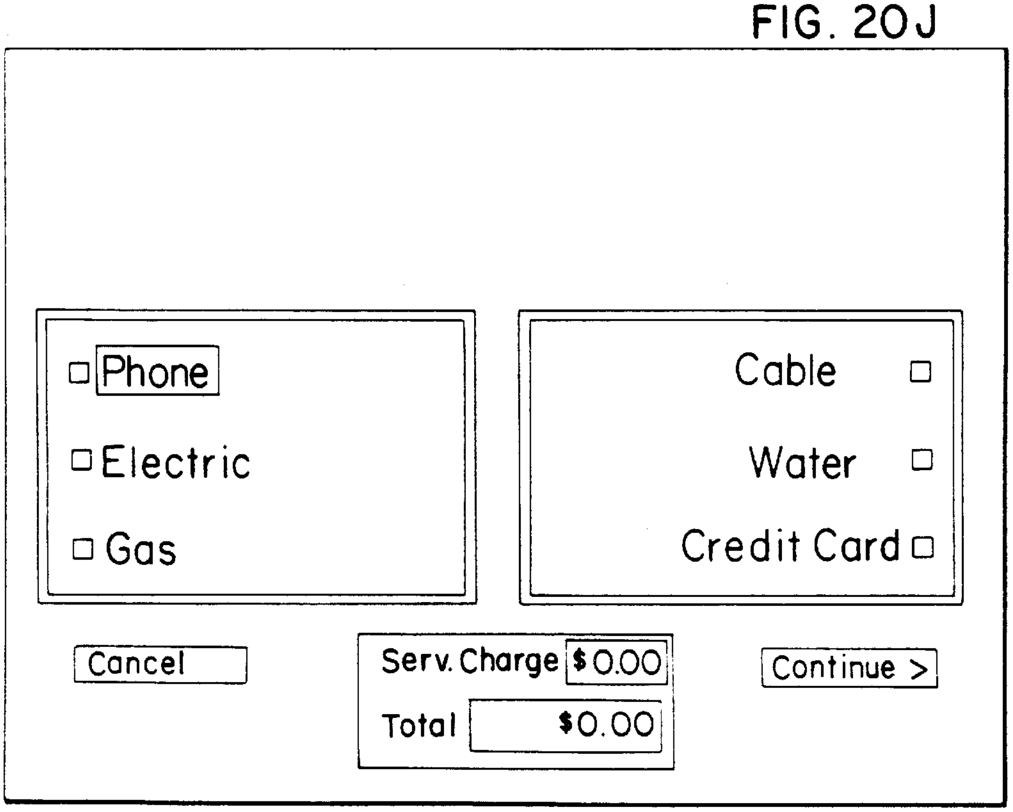

Purchase

Please check items to buy, enter quantity. When done press Continue

☐ Stamps  $6.50/booklet

☐ Smart Card  $5.00/card

☑ Phone Cards  $10.00/card    | 1 |

Cancel                    $10.00  Continue

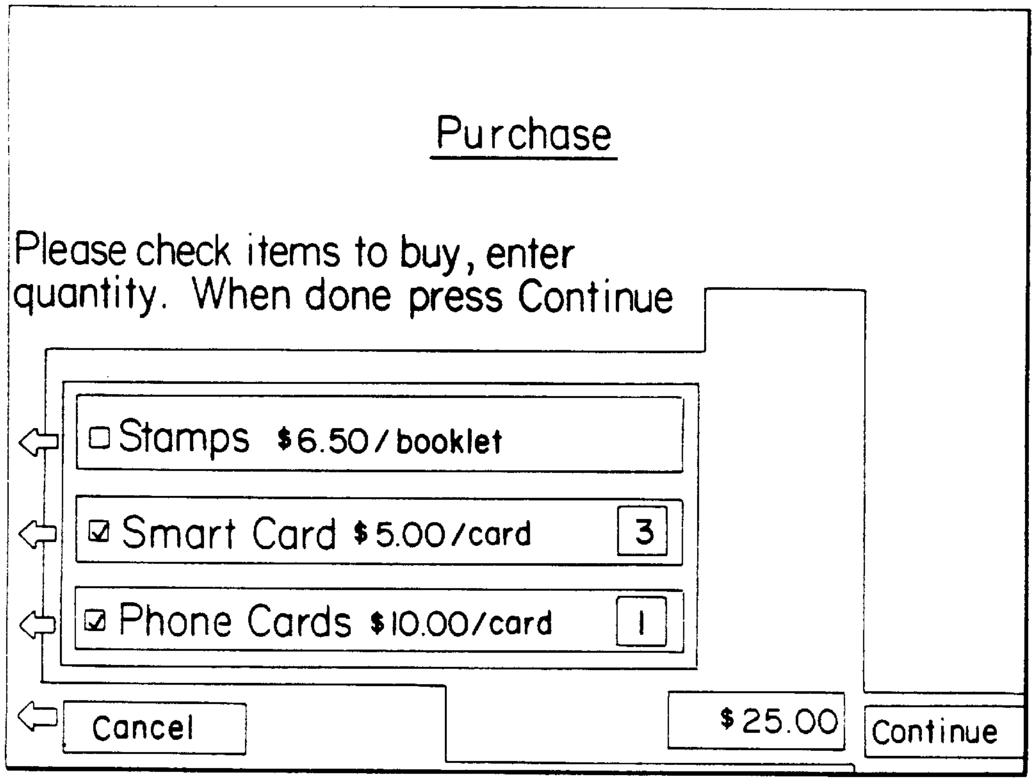
FIG. 21B
FIG. 21C
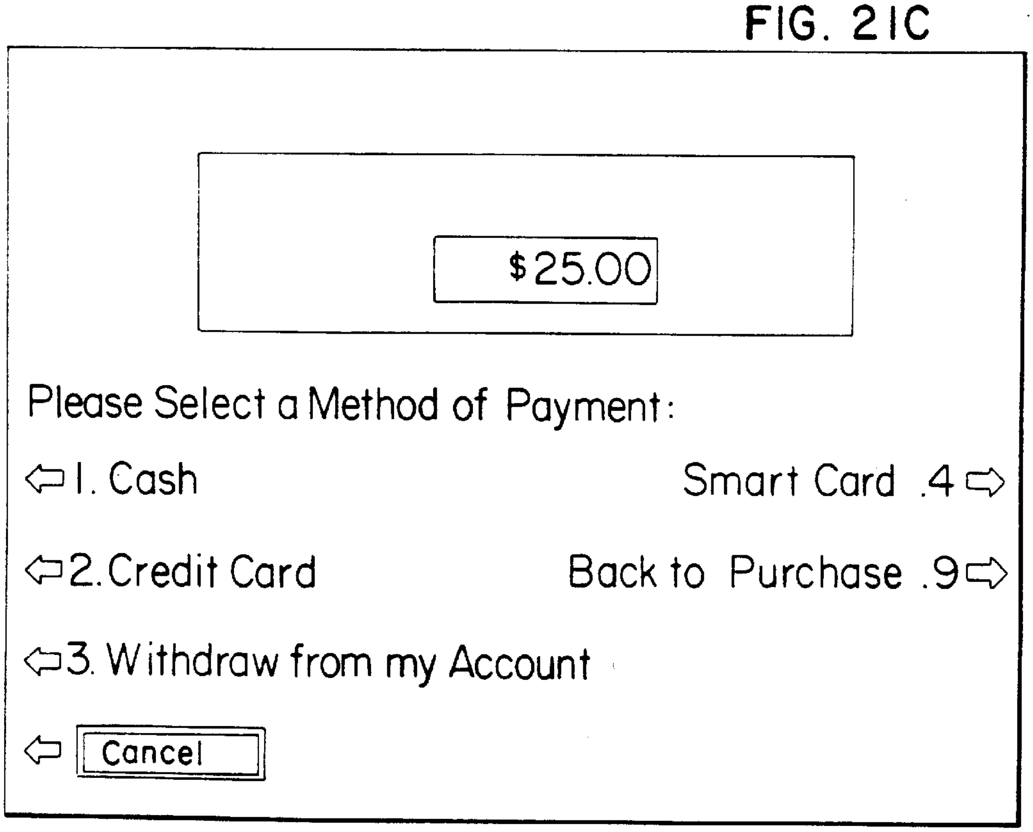
Purchase
Please check items to buy, enter quantity. When done press Continue
⇐ ☐ Stamps $6.50/booklet
⇐ ☑ Smart Card $5.00/card  3
⇐ ☑ Phone Cards $10.00/card  1
⇐ Cancel   $25.00  Continue
$25.00
Please Select a Method of Payment:
⇐ 1. Cash                    Smart Card .4 ⇒
⇐ 2. Credit Card             Back to Purchase .9 ⇒
⇐ 3. Withdraw from my Account
⇐ Cancel

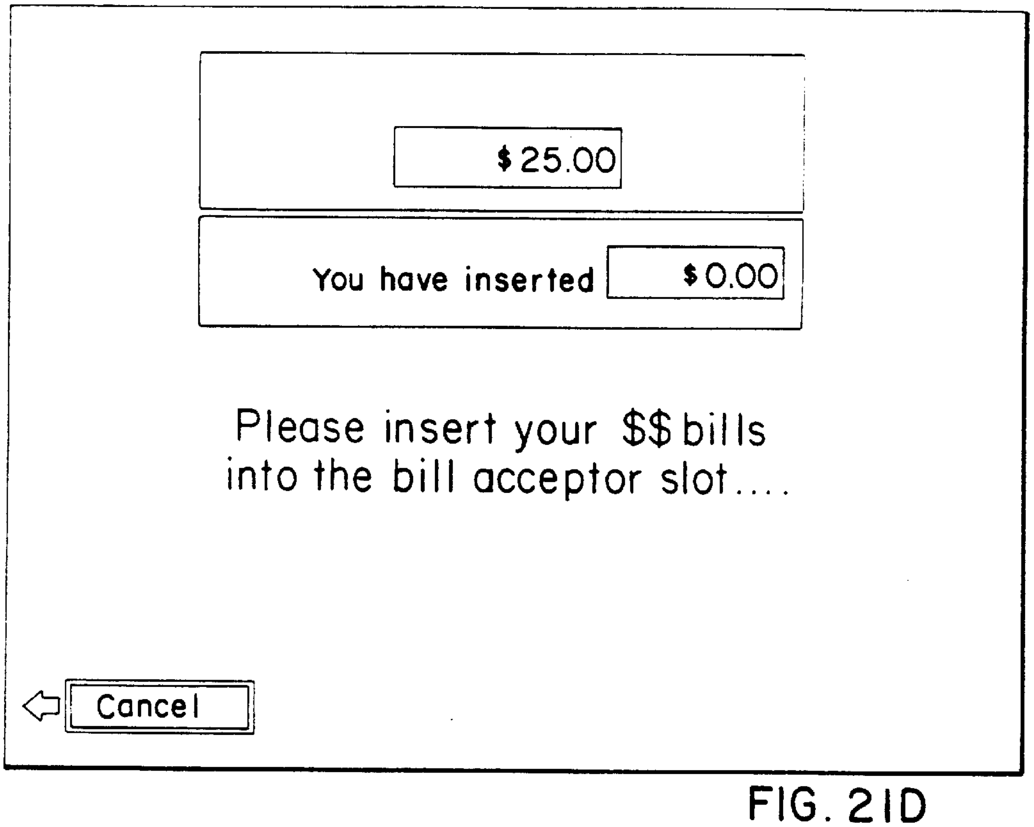
FIG. 21D
FIG. 21E
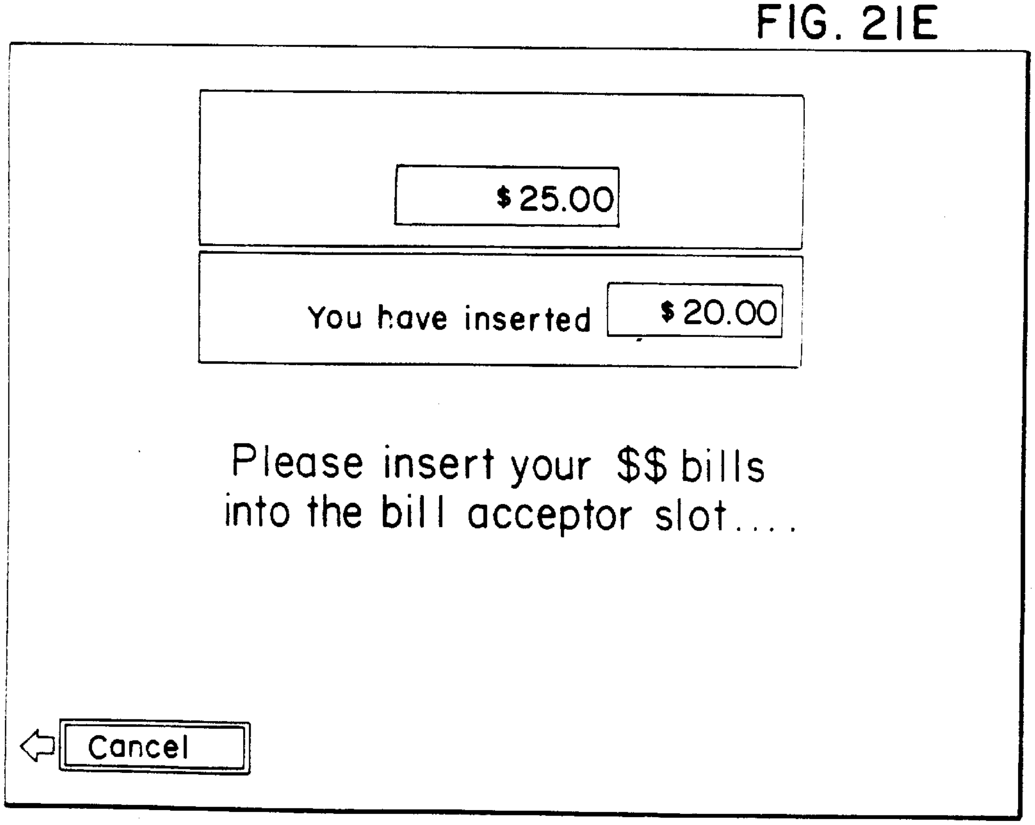

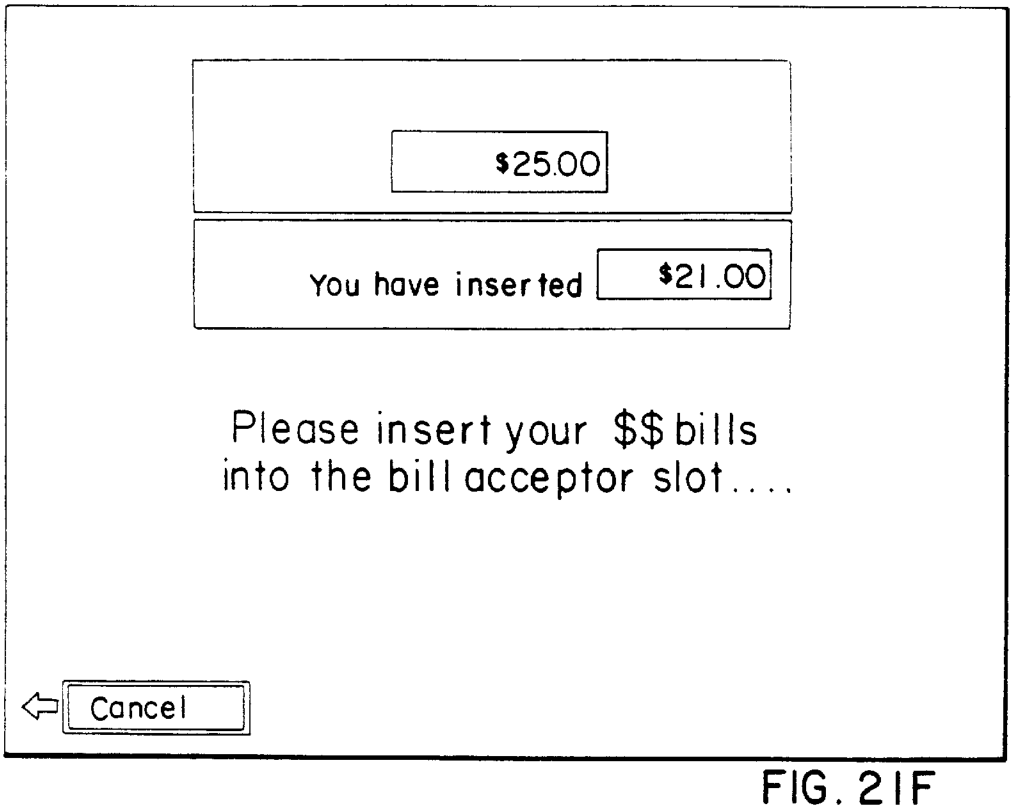
FIG. 21F
FIG. 21G
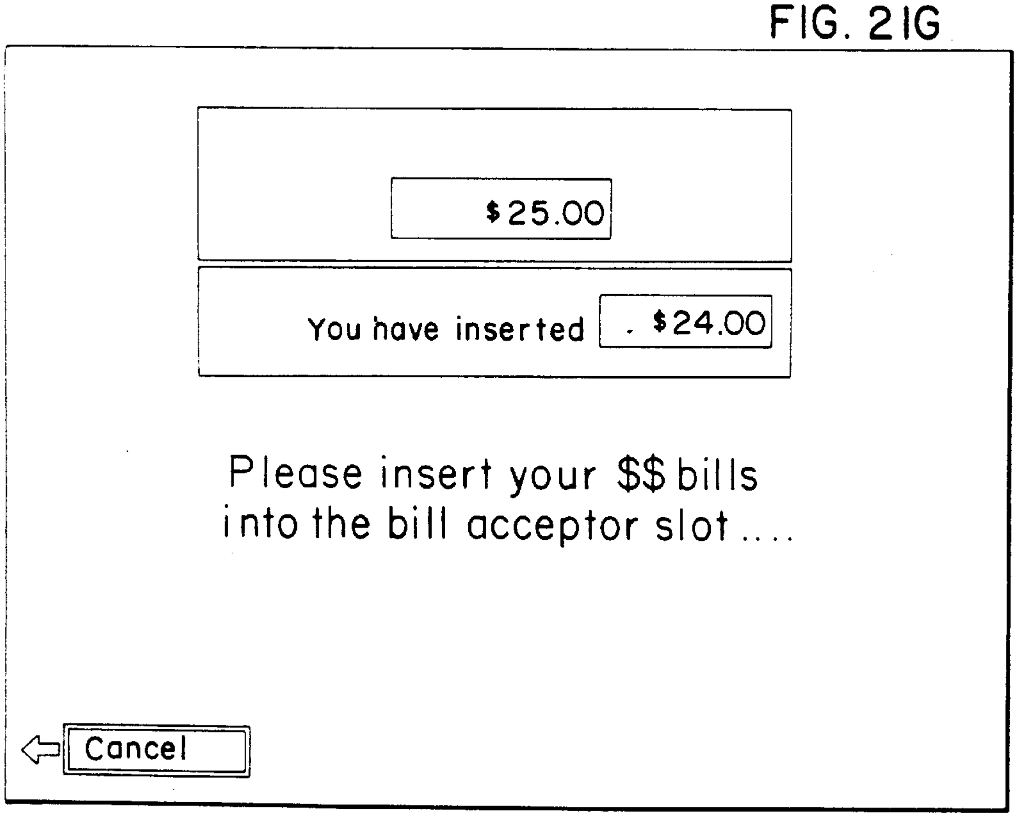

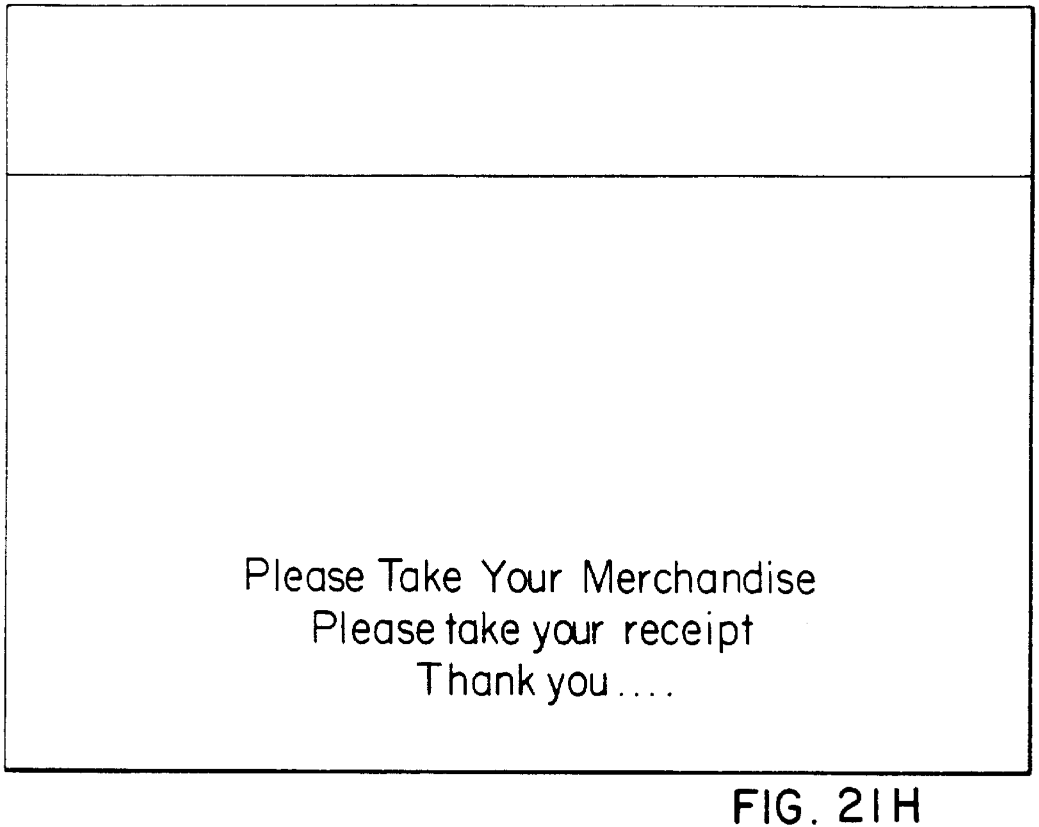
FIG. 21H
FIG. 21I
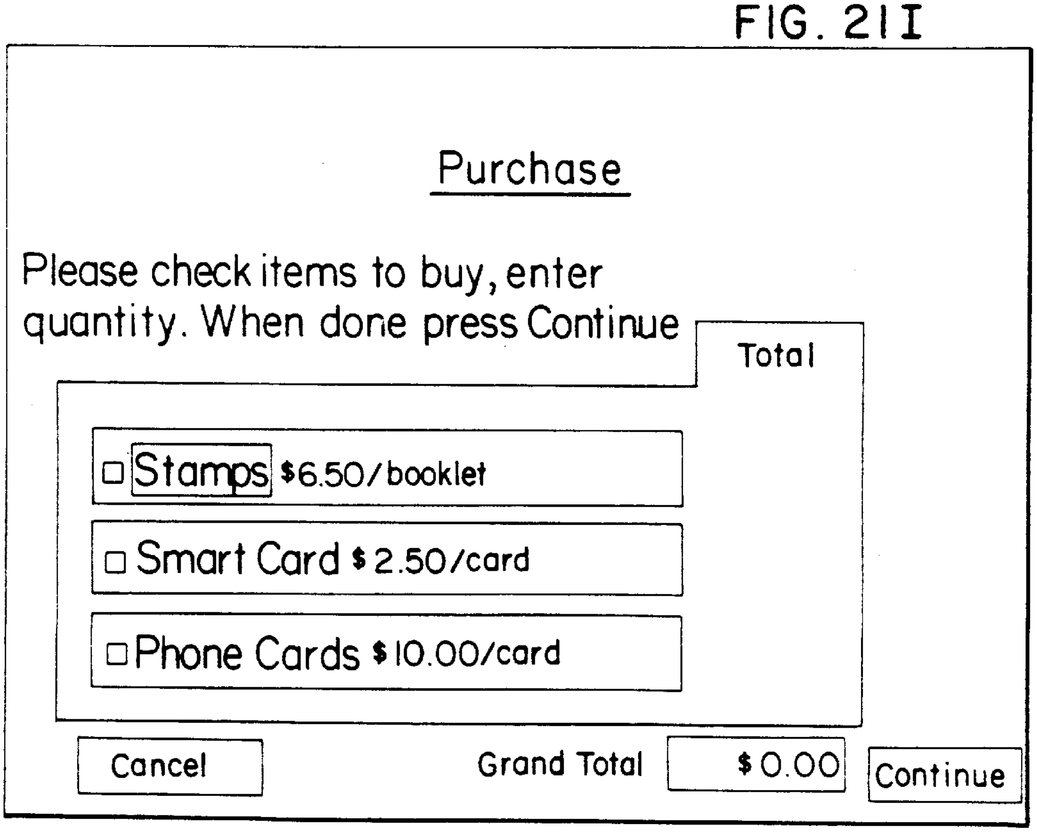
Please Take Your Merchandise
Please take your receipt
Thank you....
Purchase
Please check items to buy, enter quantity. When done press Continue
Total
☐ Stamps $6.50/booklet
☐ Smart Card $2.50/card
☐ Phone Cards $10.00/card
Cancel　　　Grand Total　$0.00　Continue

AUTOMATED BANKING SYSTEM FOR DISPENSING MONEY ORDERS, WIRE TRANSFER AND BILL PAYMENT

BACKGROUND OF THE INVENTION

This invention relates to automated banking systems and machines including those which employ or are an improvement over automatic teller machines (ATMs). ATMs are widely available and receive a considerable amount of usage, particularly on weekends, for dispensing cash. For instance, it is not unusual for an ATM to dispense $250,000 worth of cash in the course of a single weekend. The ATM user is provided with an ATM card as well as a personal identification number (PIN) or password, so that if the card is stolen or lost, the finder of the card will not be able to use it to withdraw funds using the ATM card because of the lack of the PIN number. Typically, the ATM user will use the card and PIN number at an ATM to withdraw cash from the user's checking account, savings account or as an advance from a credit card, or transferring money from a savings account to his checking account. In other instances, the ATM user will use the card and PIN number to access the ATM in order to ascertain the user's account balances. In a few instances, some ATMs have an incremental revenue opportunity from the capacity to dispense stamps as an alternative to cash for the user.

Owners of ATMs have found them to be relatively profitable. However, there is a need for increasing the profitability of the ATMs which are principally now used as cash withdrawal machines. Competing with the banks and with ATM machines are local currency exchanges which perform a number of banking type services for their "profiled customers." Profiled customers are those customers who have signed a signature card or who otherwise have identity confirmation information entered into a network of a local currency exchange. These profiled customers are local to the area and are not part of a large area or nationwide network. Often, the currency exchange not only has the profiled customer's signature, but the currency exchange agent often recognizes the customer. Currency exchanges commonly cash a large volume of payroll checks for their customers. The average fee for such a transaction is 1.6% of the amount of the payroll check. This can yield quite substantial revenue when a high volume of payroll checks is being cashed. Currency exchanges compete with the ATM machines by cashing personal checks for their profiled customers. Most often, a currency exchange will not cash a personal check for a non-profiled customer of the exchanges. If the currency exchange assumes the risk and cashes such a check, however, the customer transaction charges are extremely high, e.g., $20.00 or 20% of the value of the check being cashed.

Another large volume transaction type having the potential for large volume for a currency exchange is the issuance of money orders and cashing of money orders. On average, the customer charge for such transactions is about 1.85% of the value of the money order.

Other large revenue generators for currency exchanges are fees collected when customers pay bills for utilities, such as telephone, electric, gas, and water, as well as other bills, such as cable, television or credit card bills. Typically, there is a $0.60 per bill service charge to accept payment of a utility bill or credit card bill or the like in a currency exchange. The currency exchanges operate under contract with the local utilities and/or credit card companies to provide such a service.

While currency exchanges are relatively profitable, one significant expense cost of operation is due to employee theft of currency. Also, from time to time, employees make mistakes when cashing checks or money orders, or when issuing money orders. Another shortcoming of currency exchanges as opposed to ATM machines is that the exchanges are open only for limited hours, while the ATM machines are generally available for transaction processing 24 hours each day. In many instances, people prefer not to let others at a currency exchange or bank have any knowledge of their personal financial affairs and would prefer to use the ATM machines, rather than currency exchanges if the ATM machines provided some or all of the banking type services now provided by the currency exchanges.

Often currency exchanges are used by local residents who do not have a checking or savings account with a local bank, and who do not use the ATM machines or have an ATM card. Thus, there is an opportunity to acquire new customers for automatic banking machines if the machines will have many of the functions performed by a currency exchange or of a full service bank, such as cashing checks or money orders.

Wire transfer of funds is another banking function which is not generally available to the general public. Usually bank wire transfers are for very large amounts of money. Rather than going to a bank to wire transfer money, most individuals, as opposed to businesses, commonly wire money through other companies such as Western Union or through the American Express Company. Wire transfer costs for consumer-related transactions are relatively high. There is an average cost of between $13.00 to send a minimum of $200.00 by wire and about $200.00 to send $5,000.00 by wire. There are many times when people are traveling or when they have a child at college when it would be desirable to be able to transfer money by wire to their child's account so that the child has immediate access to the money. If such a wire transfer service were available for use in an automated banking machine, it would provide a relatively inexpensive method of wire transfer for individuals.

A new opportunity available to full service banks and to currency exchanges is participation in the United States Federal Government's Electronic Benefit Transfer Program (EBTP). The program will distribute smart cards for use by recipients of Social Security, Veteran's or welfare benefits. Payments for such benefits may total as much as one-half trillion dollars per year. Clients who have EBTP cards are already in the government's network. These smart cards are intended to replace the food stamps, among other things, whose use may lead to the clients being embarrassed. The currency exchanges and the full service banks will be receiving a transactional charge when writing an increase in balance onto the smart card. Also, the service provider will be charging the smart card user a fee for each transaction, for instance, when the smart card's balance is decreased as it is being used to pay for food, a utility bill, etc. This represents a large volume usage that could be available to appropriate electronic automated banking machines if they offered bill paying services and sale of items such as telephone cards, lottery tickets, and the like.

Owners of ATMs are beginning to take advantage of such incremental revenue opportunities, e.g., by selling stamps via the ATM machine. This allows the owner of the ATM to gain more revenue from it. For example, end user items such as theater tickets, lottery tickets or stamps can be sold from dispensers in an ATM machine. Because the purchase of end-user items is less susceptible to fraud, they do not require the additional security for transactions as cashing checks or money orders.

A number of security problems arise with the addition to ATMs of functions performed by full service banks and currency exchanges, such as cashing checks and money orders. The foremost problem is integrity of the document being exchanged for cash, in particular, verification of signatures on checks or money orders being cashed. Also, the ability to read various types of documents and to provide the user with a large number of payment methods requires a relatively sophisticated machine beyond that of current ATMs on the market and in widespread use by the general public. The problem with checks is not only the signature verification of hard-to-read handwriting, but also reading the amount, usually written in cursive, on a legal line of the check. In addition, the check has a second line which is the courtesy amount recognition line ("CAR") which is written in numerals representing the value of the check. Most checks also identify the bank and the maker's account in magnetic ink.

Another consideration for transactions such as cashing checks, paying bills, or other like things from a remote banking machine is the need to record the transactions and to leave an audit trail for later manual review, if required, of the transactions.

A semi-automated system has been proposed to aid in the cashing of checks and which reduces the access of the teller to the money. This proposed system would require the user to operate the machine and negotiate the check while in the electronic presence of a teller, who being satisfied that the check should be cashed, then verifies the cashing opportunity and operates the machine to dispense automatically the funds to the machine user. Of course, such a machine requires the attendance and the presence of the teller, and therefore, is still not a fully automated system for cashing checks.

Among some of the mechanical problems that have been experienced with the remote ATM-type machines is that of providing change in coins. Already, over a single weekend, ATMs are being severely taxed often completely emptied of their contents, and they do not have changemakers. The addition of a coin changemaker adds considerable expense and maintenance problems to the machine to provide the exact coin change to the user who is cashing a check or performing some other function.

Another problem with providing a commercially practical automated banking machine is that of the time needed for the transactions. Preferably, the transactions should be relatively brief and simple so that a minimal number of operator actions, such as touch screen pushes or keystrokes, are required for each transaction. If a particular transaction takes more than a minute or two, the system would probably be too slow to adequately service a line of people waiting to use the machine at a busy time on a weekend. Also, if the machine offers a large number of transactions like those of a full service bank or a currency exchange, the machine should provide a wide range of funds delivery or payment options to the user so that the payment can be made by cash, credit card, smart card, or withdrawal from a checking or savings account.

There is a need for an automatic banking machine which includes an ATM-like machine that performs and allows a number of service options, such as for example the withdrawing of cash, the depositing of cash, the cashing of a check, the cashing of a money order, the buying of a money order, the transferring of funds by wire, paying a bill and purchasing of end user items.

SUMMARY OF THE INVENTION

In accordance with the present invention, there is provided an automated banking machine system, which performs the usual ATM functions but which additionally issues money orders for the user without the presence or the assistance of a teller. Additionally, the preferred and illustrated, automated banking machine system allows the depositing of cash into the machine and provides additional functions, such as transferring money by wire, paying bills or purchasing end user items from the machine.

In accordance with another aspect of the invention, the automated banking system machine recognizes the cash inserted into the machine, totals it, and provides communication via a modem or the like connected to a banking network to pay a bill or to purchase of a money order. The user will write the amount into the money order blank within the machine. After having been written, the machine will dispense the money order to the user. The automated method and apparatus provides for the cash purchase by the user of items being dispensed from the machine such as lottery tickets, theater tickets, postage stamps or the like.

In accordance with another aspect of the invention, the method and apparatus provide for the wire transfer of funds to a transferee over a banking network. In order to carry out the wire transfer, the user enters the name of the bank to which the wire transfer is to made and the account number of the person who is to receive the wire transfer. After providing payment for the funds to be wire transferred, the wire transfer is communicated through a modem of the machine to the banking network and thence to the recipient's account in the receiving bank. Preferably, a receipt is issued to the user showing the sum being wire transferred as well as the associated transaction cost. In the preferred embodiment of the invention, the payment for the wire transfer can be by cash, a credit card, a smart card or from an account of the user.

In accordance with a still further embodiment of the invention, the automated banking machine and apparatus allows the payment of invoices or bills owed by the user. After having been qualified as a user of the automated banking machine, the customer will see a display of the selection of bills that are payable through the machine. The user selects the type of bill to be paid and also selects from the display, one of several methods of payment, including the payment by cash. The bill to be paid is inserted into the machine where it is read along with the identity and account number of the bill payee. The reading of the amount and the identification of the payor may be difficult because of the many different formats of such bills. The machine automatically communicates over a modem to a bill payment network. The bill is stored in a bin, and a transaction tag is provided for the bill payment transaction. Preferably, the method of payment includes paying by cash, credit card, smart card or from the user's account. In the preferred embodiment of the invention, the user may pay several bills, and the total for each bill and its associated transactional charges is accumulated. Finally, after payment, a receipt is generated showing the bills paid, the transactional charges, and the total expense incurred by the user in the payment of these bills.

It will be seen from the foregoing that the preferred and illustrated embodiment of the invention provides increased revenue opportunities for owners of the automated banking machine to perform many of the services performed by a currency exchange or by a bank while charging a transactional fee for each transaction. Transaction charges may be made for a withdrawal from the user's account, the payment of a transaction, a deposit into the user's account, cashing of a check or money order, transfer of funds by wire, paying bills, purchasing end user items such as theater tickets, lottery tickets, etc.

Another aspect of the present invention is to provide an automated banking system which does not need to dispense coins or small denomination change to the user. Dispensing coins adds complexity and time as well as frequent maintenance problems and service problems associated with keeping the coin changer apparatus functioning properly and filled with coins. The shutting down of the coin operation due to an empty or broken dispenser would likely result in the automatic banking machine being out-of-service despite being able to perform other non-charge producing transactions. Rather than dispensing coin change, the machine of the present invention will transfer the amount of change onto a credit card or a smart card balance and electronically dispense the same to the user by storing the credit on the stored card balance. Alternatively the machine will deposit the change balance into the user's account. Thus, the necessity for storing and dispensing bulky coin-type change is avoided.

Also, in order to limit the amount of servicing that is needed, the preferred machine need not be provided with one dollar bills. The lowest dispensable denomination would be, for example, five dollars. Preferably, the cash bins within the machine are provided with $5.00 and $20.00 bills only, so that the amount that can be dispensed is sufficient for a weekend without being replenished in most instances.

BRIEF DESCRIPTION OF THE DRAWINGS

FIG. 8A shows the screen with the instruction to PLEASE INSERT YOUR CARD;

FIG. 8B shows a screen prompting entry of a user's password;

FIG. 8C shows the progression of the password verification operation;

FIG. 8D shows the screen when an incorrect password has been entered;

FIG. 8E shows that the password is not correct and that the card is being retained;

FIG. 8F shows a screen display prompting the user to make a touch screen selection of the language in which the transactions are to be processed;

FIG. 9 shows on the screen the money exchange or transactions options available for the user;

FIG. 10 is a screen prompting a checking or savings step as part of a transaction;

FIG. 11 is a screen showing different amounts for withdrawal from checking;

FIG. 13A is a screen showing the prompt for the source of a deposit into checking;

FIG. 13B shows a screen providing for entry of the amount of a check to be deposited;

FIG. 13C is a screen showing a prompt to endorse or sign the back of the check;

FIG. 13D shows the screen with a message of showing progress in confirming;

FIG. 13E shows a screen prompting the user to take a transaction receipt;

FIG. 13F is a screen with respect to a transaction for a deposit into saving;

FIG. 13I is a screen showing the amount of cash deposited;

FIG. 13J shows a request to deposit the cash into the cash acceptor slot;

FIG. 15A is a screen that shows an inquiry to the user requesting a decision as to making a further transaction;

FIG. 15B is a screen display of a touch screen version of the screen display shown in FIG. 15A;

FIG. 16B shows a screen for requesting the manual entry of the amount of the check to be cashed;

FIG. 16C requests the signing of the back of the check;

FIG. 16D is a screen showing a request to re-insert the inverted check;

FIG. 16DD is a screen requesting the user to re-enter the check amount;

FIG. 16E shows a bar graph of the progress with respect to the reading of the check;

FIG. 16F shows a check cashing and the amount that is available to be received in cash;

FIG. 16G shows the completion of the check cashing and the receipt for the amount deposited to the user's account;

FIG. 16H is a touch screen display version of the screen shown in FIG. 16B;

FIG. 17A is a screen shown to the user when cashing a money order;

FIG. 17B requests the signing of the back of the money order;

FIG. 18 shows the screen used when typing in the name of the payee with respect to a money order being purchased;

FIG. 18A shows the amount of the money order being purchased;

FIGS. 18C and 18D show the method of payment and the total transaction at the screen that the money order is being printed and the request to the user to take her receipt;

FIG. 19 is a screen display for wiring money;

FIG. 19A shows the account to which the money is to be wired and the name of the bank having the account;

FIG. 19B shows and requests the entry of the Federal routing code;

FIG. 19C shows the account number being added;

FIG. 20 is a screen showing a number of bills that can be paid through the apparatus;

FIG. 20A shows a telephone bill, service charge and total amount to be charged for payment of the telephone bill;

FIG. 20B shows a screen requesting entry of the telephone bill into the scanner slot;

FIG. 20C shows the selection of a gas bill for payment as well as a telephone bill;

FIG. 20D requests insertion of the gas bill into the scanner slot;

FIG. 20E shows the payment for a credit card bill;

FIG. 20F shows the amount of payment with respect to the telephone, gas and credit card bills; and the request for the method of payment;

FIG. 20G shows the screen when the bill is to paid by credit card;

FIG. 20I shows a screen confirming payment of the bills;

FIG. 20J is a touch screen display version of the screen shown in FIG. 20;

FIG. 21B shows a screen displaying request for a purchase of three smart cards and one telephone card;

FIG. 21C shows the total transaction and requests a selection of the method of payment;

FIG. 21D shows a screen showing a $25.00 transaction and showing how much has been inserted to pay for the transaction;

FIG. 21E shows that $20.00 has been paid;

FIG. 21F shows that $21.00 has been paid;

FIG. 21G shows that $24.00 has been paid;

FIG. 21H shows that the total of $25.00 has been paid and shows a message on the screen to take the merchandise;

FIG. 21I is a touch screen display version of the screen shown in FIG. 21;

DETAILED DESCRIPTION OF THE PREFERRED EMBODIMENTS

Figure 3:
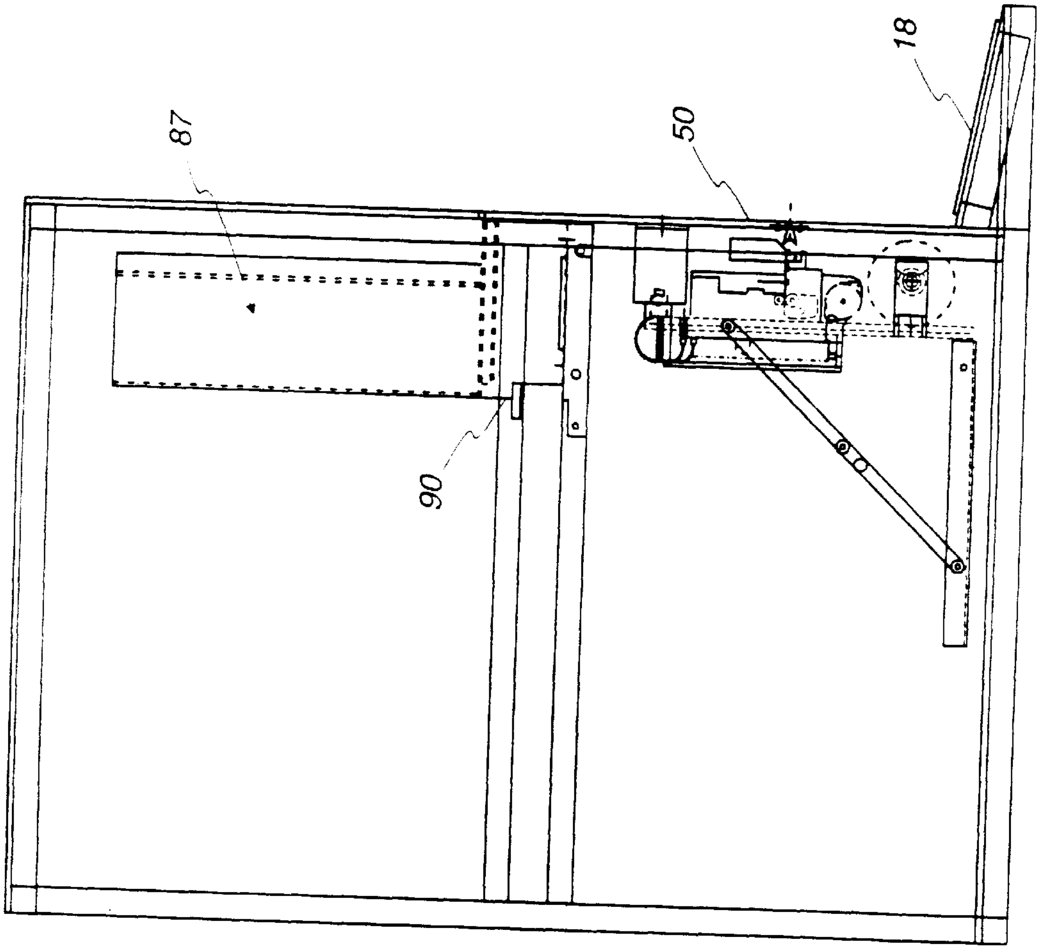
FIG. 3 is a left side view of one section of the apparatus shown in FIG. 1.

As shown in the drawings for purposes of illustration, the invention is embodied in an automated banking system that includes an apparatus 10 having a housing 12 for housing the components of the apparatus which are to receive an ATM card which can be inserted through an insert, slot or opening 14 in a front wall 16 of the housing. The insert slot 14 will accept the usual ATM card, credit cards, IC cards or smart cards. The card slot 14 is located immediately above a user keyboard 18 and below a user display 20 comprising a touch screen of the type sold by Dyna-Pro under its Model No. DTFP 95633. The user keyboard 18 supplies command signals to a microcomputer 21, in this embodiment a 133 Mhz Pentium-based personal computer having a 2.1 gigabyte hard disk drive for storing software, a 32 megabyte random access memory for storing instructions and operands, a 133 Mhz Pentium microprocessor, an ISA bus, a PCI bus, a serial interface, and a parallel interface. (FIG. 3). The microcomputer 21 executes application software under Windows 95, which among other things, responds to keystrokes on the user keyboard 18, and signals from other input devices as set forth below. The microcomputer 21 drives the output display 20 in response to the software it is executing and the various signals it receives from the input devices connected to transfer signals to it.

Located immediately behind the insert card slot 14 is a magnetic card reader 22 (FIG. 4) which will read the ATM card, send signals to the microcomputer 21 through a serial communication card 21*a*, and immediately cause initialization, via the microcomputer 21, of all hardware and software parameters for an operation. The touch screen 20 is provided to assist the user in identifying for the machine the area of the image occupied by the account number and dollar amount of a bill, as will be explained. The illustrated keyboard 18 is a very tough, vandal-resistant, industrial keyboard, such as the Model 300 manufactured by Everswitch USA of Silver Springs, Md. The preferred display 20 is a flat LCD display panel sold by Sony Corporation. The keyboard and display panels are selected because they are considered to be tough, strong, easy-to-use, and difficult for thieves or criminals to vandalize or to misuse to illicitly obtain funds from the machine. A backup storage device 23 connected to the computer 21 provides further security for the software and data stored on the hard drive.

Figure 8:
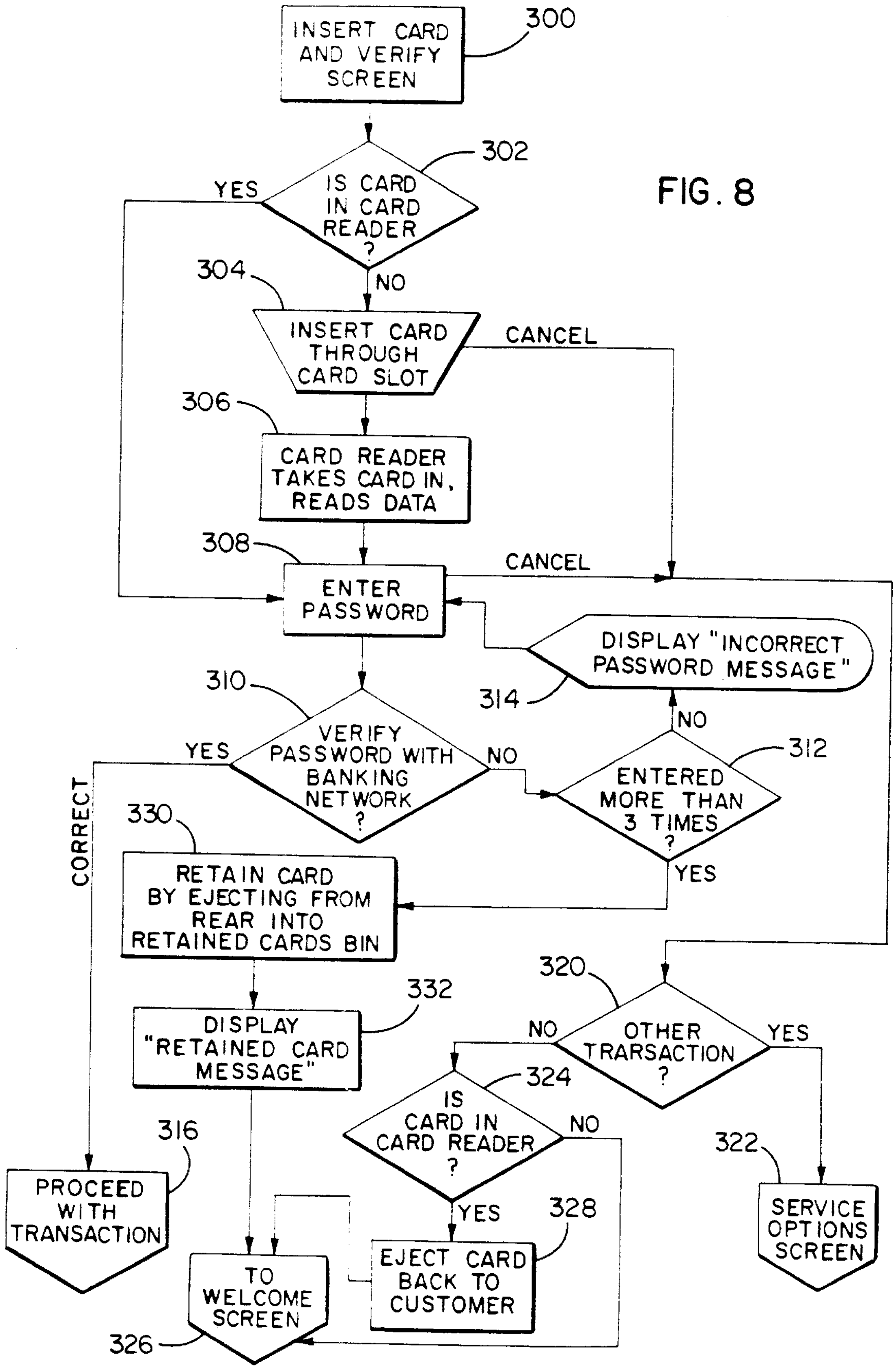
FIG. 8 is a flow chart for showing the operations occurring after insertion of the card and for verification.

As shown in connection with the flow chart of FIG. 8 entitled "insert card and verify screen", the user will see on the screen display 20 the welcome message and a prompt to insert the banking (or ATM) card and to verify the password with the banking network. The user will be prompted to select English or Spanish as the language for the transactions as shown in FIG. 8F. The user will then touch the screen display to select English or Spanish for the transaction language.

In the card insert routine 300 a test is made in a step 302 to determine whether the magnetic striped identification card has been placed in the card reader. If it has not, control is transferred to a step 304 prompting the user to insert the card through the card slot. The card is then read in a step 306 and the user is prompted and enters a password in a step 308. A test is made in a step 310 to determine whether the password is verifiable with the banking network when communicated over the modem 29. If the password is not, a test is made in a step 312 allowing the password to be entered three more times. Assuming three unsuccessful tries in a step 314, the incorrect password message is displayed and process loops back to the step 308. If the password is found to be correct after step 310 the transaction is proceeded with in a step 316. If as a result of step 308 the transaction is cancelled, control is transferred to a step 320 testing for whether another transaction has been requested. This may be done by screen prompts to be answered by the user as exemplified by the screen displays shown in FIGS. 15A and 15B. The selection may be made by keypads 26 and 27, as shown in FIG. 15A or by touch screen contact with the appropriately labelled portion of the screen display shown in FIG. 15B. If it is, a service option screen 322 is displayed. If it is not, a test is made in step 324 to determine whether the card is in the card reader. If the card reader does not have a card in it the welcome screen is displayed in a step 326. If the card is in the card reader it is ejected back to the customer in a step 328. In the event that the password is entered more than three times control is transferred to a step 330 causing the card to be eaten or retained and placed in a card bin. In a step 332 the message is displayed on the touch screen that the card has been retained and the touch screen after that displays the welcome screen in the step 326.

The display shown in FIG. 8A prompts the user to insert the card. After the insertion of the card, the display will prompt the user to please enter the PIN or password number, as shown in FIG. 8B. The processing of the entered password is shown in FIG. 8C. If an incorrect password has been used with the card, then the screen display will display, as shown in FIG. 8D, the phrase "incorrect password", and prompt the user to "please try again". If the subsequent or second password is incorrect, the machine retains the card and the screen display will show on its face, as shown in FIG. 8E, the statement that there still is an incorrect password, and that the card is being retained. The card has been "eaten" by the machine. The card can be retrieved only by contacting the financial institution owning the machine. Having verified the card and having verified the password or PIN number with the banking network over a modem 29 or the like, the machine 10 is ready to proceed with a transaction. The modem 29 communicates with the computer 21 through the serial interface 21*a* to which it is connected.

The user display screen 20 will then display the transaction options available to the user, such as those shown in FIG. 9 which include 1) withdraw; 2) deposit; 3) cash check; 4) cash money order; 5) buy money order; 6) wire transfer; 7) bill payments; 8) purchase (lottery tickets, stamps and telephone cards). The display shown in FIG. 9 will be on the panel display 20 and adjacent a pair of flanking additional keypads 26 and 27 (FIGS. 1 and 6), which have arrow keys which are aligned with these options 1–8. That is, the pressing of the arrow key 26*a* opposite the number "1)" "WITHDRAW" on the screen 20 will initiate a withdrawal. Whereas, the operation of the second arrow key 27*a* in the right hand bank of keys will initiate a "BUY MONEY ORDER" operation, to be described hereinafter.

Figure 11A:
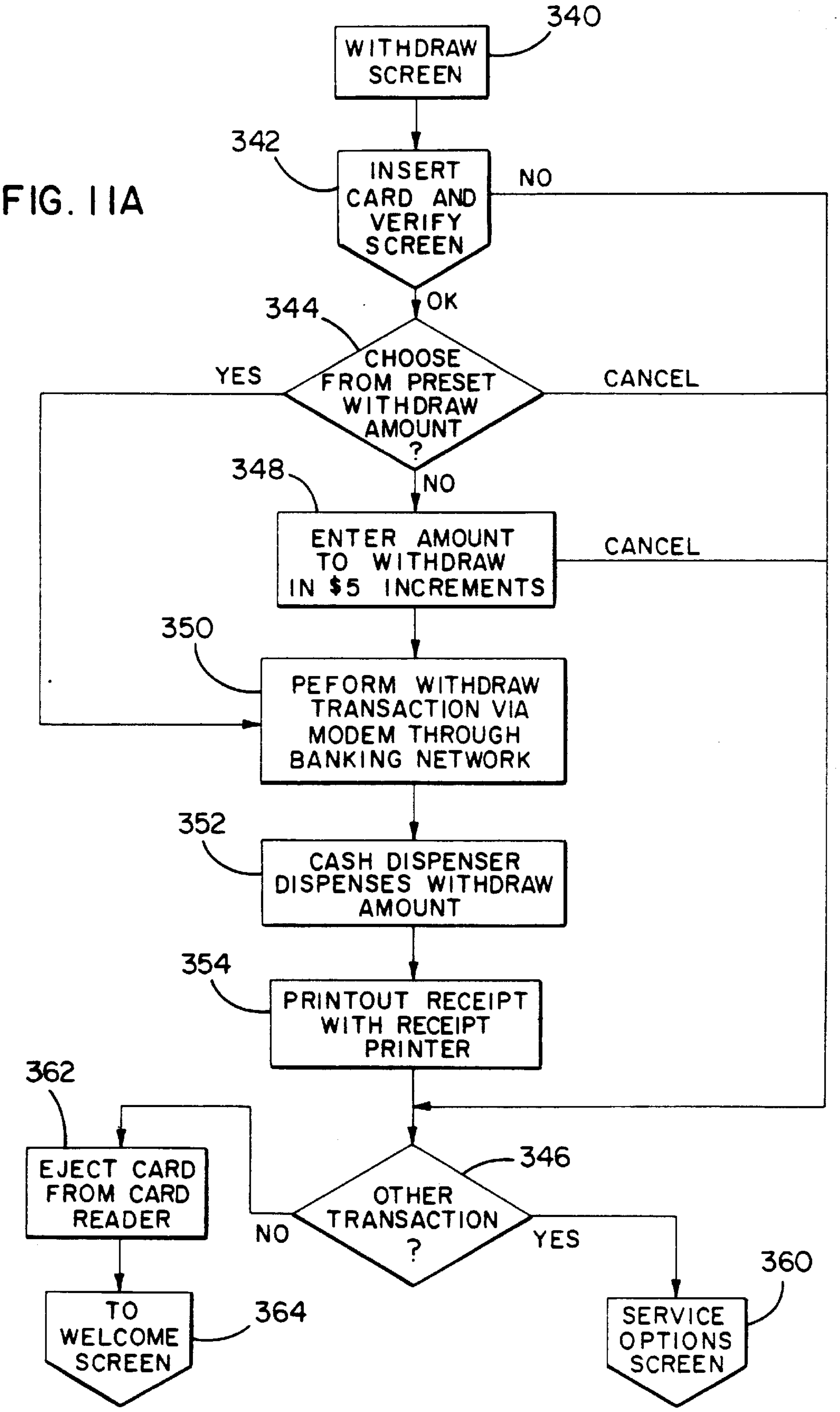
FIG. 11A is a flow chart showing the operations for a withdrawal transaction.

Assuming the user has selected the "1)" withdrawal option by depressing the arrow key 26*a* opposite number "1) WITHDRAW", the screen display 20 will then display a request to an account for a withdrawal, i.e., from a checking or savings account. This is shown in FIG. 10 with the display of a "1) CHECKING" and a "2) SAVINGS" on the screen display opposite the arrow keys 26*a* and 26*b*. Assuming that the user wishes to withdraw money from a checking account, the user will press the arrow key 26*a*. The screen display 20 will then show the display of FIG. 11 with the display labeled "WITHDRAW FROM CHECKING" and with the monetary amounts "20", "40", "50", "100", "200" and other listed opposite the selection arrow keys 26*a*–26*c* and 27*a*–27*c*, respectively. By operating one of the particular arrow keys, i.e., the arrow key $20.00 for withdrawal from checking, will signal other positions of the apparatus 10 to perform a number of operations shown on the flow chart entitled "WITHDRAW screen" shown in FIG. 11A.

In a step 340 the withdraw screen is engaged and in a step 342 the user is prompted by the screen to insert the card and a verify screen is displayed. If the card is verified control is transferred to a step 344 allowing the user to choose from a present withdrawal amount. If the user chooses to cancel the transaction control is transferred to a step 346 testing for another transaction. If the user chooses not to choose from a preset withdrawal amount, the user may enter the withdrawal amount in $5.00 increments in a step 348 or may cancel the transaction and proceed to the other transaction test step 346. Assuming that the withdrawal amount has been entered in $5.00 increments, the withdrawal transaction is performed in a step 350 via checking over the banking network. In a step 352 the cash dispenser dispenses the withdrawn amount and in a step 354 the receipt is printed by the receipt printed. Control is then transferred to the step 346 testing for additional transaction prompts. If there is, the service option screen is then displayed in a step 360. If not, the card is ejected from the card reader in a step 362 and the welcome screen is displayed in a step 364.

Figure 24:
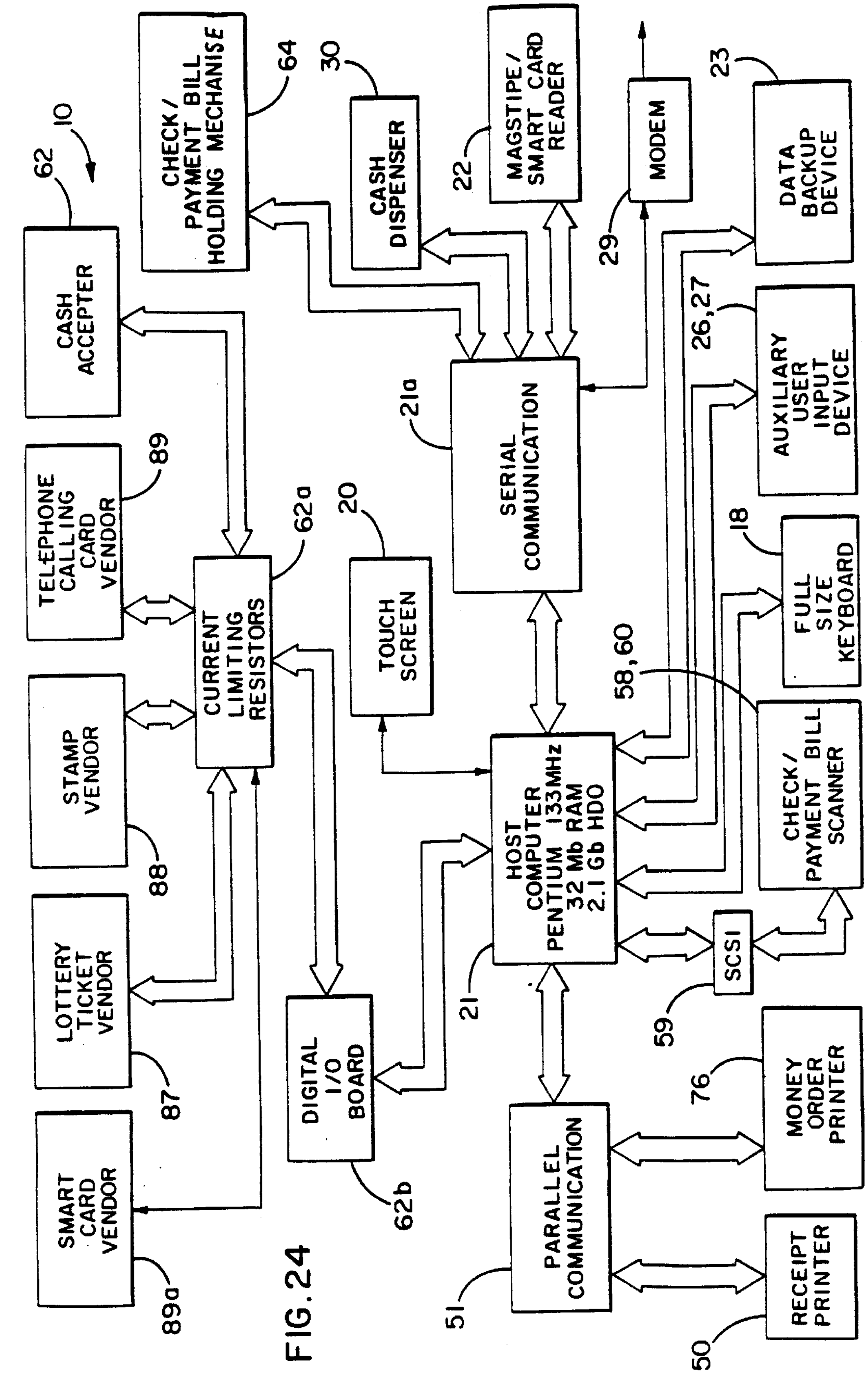
FIG. 24 is a block diagram of the apparatus shown in FIG. 1.

A connection will then be made by the electronics network and modem via the banking network to access the customer's account in the bank; and then there will be an operation of a cash dispenser 30 (FIGS. 1 and 5) to dispense $20.00 in cash. The cash dispenser communicates with the computer 21 through the serial communication device 21*a* to which it is connected, as shown in FIG. 24.

The cash dispenser 30 herein is a typical cash dispenser unit used in an ATM machine. The illustrated cash dispenser is a G & D America, Inc. Model ACD which is made by Giestcke and Debrient America, Inc. The illustrated cash dispenser 30 has four (4) bins. Each bin can hold four hundred notes. The preferred cash dispenser 30 is loaded with four hundred $5.00 notes in one bin. The other three bins are each loaded with four hundred $20.00 notes. Manifestly, more or less bins may be used and also different cash dispensers may be used than that described herein.

Figure 5:
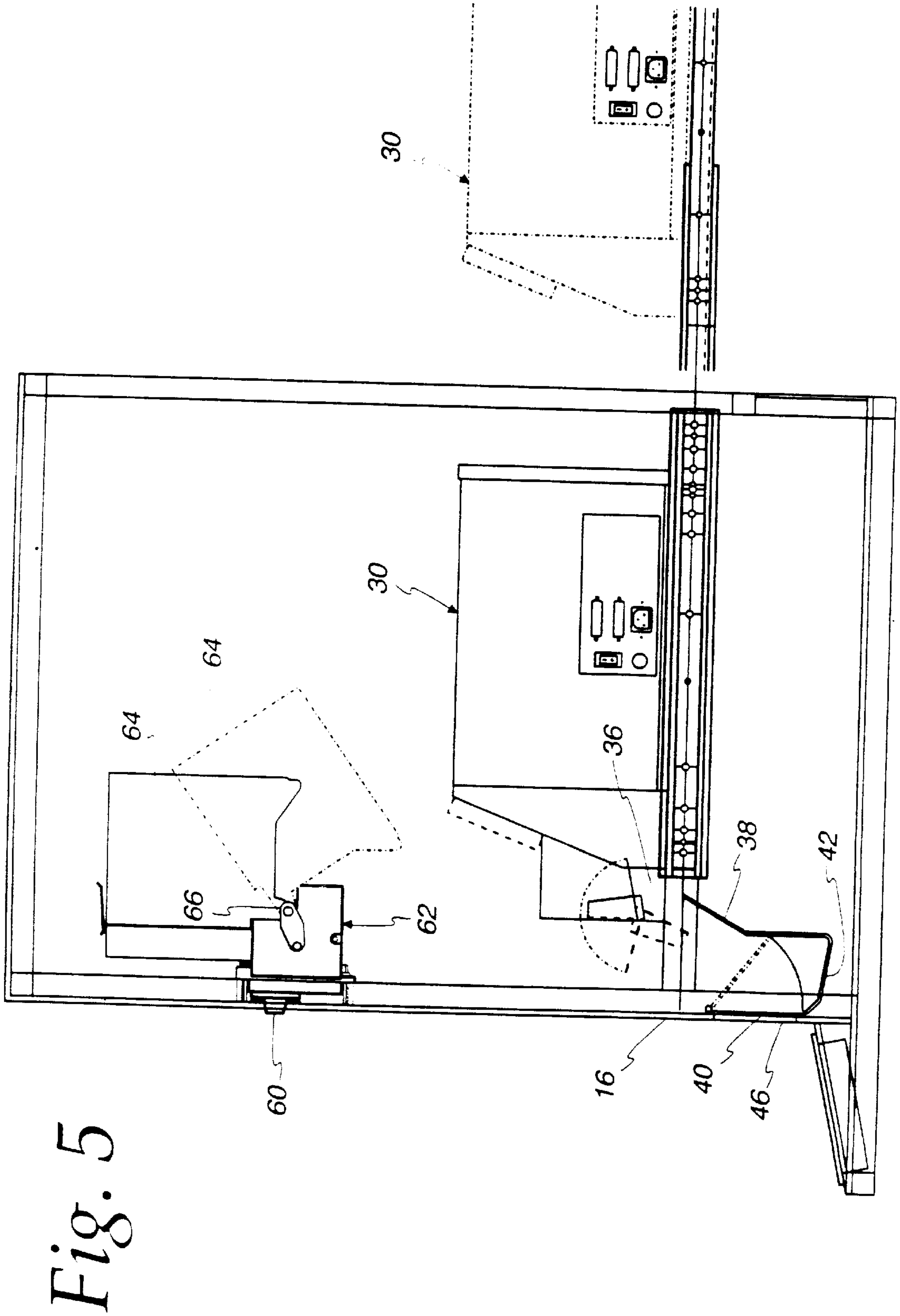
FIG. 5 is a right side view of the right section shown in FIG. 1.
Figure 6:
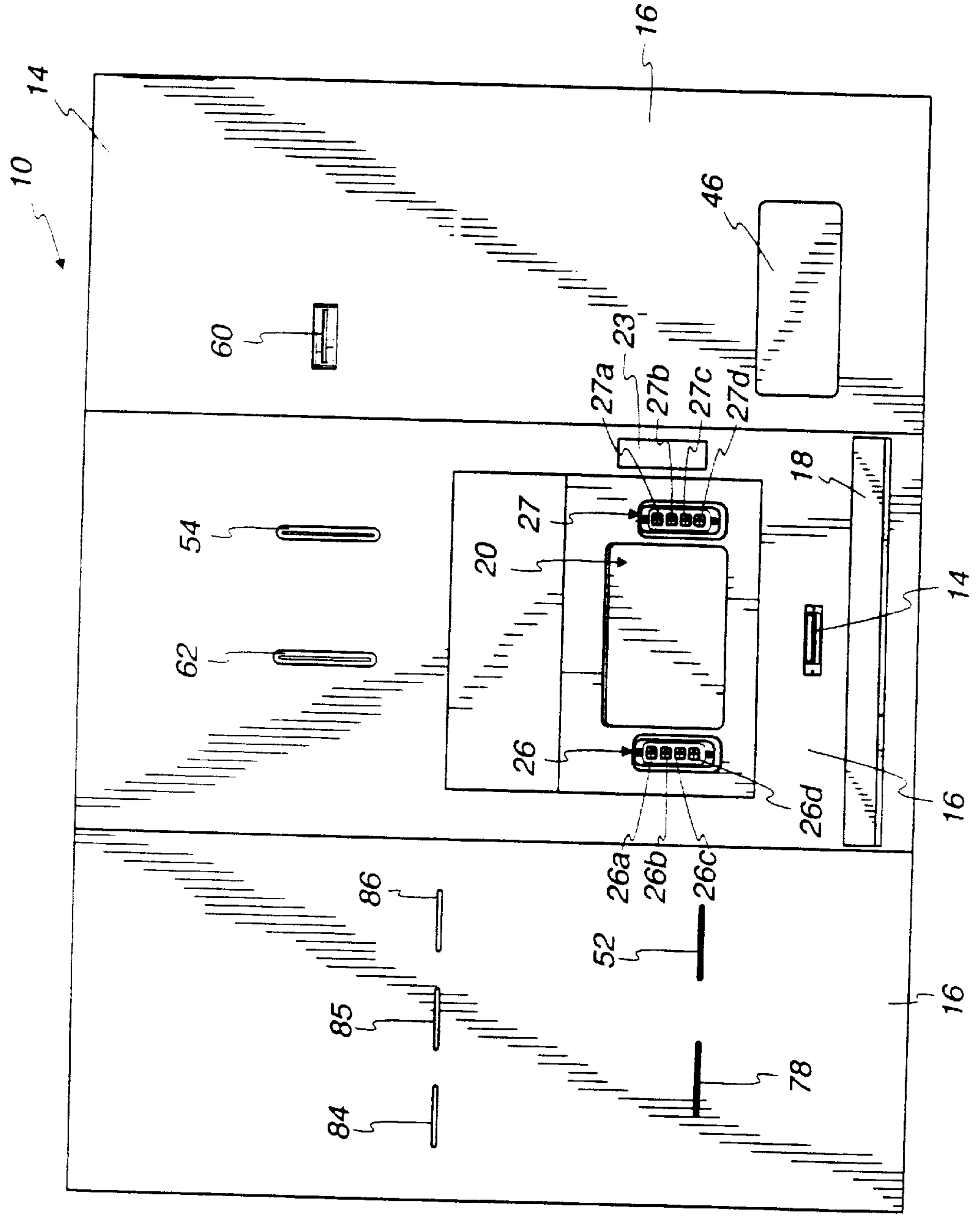
FIG. 6 is a enlarged view of the front of the apparatus of FIG. 1 showing the various insertion slots or receiving slots on the apparatus of FIG. 1 with identifying indicia thereon.

The illustrated and preferred cash dispenser 30, as shown in FIG. 5, is mounted for sliding horizontally to the right for reloading, and is slid back into the position shown in FIG. 5 where it is supported on slide tracks 32 mounted on the housing 12. The cash being dispensed drops through a chute 36 into a hopper 38 having a pivoted axis door 40. The pivoted access door 40 allows the dispensed cash to drop into a dispensed cash bin 42. As shown in FIG. 6, in order to withdraw dispensed cash the user will reach through a cash bin window 46 in the front housing wall 16 and remove the cash from the bin 42. As shown in FIG. 7A, access to the interior of the housing 12 and to the cash dispenser 30 for the replenishing the cash is through a rear housing door 44. The rear housing door 44 has a double security lock 47*a* and 47*b* and a handle 48. With the rear housing door 44 open, the cash bins can be accessed and slid along the tracks 32. The double security lock 47*a* and 47*b* provides security for the cash sections in the normal manner of an ATM.

Figure 12:
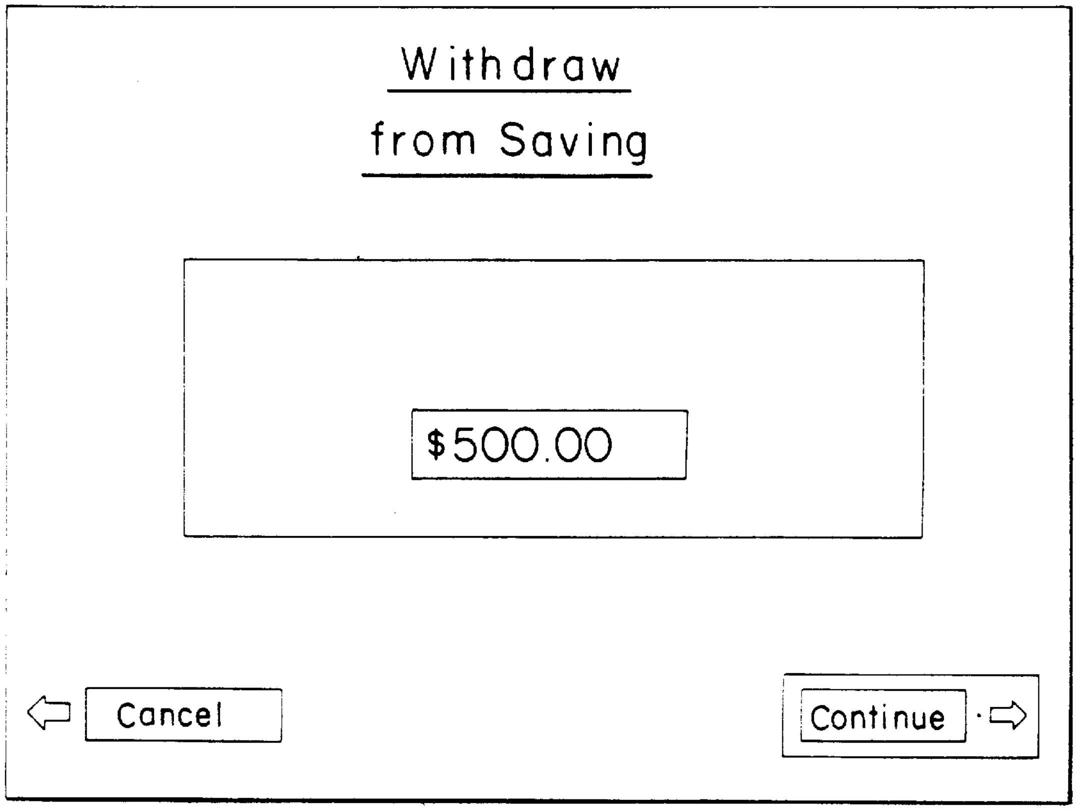
FIG. 12 is a view showing the screen of having an amount prompt for a withdrawing from saving transaction.

If the user had chosen the "SAVINGS ACCOUNT" on the display 20 for withdrawal transaction (shown in FIG. 10), she would have pressed the arrow key 26*b* opposite the "SAVINGS ACCOUNT" prompt on the screen display 20. As shown in FIG. 10, the display 20 would then show the withdrawal from savings screen having the prompt "WITHDRAW FROM SAVINGS." The user is requested to enter the amount in $5.00 increments of the amount to be withdrawn. In this instance, the user operates the keyboard to type in $500.00, the amount to be withdrawn from savings. In such event, the withdraw screen and flow chart shown in FIG. 12 is used to perform the withdrawal from savings by the modem through the banking network, and the cash dispenser 30 is then operated to dispense the cash into the cash bin 42 for removal by the user.

Figure 1:
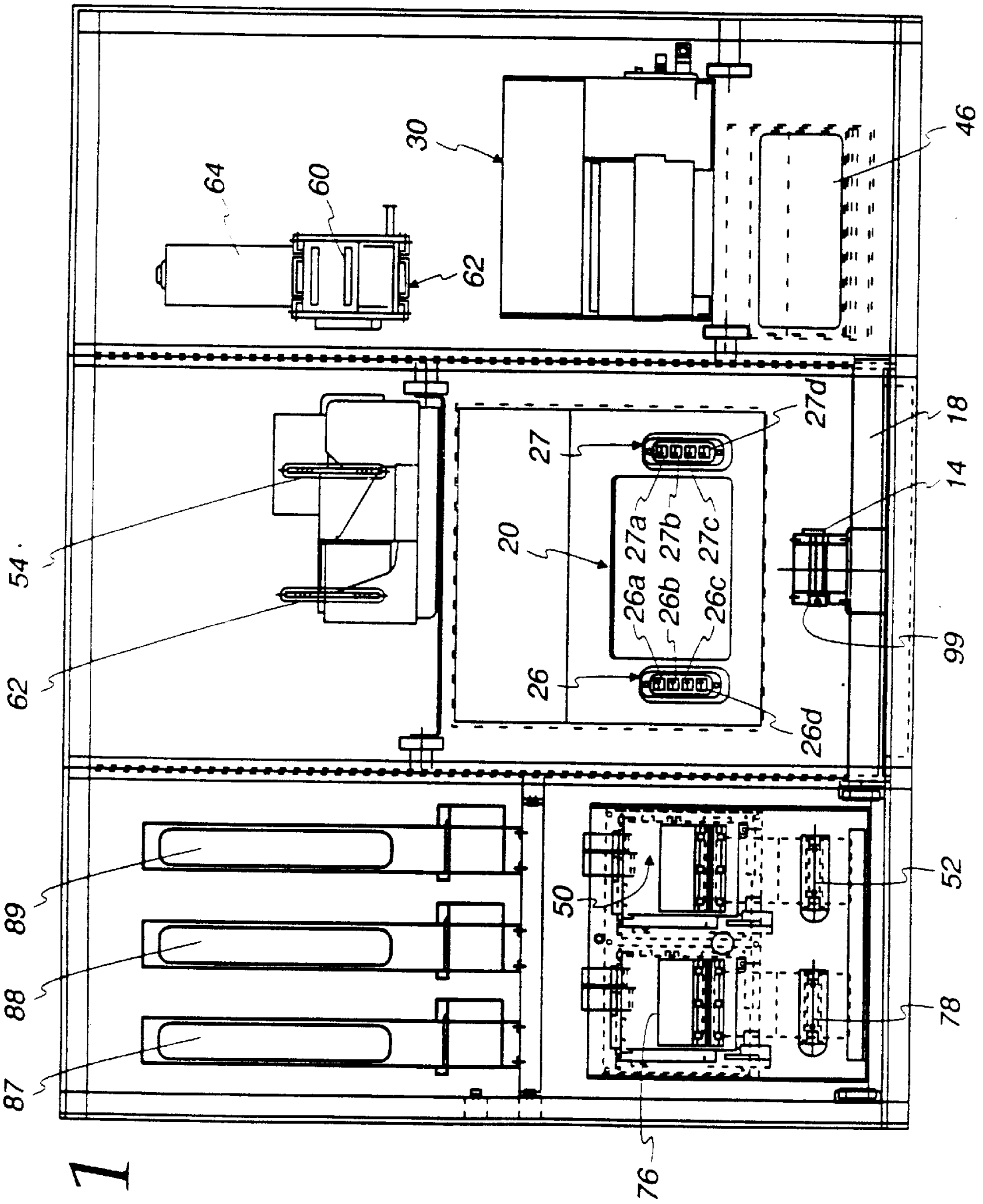
FIG. 1 is a front view of the apparatus embodying the novel features of the invention including a left section, a central section, and a right section.

For either a withdrawal from savings or a withdrawal from checking, it is preferred to print out a receipt with a receipt printer 50 shown in FIGS. 1 and 3. The receipt printer is connected to the computer 21 through a parallel communication device 51. The receipt printer 50 dispenses a printed paper receipt which is fed therefrom and is issued, in this instance, from a receipt dispensing slot 52 in the front wall 16 of housing 12. The user will then receive the receipt which shows not only the amount being withdrawn but also the transaction fee. Thus, the total withdrawn from checking or savings for the transaction will include not only the cash dispensed but also the transaction fee, i.e., $1.00 per transaction.

The illustrated receipt printer 50 is preferably a Model MP342F, manufactured by Star Micronics America, Inc. of Piscataway, N.J. The receipt printer 50 has an automatic cutter for cutting the receipt after printing. Manifestly, other printers or receipt generators may be used than the model described herein.

Figure 9A:
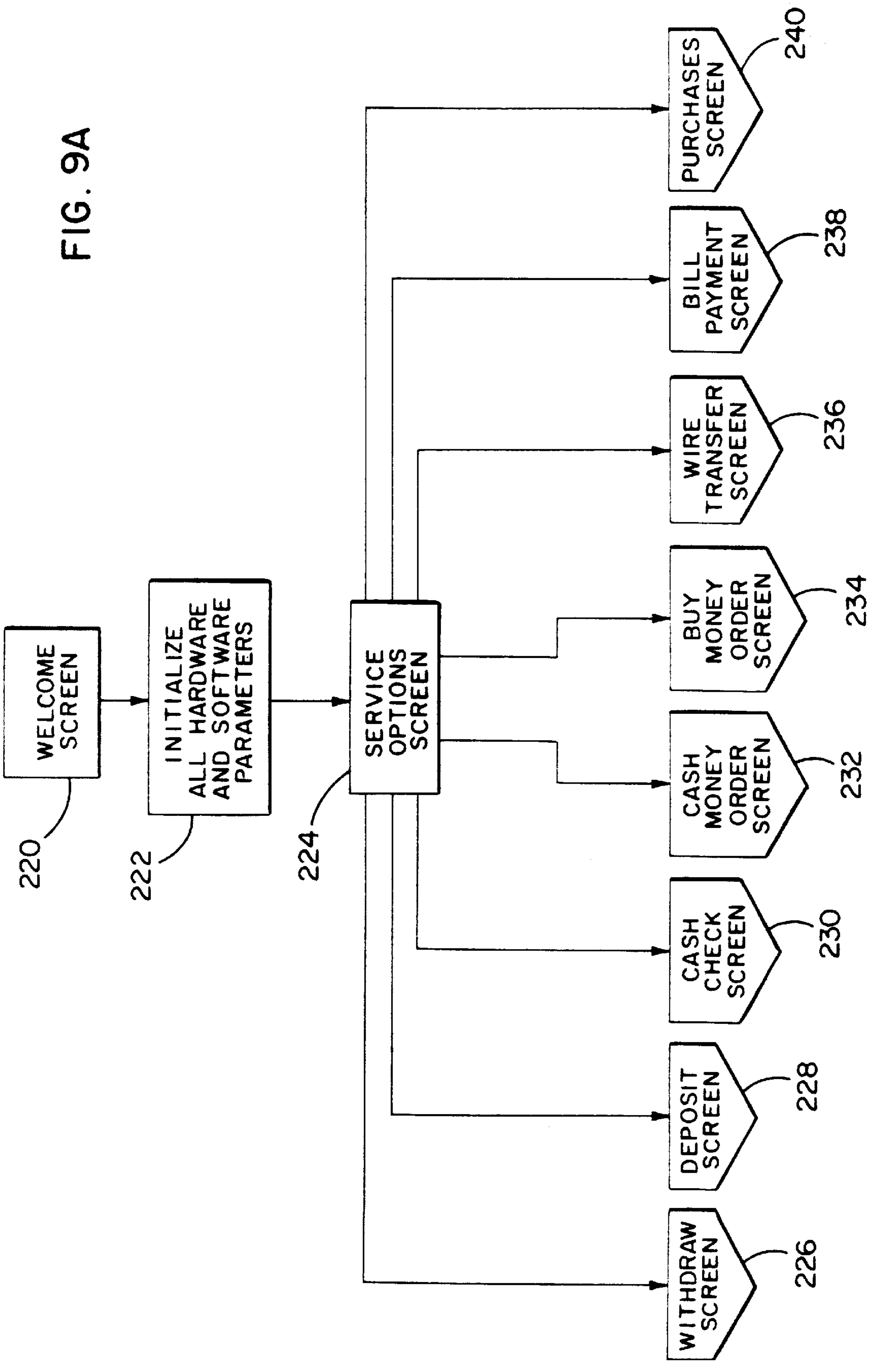
FIG. 9A is a flow chart which shows the initial welcoming and the various options available to the user.

The welcome screen is displayed in a step 220, as shown in FIG. 9A. In a step 222 all hardware and software parameters are initialized. In a step 224 the service options screen is displayed, allowing a choice to enter. The withdrawal screen 226, the deposit screen 228, the check cashing screen 230, the cashing of money order screen 232, buy money order screen 234, the wire transfer screen 236, the bill payment screen 238 or a make purchase screen 240.

Figure 13:
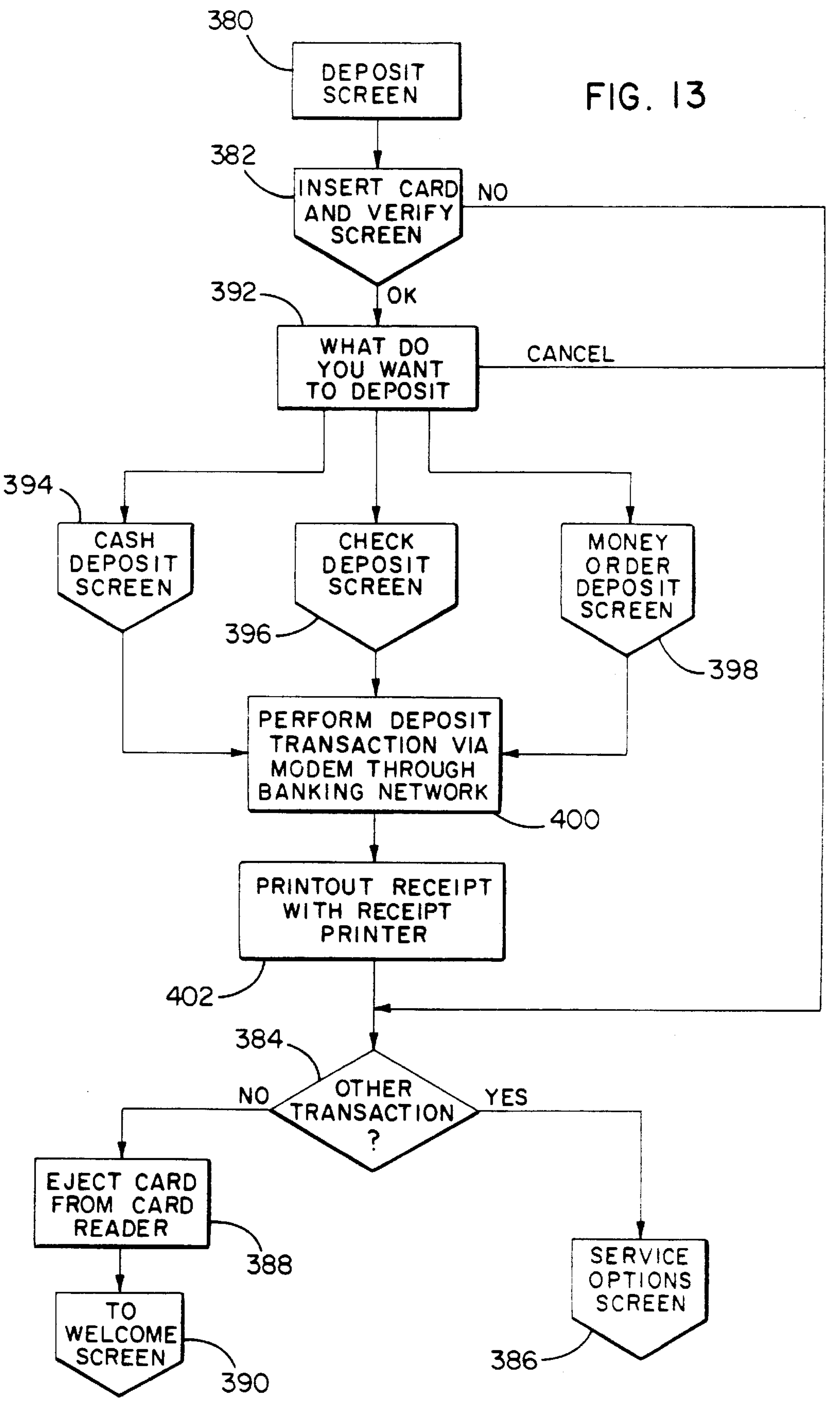
FIG. 13 is a flow chart with respect to making a deposit.

Assuming now that the user had selected the deposit #2 option as shown in FIG. 9, and wanted to deposit into the checking or savings account, the user would have pressed the arrow key 26*b* of the keypad 26, which is opposite "DEPOSIT". This action results in a request whether to deposit into a checking account or into a savings account. Assuming the deposit was made into the checking account, the flow chart of FIG. 13 shows the steps performed by apparatus 10 which will be described in greater detail hereinafter.

The deposit screen, which is displayed in a step 380, requests insertion of the card and displays a verify screen in a step 382. If the card is not inserted control is transferred to a step 384 testing for whether any other transaction is to be carried out. If it is, in a step 386 the service option screen is displayed. If not, in a step 388 the card is ejected and the welcome screen is displayed in a step 390. In the event that the card has been verified a prompt is made to the user in the step 392 as to the type of deposit. If the user elects to cancel the transaction, control is transferred to the step 384. If the user selects "Cash", a cash deposit screen is displayed in a step 394. If they select "Checking", a check deposit screen is displayed in a step 396 and if they choose "Money Order," a money order deposit screen is displayed in a step 398. Control is then transferred to a step 400, causing the selected transaction to be performed by a modem 29 through the banking network. In a step 402 the receipt is printed out and control is then transferred to the other transaction test step 384.

Figure 2:
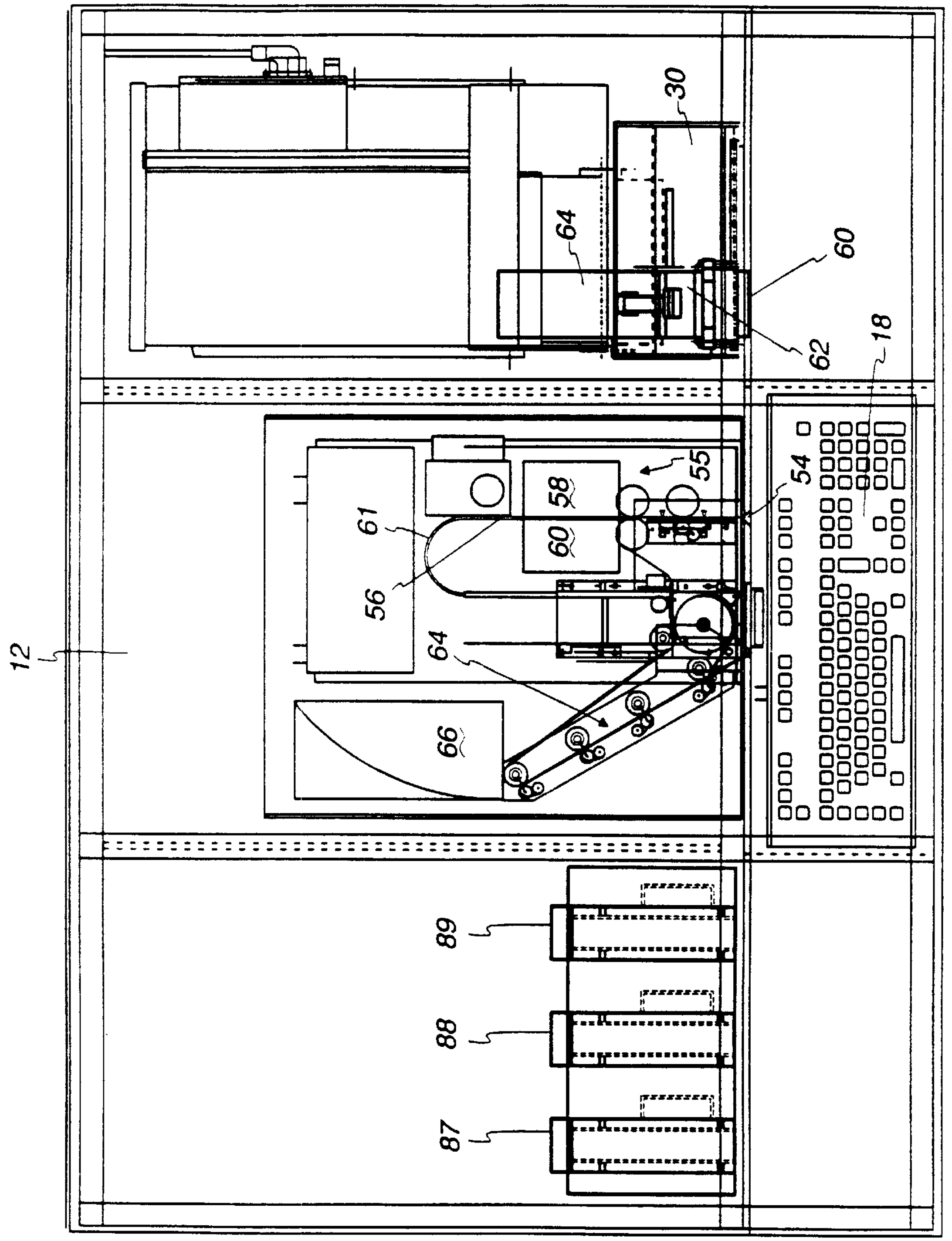
FIG. 2 is a top plan view of the three sections of the machine shown in FIG. 1.
Figure 14:
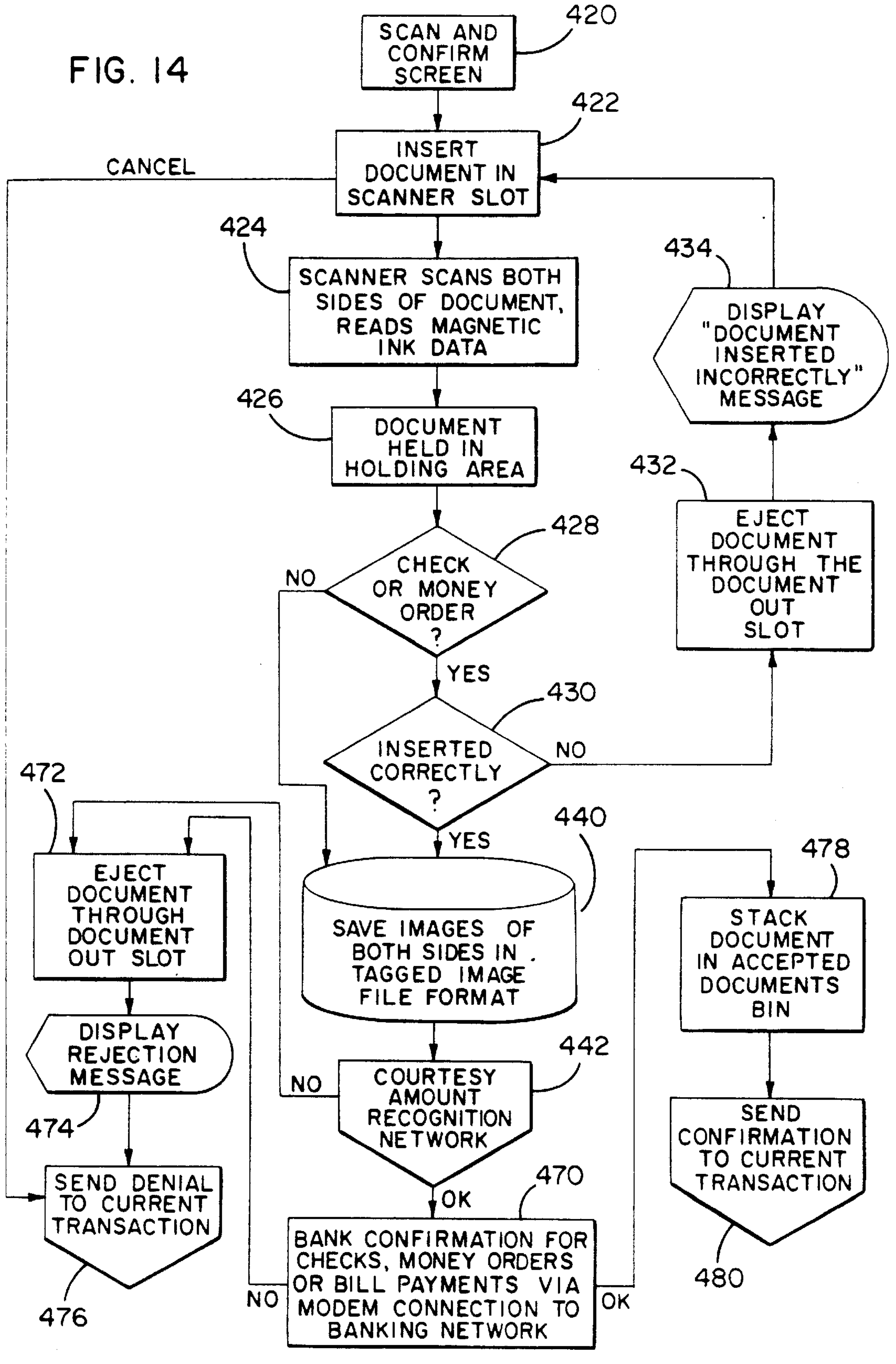
FIG. 14 is a flow chart with respect to the document scanning and verification operations.

The deposit into checking screen display (FIG. 13A) prompts the user with the statement: "WHAT WOULD LIKE TO DEPOSIT IN YOUR CHECKING ACCOUNT 1) cash; 2) check; or 3) money order". Assuming that the user has elected to deposit a check, the check transaction will be selected by pressing the arrow key 26*b* of the keypad 26. As shown in FIG. 13B, a request then will appear on the screen display 20 labeled "DEPOSIT CHECK" opposite a window 52 for the amount of the check. In the window 52, the operator will then use the keyboard 18 to enter the deposit amount of $675.52. In this instance, a service charge in the amount of $1.00 will also be displayed, as shown in FIG. 13B to the user. If the user has not endorsed the check, the user will see, upon entering the amount, will be that shown in FIG. 13C, which will request the user to "sign the back of the check", and "when ready to insert the check into a scanner slot". A scanner slot 54 is located above the user display 20, as shown in FIGS. 1 and 6. In this instance, the check will be inserted vertically. The illustrated slot 54 is approximately 4"×9", and the inserted check will be scanned while it is in this vertical position, as will be described hereinafter. As the check enters the slot 54, it is gripped by feed rollers and moved along a feeding track 56 (FIG. 2). The check feeds directly into and stops at an imaging station 55 where the check is scanned or images of the front and the back sides of the check are captured. A scanning and confirm flow chart is shown at FIG. 14. It will be described in greater detail hereinafter with respect to the software control and operations of the machine. As shown in this flow chart, an optical character recognition (OCR) scanner scans the document. A magnetic ink (MICR) reader reads the magnetic ink data on the check, which will include the bank's identification number as well as the user's checking account number with the bank. Also, while the check is in this stopped position, its legal line will be scanned, and the CAR line will be scanned to verify that the check is for the correct amount, in this instance $675.52. Also, while in the vertical stopped position, it is preferred to have a camera unit 58 and 60 (FIG. 2) disposed on opposite sides to capture images of both sides of the check and connected through a SCSI device 59 to the computer 21. The images are stored on a magnetic recording medium in TIFF format and are provided with a tag so that the image file, as shown in FIG. 14, can be later accessed if so desired.

At the beginning of the scanning operation, the check image is processed to ascertain if the check has been inserted correctly. In the scanning operation 420 the document is inserted in the scanner slot in a step 422. The scanner using the camera 58 and 60 scans both sides of the documents and reads the magnetic ink via a magnetic transducer in a step 424. The document is placed in the holding area in a step 426 and a determination is made in a step 428 as to whether the document is a check or money order on the basis of the presence or absence of the magnetic ink data. A check is also made in a step 430 to determine whether the document is inserted correctly. If it is not, the document is ejected from the document slot in a step 432 and the touch screen displays if the document is inserted incorrectly in a step 434 following which control is transferred back to the step 422. If the document is not a check or money order as determined in a step 428, control is transferred to a step 440 causing both sides of the document to be saved in a tagged image file format. If the document was inserted correctly as tested for in step 430, both sides of the document are saved in a step

Figure 25:
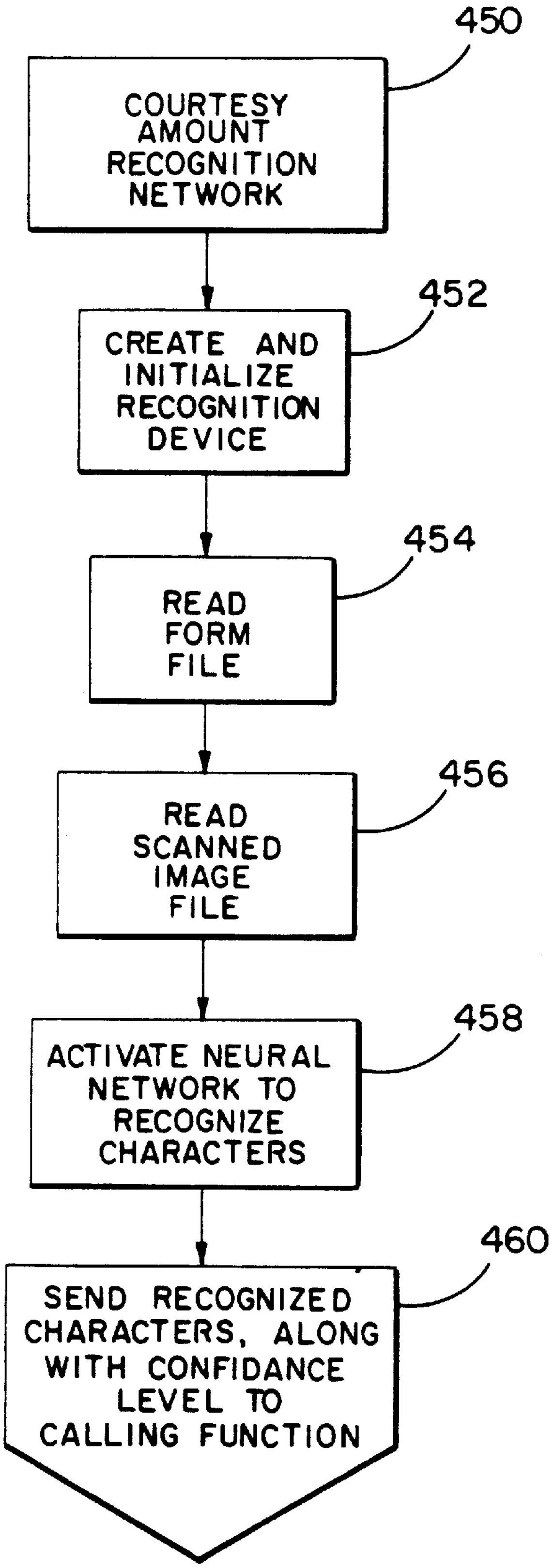
FIG. 25 is a flow chart of a signature verification and character recognition process.

440. In a step 442, the images are analyzed by amount recognition software of the types supplied by Mitek of San Diego, Calif., in particular its Quickstrokes Version 2.5 software. Control is transferred to that software from step 442 and as may best be seen in FIG. 25, in a step 450 the software is run. In a step 452, the software recognition device is created and initialized. The form files are read in a step 454, which form files include the positions where the courtesy amount recognition and where the signatures are likely stored in the fields within the document. In a step 456 the scanned image file is read and in a step 458 the neural network contained within the Quickstrokes software recognizes the characters written in the signature line as well as the characters written in the courtesy amount recognition space and in the amount recognition line. The recognized characters are then evaluated from the standpoint of a present confidence level in a step 460, and character strings representative of those characters are returned to the software set forth in FIG. 14 for further evaluation. Referring now to FIG. 14 in a step 470, the strings representing the signature verification as well as the amount on the document are forwarded to the bank network by the modem 29 for confirmation for payout. If there is no confirmation control is transferred to a step 472 causing the document to be ejected from the document slot and in a step 424 a document rejection message is displayed. In a step 476 the current transaction is denied. In the event that the documents are confirmed in a step 470, the check or money order is stacked in an accepted documents bin in a step 478 and confirmation on the current transaction is sent to the banking network in a step 480.

Figure 4:
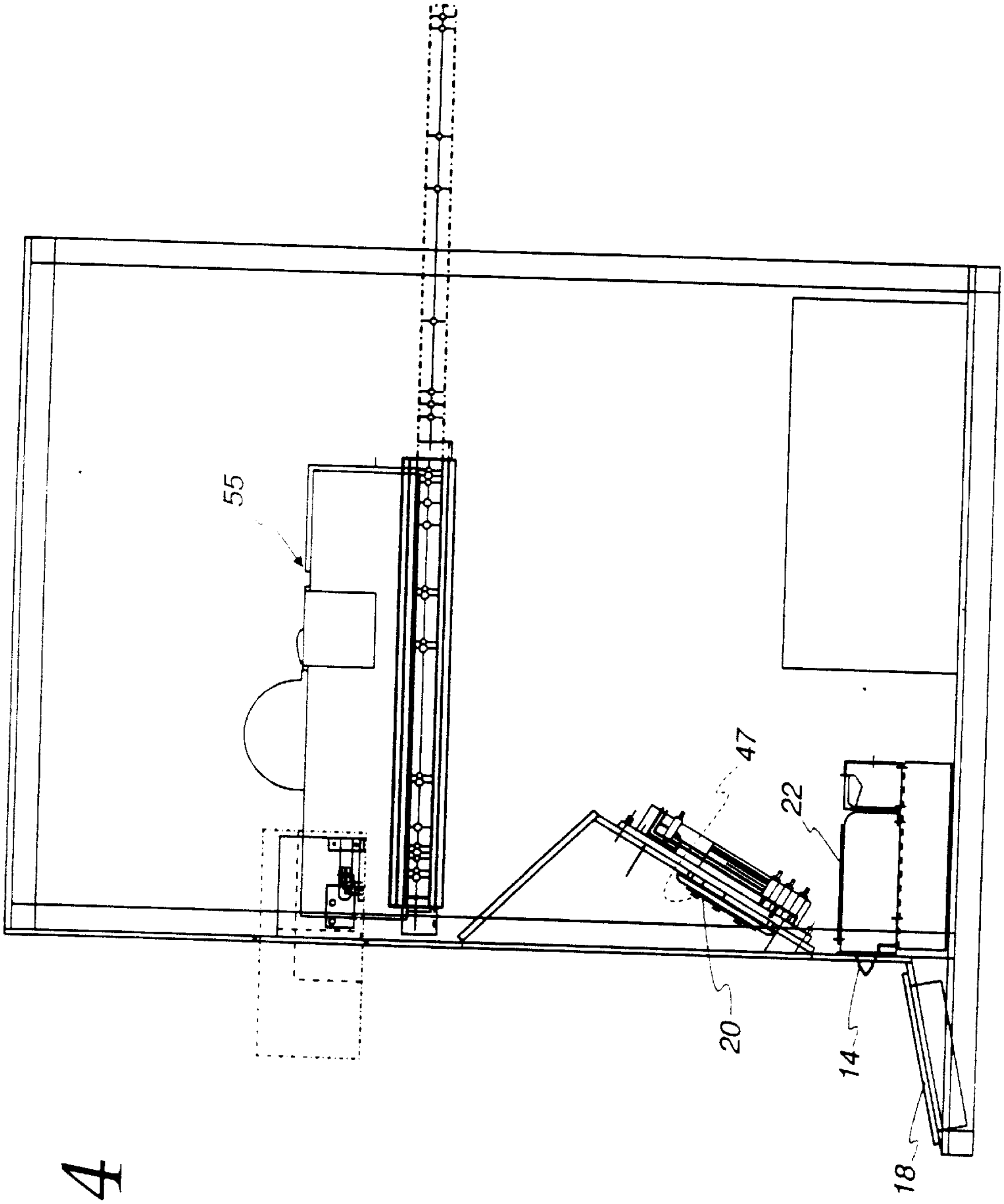
FIG. 4 is a right side view of the central section of the apparatus of FIG. 1.

If the images are not stored, the check is carried around the U-shaped feed path 61 back to an eject slot 61*a* in the housing wall 14 for retrieval by the user. The eject slot 61*a* is parallel with and to the left of the insert slot 54. Assuming that the check has been re-inserted correctly and images of both the front and back have been captured, then the check is sent to an escrow or holding area 64 in the check feed track. The holding area 64 communicates through the serial communication device 21*a* with the computer 21, as shown in FIG. 24. As best seen in FIG. 4 at the escrow area 64, the check is held for either depositing into a store bin 66 if the check has been qualified and accepted, or the check depositing transaction, the check will be fed from the escrow area back to the eject slot 61*a* for removal by the user if failure to verify the signature causes the check to be rejected for deposit. Assuming that the banking network has been connected by the modem 29 to other portions of the apparatus 10 and that the check has been verified, the amount deposited is sent over the banking network to the identified bank and identified account of the user for deposit. The receipt printer 50 is then operated to provide a written receipt to the user showing the amount deposited minus the transaction charge of $1.00.

Figure 2A:
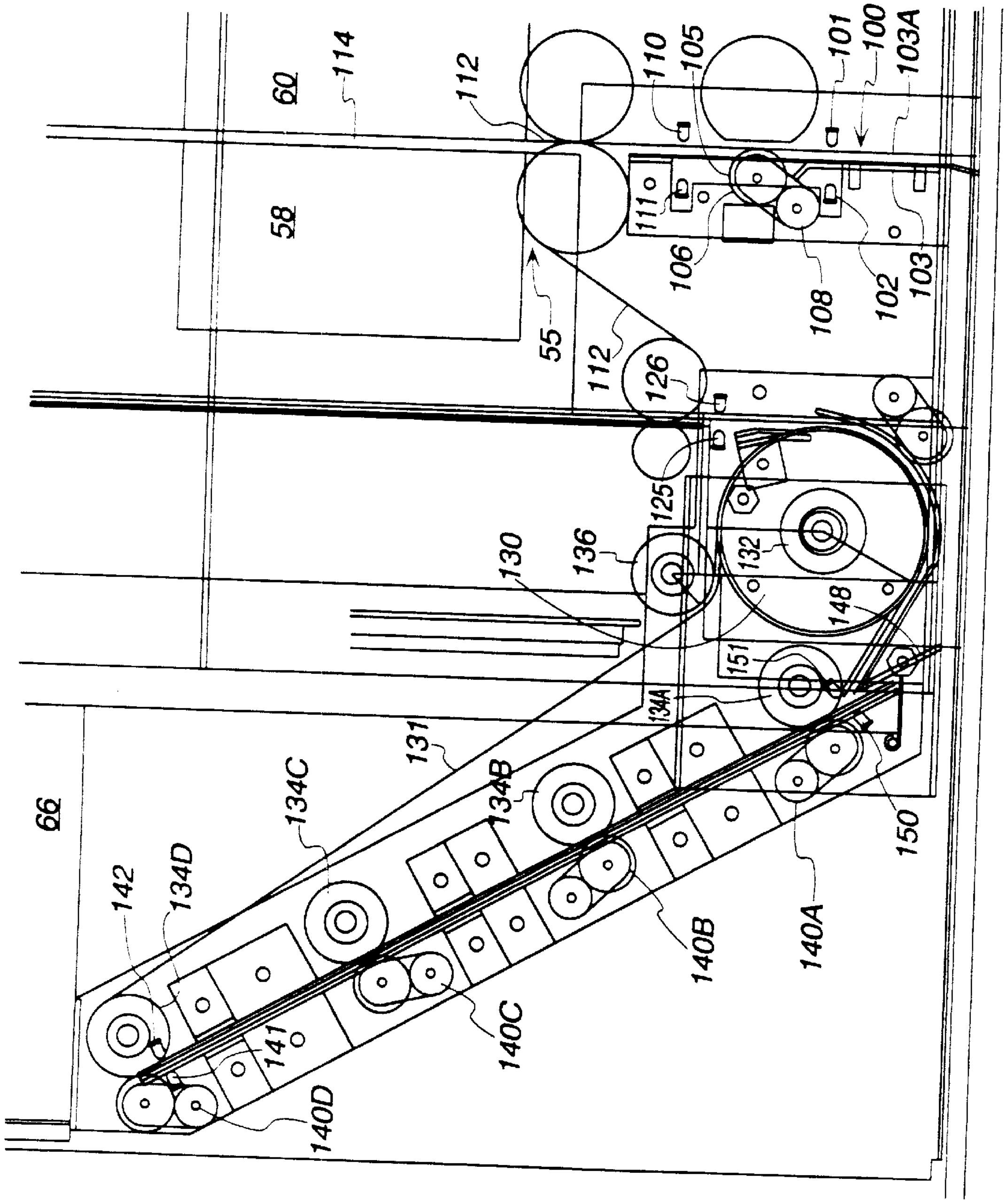
FIGS. 2A and 2B are views of an imaging station for scanning a document.
Figure 2B:
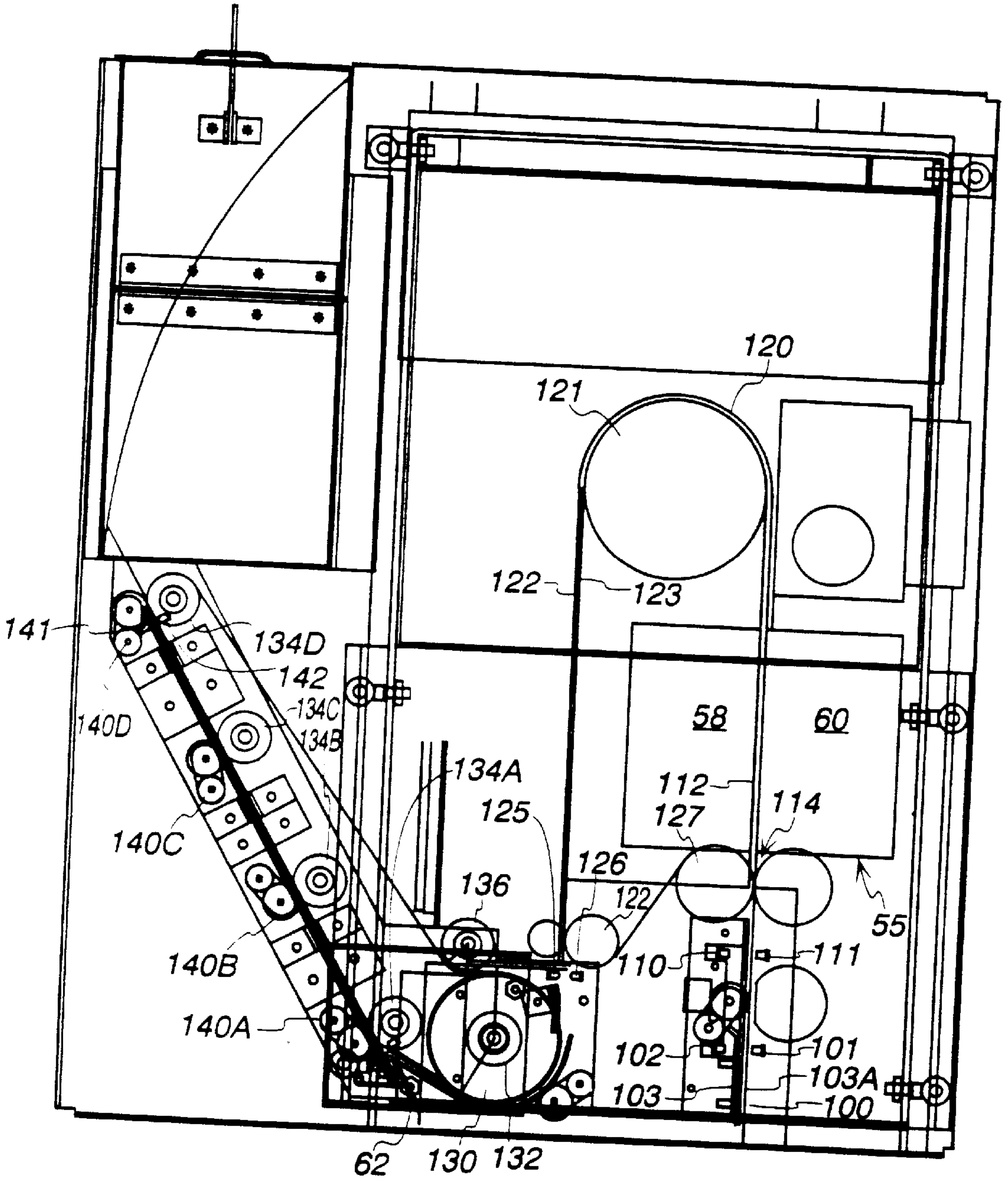

Referring now to FIGS. 2A and 2B, the document handling of a money order or a check will now be described in greater detail. The check is inserted vertically through the scanner slot 54 and passes in front of a pair of first infrared sensors 101 and 102, which sense that the check has been inserted. These sensors are on opposite sides of a guide or feed track 100 which includes a pair of spaced parallel plates 103 and 103*a* extending inwardly to the imaging station 55. Immediately beyond the infrared sensors 101 and 102, which detect the insertion of the document, is a pressure roller 105 to push the check against the plate 103. The check is pushed forwardly past a set of infrared sensors 110 and 112, which will detect when the check is fully inserted into the scanner slot and is gripped by a feeding belt 112 that runs through an entry slot 114 between the image scanners 58 and 60 at the imaging station 54. The feeding belt 112 extends through imaging station to a large diameter roller 121 (FIG. 2B). The check pauses in its travel at the imaging station 54, where the image taking video or other scanners 58 and 60 take images of the front and back of the check. Optical character recognition readers read the magnetic ink recognition characters for the bank and for the customer's account. Electronic signals from the image takers 58 and 60 provide information concerning the signature for the check, the legal line and the amount written thereon, and the CAR line and the amount written thereon, all of which are stored magnetically, in this instance, and provided with tag number for later recapture.

As best seen in FIG. 2B, a U-shaped track 120 is provided around the large diameter roller 121 to guide the check to reverse its direction of travel and to move into a slot between plates 122 and 123 of the check guide track 100 to a pair of inlet infrared sensors 125 and 126, which sense the check coming into the inlet of the escrow area 64. The feeding belt 112 is a cogged timing belt which carries the checks about the drum 121 and between the plates 122 and 123 to the inlet to the escrow area. The cogged feeding belt is driven by a stepper motor and travels about guide rollers 127.

At the escrow or holding area 64, there is provided a large belt driving drum 130 which drives a cogged feeding belt 131 for conveying the check first upwardly and to the left into the holding area and from the latter into the deposit bin 66 above the holding area 64. If the check is to be rejected, the feeding belt 131 reverses its direction of travel to eject the check through the eject slot 62. The driving roller 130 includes a stepper motor 132, which is mounted on the top of the roller 130. The stepper motor 132 is reversible in its rotation for rotating a drum 130 and the feeding belt 131 in opposite directions and through a controlled distance.

Infrared sensors 125 and 126 sense the passage of the check from the imaging station 55 into the escrow area 64. The feeding belt 131 is guided along and travels past a series of guide rollers 134*a*, 134*b*, 134*c* and 134*d* to the top of the holding area. The endless timing belt 131 turns about the top guide roller 134*d* and travels downwardly and to the right past a roller 136 to return to a side of the drum 130, as seen in FIG. 2A.

The check is pushed against the timing belt 131 to travel with the timing belt by four sets of pressure rollers 140*a*, 140*b*, 140*c* and 140*d*. At the top of the holding area is another pair of infrared sensors 141 and 142, which sense the arrival of the upper edge of the check and they signal that the check has been moved completely into the holding area with the lower end of the check being at or above the rollers 140*a* and 134*a* at the bottom of the holding area and aligned with the eject slot 62. Once the check has been accepted, the stepper motor 132 is turned to drive the drum 130 and the feeding belt 131 to cause the check to travel upwardly into the overhead deposit bin 66. On the other hand if the check is rejected as being unacceptable, the feeding belt travels in the opposite downward direction to push the lower edge of the check through the eject slot 62 and return it to the user. A lower end of the guide plate and a spring guide finger 147 guide the outgoing ejected check to slide and travel along a short guide plate 148 to the aligned eject slot 62. Infrared sensors 150 and 151 (FIG. 2A) at the bottom of the holding track sense when the check has been removed from the eject slot by the machine user.

During the deposit transaction, the screen display 20 will show a confirming message, such as shown in FIG. 13D, in the form of a bar that progresses from left to right in window 69 being viewed by the user. As the receipt is generated by receipt printer 50, the screen display 20 (FIG. 13E) will show that $674.52 "WILL BE DEPOSITED INTO YOUR ACCOUNT. PLEASE TAKE THE RECEIPT WITH YOU."

If, rather than depositing the check into a checking account, the user had selected deposit into a savings account, the screen will display the deposit into savings account shown in FIG. 13F. Then, the user would press the arrow key 26*b* for the "CHECK"; and the check would have been deposited the same as described above with respect to deposit into the checking. A cash receipt would have been provided to the user, as was the cash receipt generated for the deposit into the checking account.

Figure 13G:
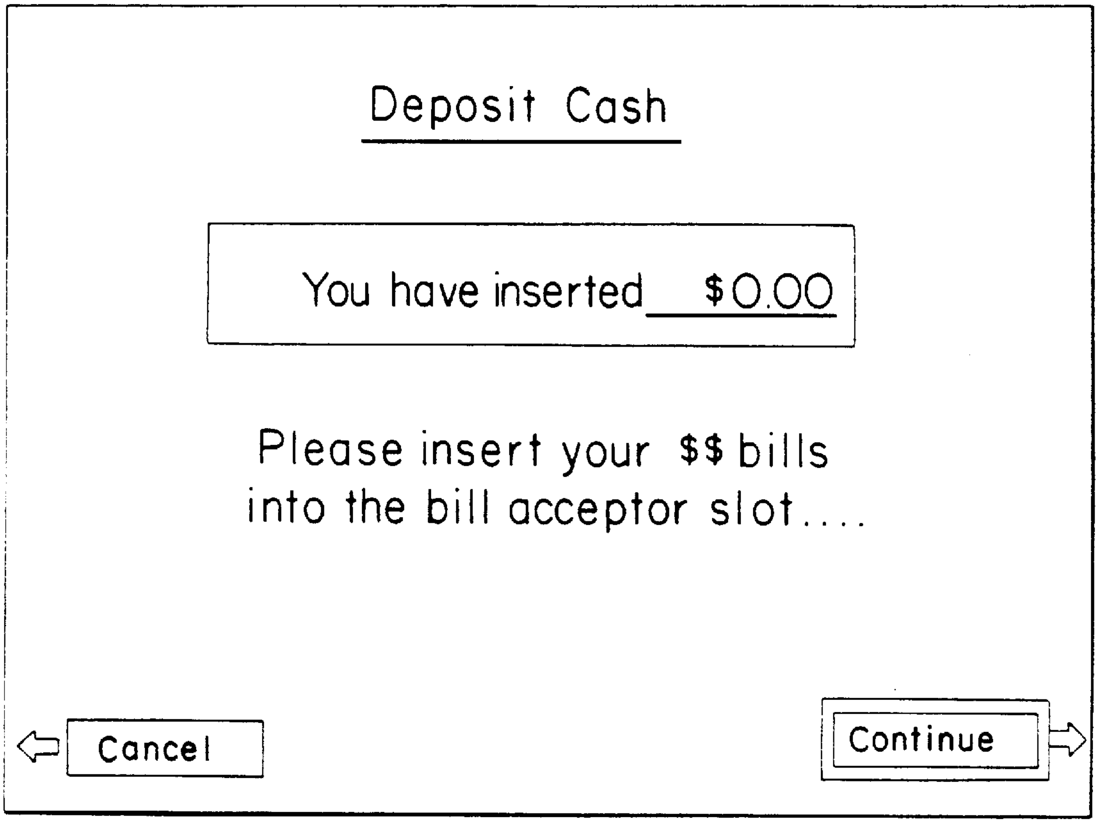
FIG. 13G is a screen requesting the amount of cash to be deposited.
Figure 13H:
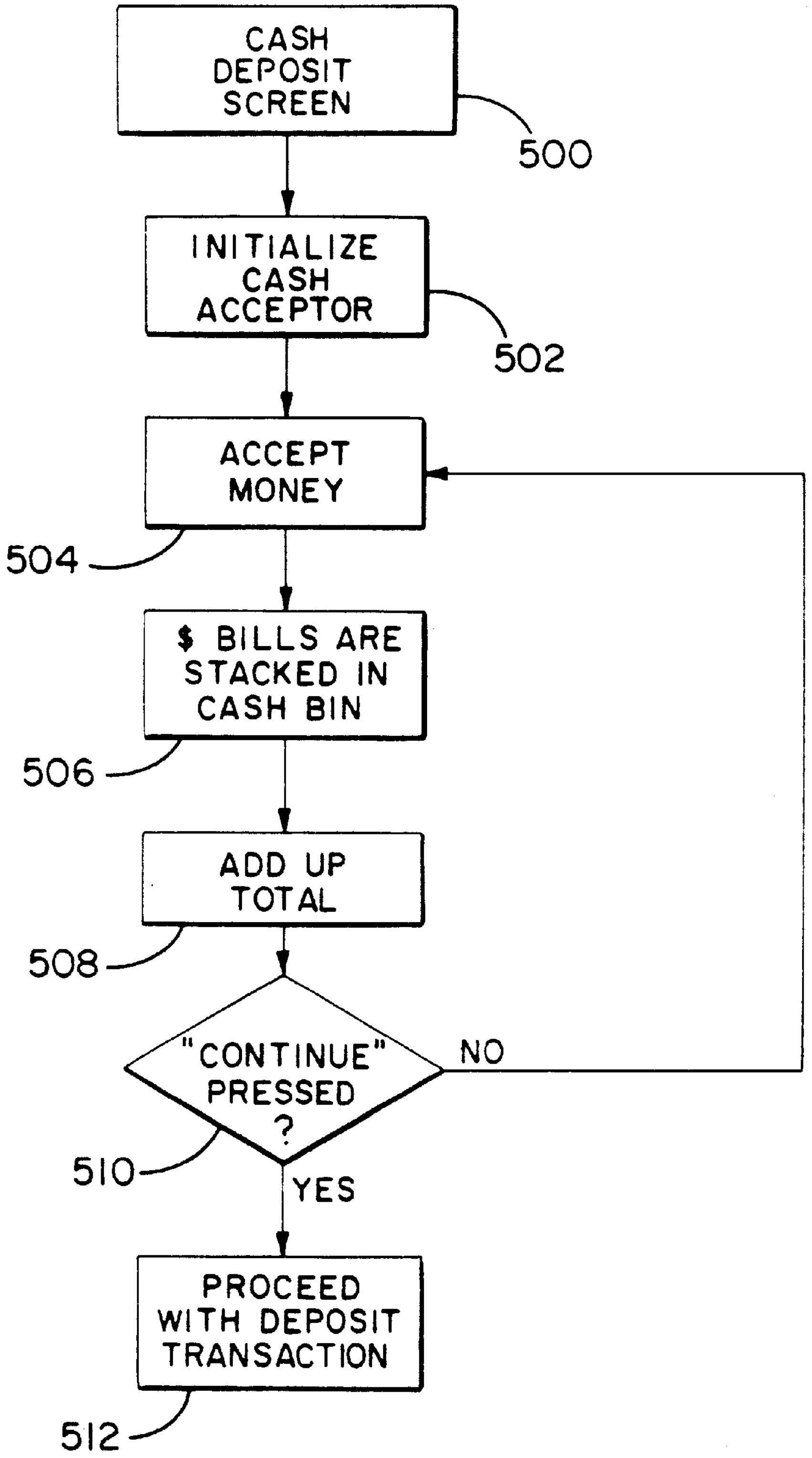
FIG. 13H is a flow chart showing machine operations with respect to a cash deposit.

Assuming that the user had decided to deposit cash into checking and had pushed the #1 cash button 26*a*of the keypad for the display screen of FIG. 13A or had pressed the same button for a cash deposit into savings (FIG. 13F), the processor would follow the steps of the cash deposit flow chart shown in FIG. 13H.

In the cash deposit process 500 as set forth in FIG. 13H the cash acceptor is initialized in a step 502. Money is inserted in the cash acceptor in a step 504 and is accepted thereby. The bills are read and are transferred to a cash bin in a step 506 and the total of the bills presented in added up in a step 508. If the user elects to deposit more bills in the cash deposit in a step 510 control is transferred back to step 504. If not, control is transferred to a step 512 where the deposit transaction is proceeded with.

The user display 20 as shown in FIG. 13G for deposit cash would display the prompt "PLEASE INSERT YOUR BILLS INTO THE ACCEPTOR SLOT 60, WHICH IS SHOWN IN THE RIGHTHAND SECTION ABOVE THE CASH DISPENSER." As may best be seen in FIG. 5, the cash dispenser accepting slot 60 leads into a cash acceptor module 62, which accepts cash, specifically bills in denominations of $1.00, $5.00, $10.00 or $20.00. As shown in FIG. 24, the cash acceptor module 62 is connected to the computer 21 via a resistor network 62*a* having a plurality of current limiting resistors. The resistor network is connected to a digital I/O board 62*b*, in this embodiment a National Instruments PC-DIO-96. The digital I/O board 62*b* is coupled to the computer 21. The cash acceptor module 62 counts the deposited bills and has a bin in a hopper 64 to receive the counted bills. The cash acceptor module 62 is pivotally mounted at 66 to be swung to a dotted line position for emptying deposited bills therefrom. The preferred cash acceptor module 62 merely stacks the inserted bills and counts the same. The cash acceptor module 62 is preferably a Mars Electronic International Cash Acceptor Model AL4-L1-U1M, which is one of several available cash acceptors. It will not only stack the bills and retain them in a machine, but will add up the total amount of cash. The cash flow chart shown in FIG. 13H will be described in greater detail hereinafter in connection with the software and overall control of the machine. The deposit transaction proceed from the flow chart of FIG. 13H back to the flow chart of FIG. 13 to proceed through the modem and banking methods to make the deposit into the user's checking or savings account. The machine 10 will operate the receipt printer 50 to print a receipt to be dispensed to the user through the receipt slot 52, showing the amount deposited less the transaction fee, which is illustrated as $1.00 in this instance.

Figure 13K:
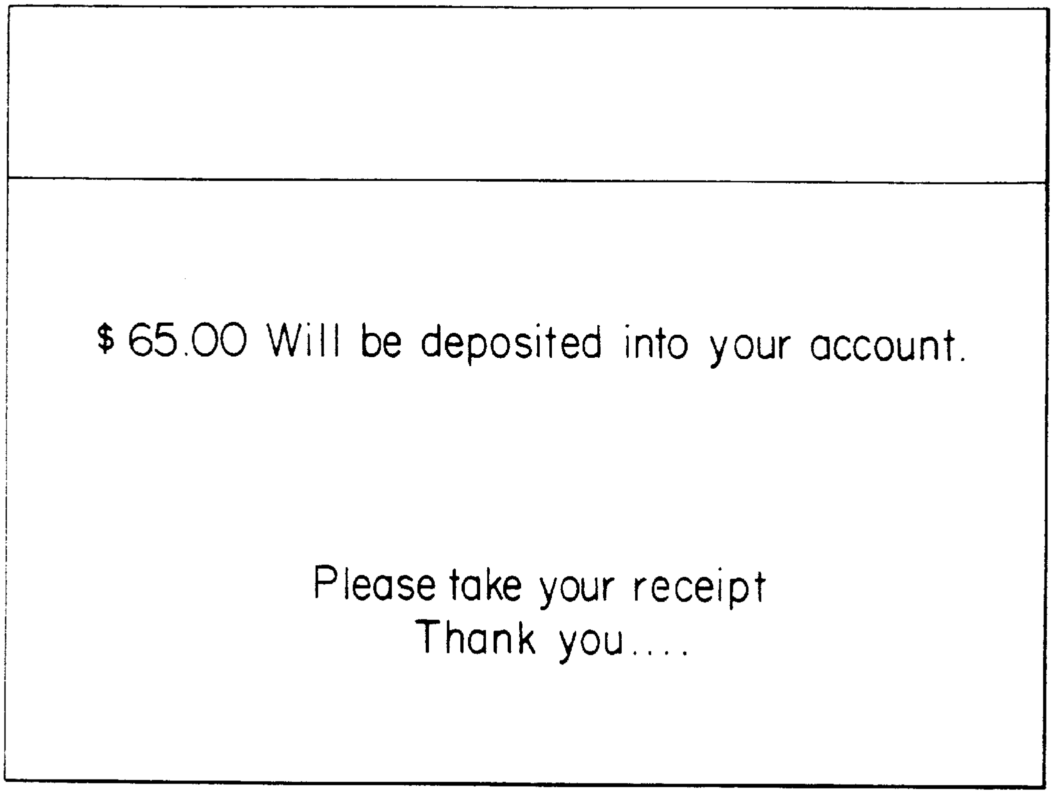
FIG. 13K shows a machine verification of completion of the cash deposit.

When depositing cash, the illustrated cash acceptor 62 will total the cash received and show this cash being deposited, as shown on the screen 20 which shows that the $20.00 has been deposited after $45.00 more dollars have been deposited, making for a total deposit of $65.00, as shown in FIG. 13J. A receipt will then be printed by the receipt printer 50, and the user will be notified that $65.00 will be deposited in the user's account (FIG. 13K).

Figure 16:
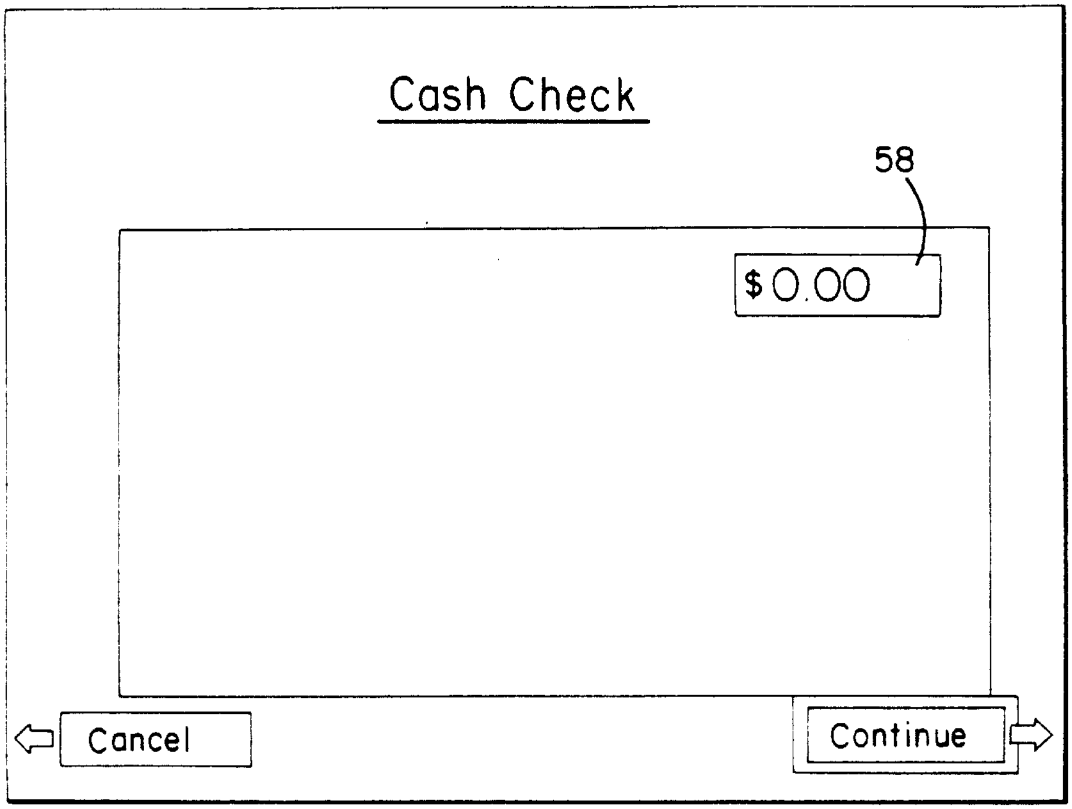
FIG. 16 is a view of the cashing check screen.
Figure 16A:
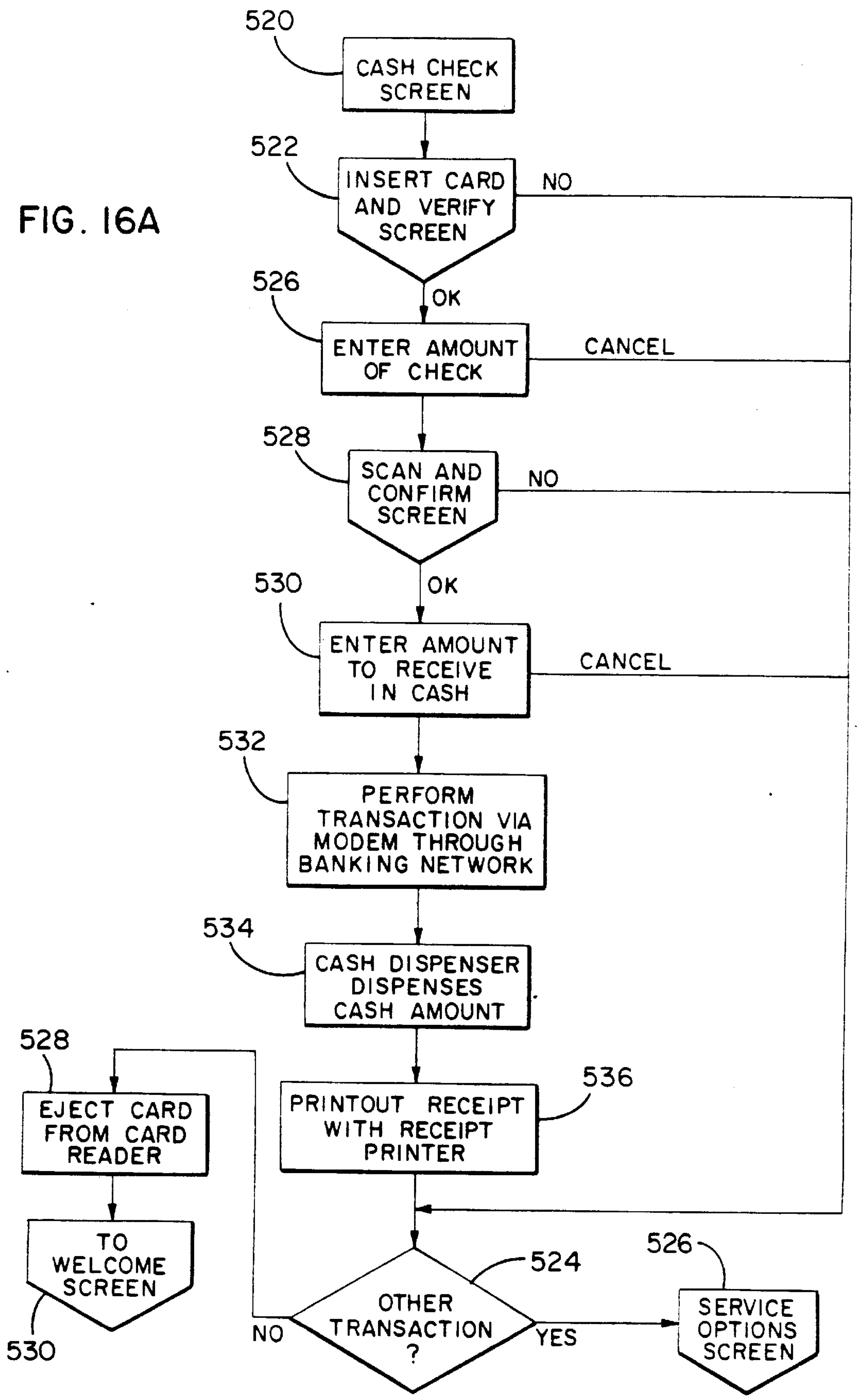
FIG. 16A is a flow chart showing the operations with respect to cashing a check.

Assuming that the user, when prompted by the options screen of FIGS. 3 and 9, has elected to press the arrow key 26*c* to initiate the check cashing transaction, the user display 20 will prompt the user to enter the amount of the check into the window 68 (FIG. 16). The flow chart, with respect to cashing a check, is shown in FIG. 16A.

The cash check process is entered at a point 520 and as a result, the magnetic card reader accepts a magnetic identification card in a step 522 and displays a verify screen. The user can exit the transaction by transferring to a step 524 where he or she is prompted for another transaction. If not, the amount of the check is entered in a step 526 and the check is scanned and confirmed in a step 528 as set forth previously. The user then enters an amount in a step 530 to be received in cash and the banking network is accessed in a step 532 to determine whether the check has a balance from which the check may be cashed. If so, in a step 534 the cash dispenser dispenses cash in the cash amount and in a step 536 the receipt is printed by the receipt printer. Control is then transferred to a step 524 and if another transaction is desired, the service option screen is accessed in a step 526. If another transaction is not wanted, control is transferred to a step 528 causing the card to be ejected from the card reader and in a step 530 the welcome screen is displayed.

The user enters through the keyboard 18 the amount, such as $90.00, shown in FIG. 16B, the amount will be scanned and confirmed, and the service charge of $1.00 is shown on the screen display of FIG. 16. The user may select to continue the transaction or to cancel it by pressing the appropriate button of keypads 26 or 27. The touch screen display shown in FIG. 16H allows the user to make the selection by touching the portions of the display labelled either CONTINUE or CANCEL. If the user has not signed the back of the check, the user will be requested to do so (FIG. 16C). If the check was inserted backwards, as it is viewed by the scanner, the check will be returned through the rejected material outlet slot 62. The user will invert the check and insert it now in the correct vertical position into the insert slot 54. From there the check will be carried into the scanning imaging station where cameras 58 and 60 will capture the images of opposite sides of the check. The processor by executing document verification software will then analyze the signature image and compare it with the profile signature of the user. Likewise, the processor, by using the verification software, will also read the cursive legal amount line and the written numerical amount at the CAR line, as will be described hereinafter in connection with the document verification software in greater detail.

After re-insertion of the check, the user will be requested to re-enter the amount of $90.00 (FIG. 16D). The check image will again be processed and if the amounts match the keyed-in amount the user display will show an "OK" for the amount (FIG. 16D). During the scanning and the verification operations with communication to the user's account, through the banking modem, the screen will display "OCR" with a movable bar, as shown in FIG. 16E. The next prompt shown on this screen will be to enter the portion of the check amount that the user wants to receive in cash. The cash is selected in $5.00 increments. The machine then informs the user any remaining amount of the check will be received in cash (FIG. 16F). With reference to the specific example given herein as shown in FIG. 16F, the user's screen display 20 will show that there has been a $90.00 check scan with a service charge of $1.00, leaving a balance of $89.00. The operator will have used the keyboard to enter the request for $40.00 cash, in $5.00 increments, as shown in window 70. As will be explained in greater detail in connection with check cashing flow chart of FIG. 16A, the cash dispenser 30 will then be operated to dispense $40.00 into the cash bin 56, which the user will then remove. As shown in FIG. 16G, the amount of $40.00 will be deposited in the user's account through the banking network; and the receipt printer 50 will print a receipt for the deposit of $40.00.

Figure 17:
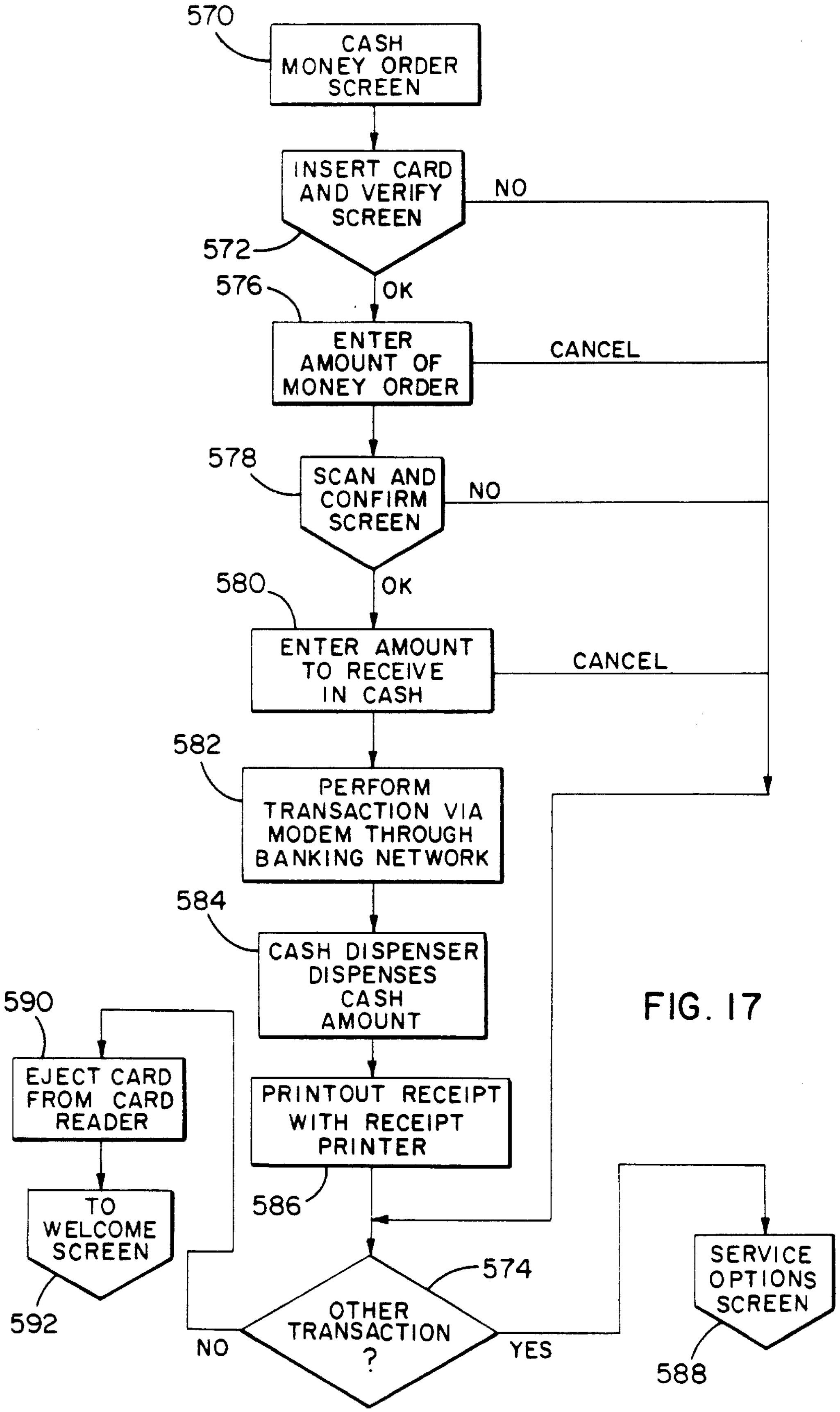
FIG. 17 is a flow chart showing the operations with respect to cashing a money order.

The cashing of the money order is much like cashing a check. It will be described hereinafter in connection with the flow chart shown in FIG. 17, and in connection with the screen of FIG. 17A.

The cash money order process is accessed in a step 570. The magnetic card is prompted to be inserted in a step 522 and a verify screen is raised. If the user decides to exit the transaction, she may so signal and control is transferred to a step 574, testing for whether another transaction is desired. Assuming that the card is verified and that the transaction is to proceed, the amount of the money order to be paid out is entered in a step 576. In a step 578 the money order is inserted and scanned and confirmed, and in a step 580, assuming the confirmation occurs, the user enters the amount for the money order to receive in cash. In a step 580 a query is generated by a modem to the banking network to determine whether the amount of the money order is backed by funds. Assuming that it is, in a step 584 the cash dispenser dispenses the cash amount and a receipt is printed in a step 586. Control is then transferred to the other transaction test step. If another transaction is desired the service option screen is displayed in a step 588. If not, the card reader is ejected in a step 590 and the welcome screen is displayed in a step 592.

Assuming that the user, when viewing the options available (FIG. 9) had pressed the arrow 26*d* opposite "cash money order", to institute this transaction, a prompt is then made of the user, as shown in FIG. 17A, to operate the keyboard 18 to enter the amount of the money order, which, in this instance, is $750.00. The screen will also show the transaction service charge of $1.00 and the available amount of $100.00 in cash.

Figure 17C:
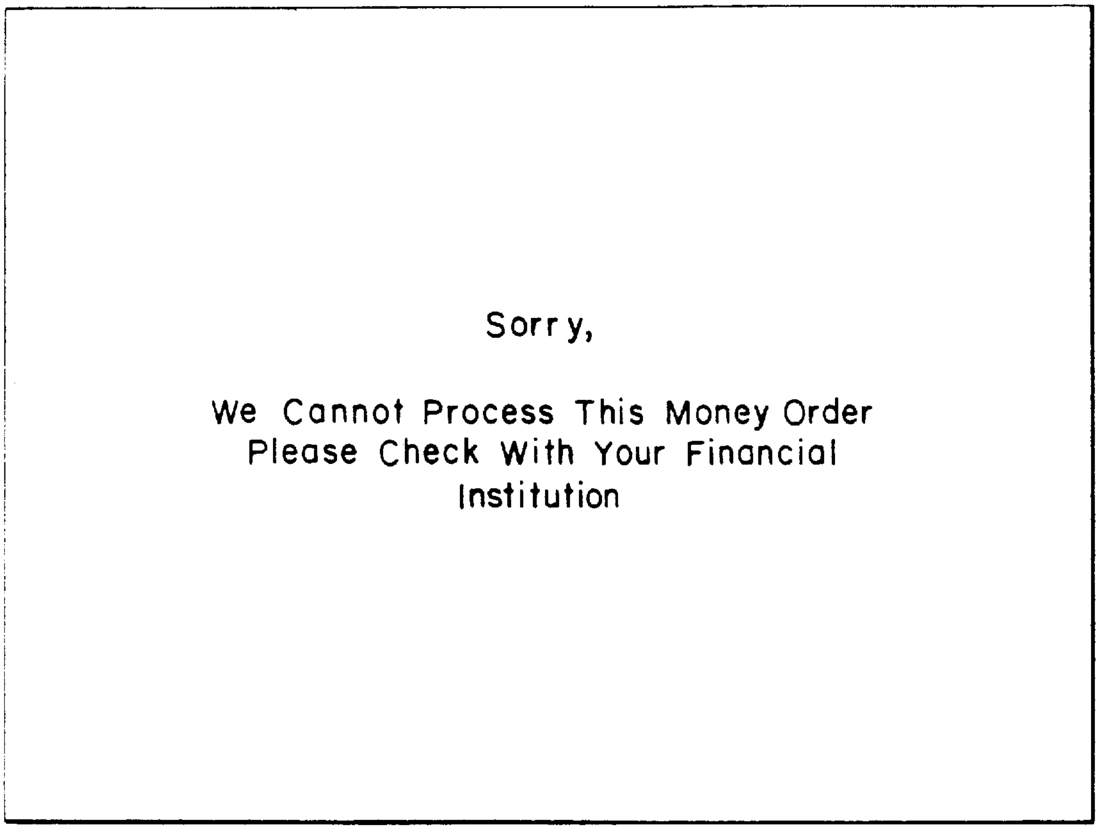
FIG. 17C states that the money order cannot be cashed.

The cash money order screen displays $100.00 in a window 71 and prompts the operator to enter from the keyboard 18 the amount of cash that the user would like to receive in $5.00 increments. In this instance, the user has entered $100.00 into the window 71. In a manner similar to that used for the scanning of the check, the cameras 58 and 60 photograph both sides of the cash money order and locate the indicia showing the amount of the money order and read the amount indicia. The magnetic ink indicia identifying the issuer and the account of the issuer are read; and the signature on the back of the money order is scanned and confirmed. Then a communications network via a modem is connected to the issuer's account, indicating that the authenticity of the money order is being checked. When the machine 10 receives signals that the money order is authentic, the cash dispenser 30 is then operated to transfer $100.00 cash into the cash bin 46 for removal by the user. If the user had not signed the back of the money order, he would have been informed to reinsert the money order, as shown in FIG. 17B. If the money order could not be processed, it would be returned through the reject slot 62. The user display 20 would state that the money order could not be processed and that the user should check with his financial institution, as shown in FIG. 17C.

Figure 18B:
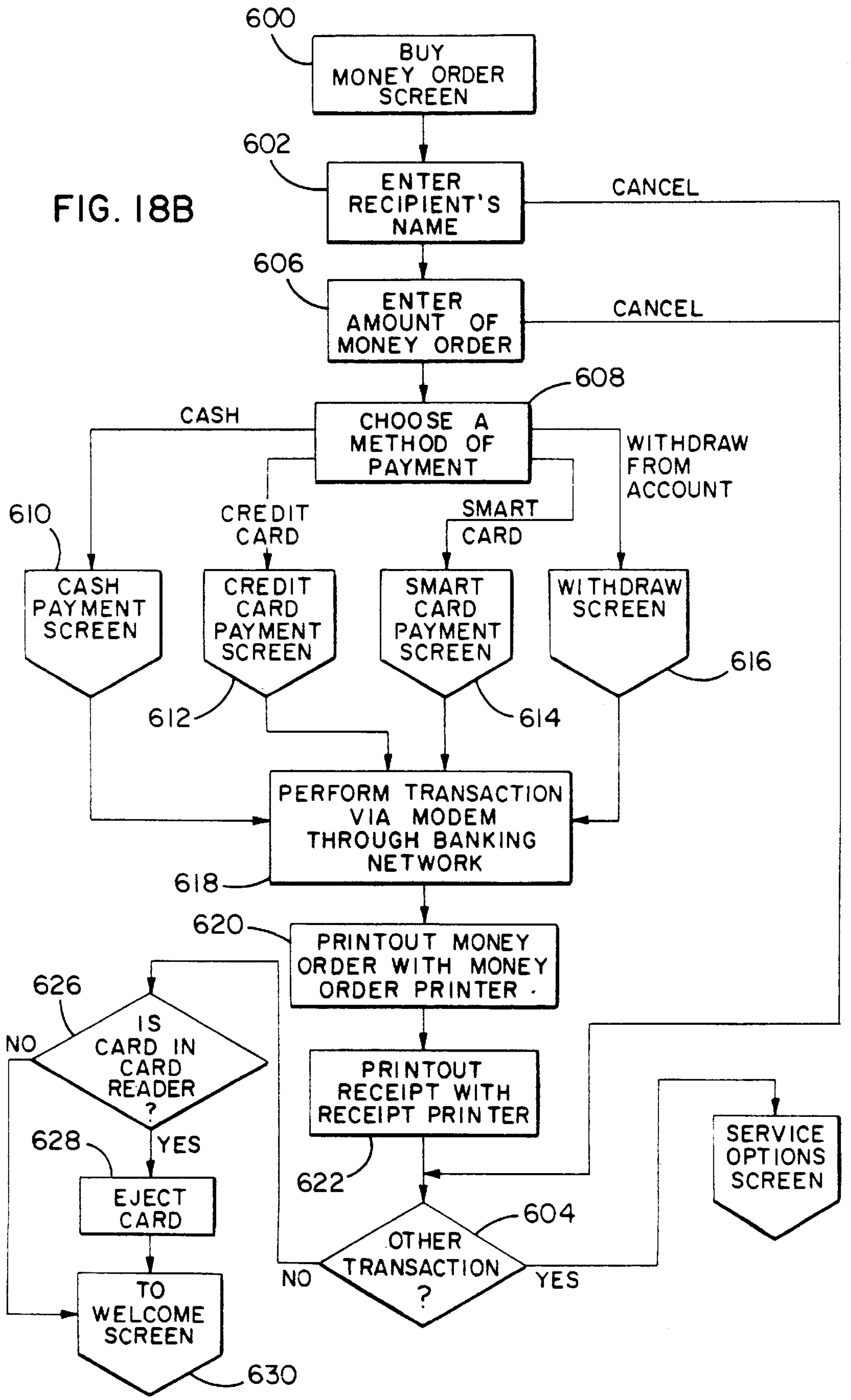
FIG. 18B is a flow chart showing the various operations being performed when buying a money order.

Assuming the user had selected, in FIG. 9, the #5 option of buying a money order by pressing the right hand button 27*a* on the keypad, then the buy money order screens and flow chart would have been operative, as will now be described. The first prompt shown on the purchase money order display 20 (FIG. 18), requests the name of the person to whom the money order is to be paid. In this instance, the name is John Doe, as shown in FIGS. 18 and 18A. Having operated the user keyboard 18 to enter the payee's name, i.e., "John Doe," the operator will next enter the amount of $500.00, as shown in window 72 in FIG. 18A. The service charge of $0.50 is shown so that the total amount needed for the purchase of the money is $500.50. As may best be seen in FIG. 18B, it is preferred to provide the purchaser of the money order with a number of options for payment including by cash, by credit card withdrawal from an account of the user, and by a smart card. Or the user may return to the money order, if he so desires. The flow chart for buying a money order is shown in FIG. 18B.

In a buy money order transaction, the process is entered via step 600 and the money order recipient's name is entered in a step 602 or if cancellation is desired, control is transferred to another transaction test step 604. Assuming that the recipient's name has been entered, the amount of the money order is entered in a step 606 and in a step 608 a method of payment is chosen causing prompts to occur via a cash payment screen 610, a credit card screen 612, a smart card payment screen 614 or a balance withdrawal screen 616. The particular transaction for payment is then processed in a step 618 and the money order is printed out in a step 620. A receipt is printed in a step 622 and the transaction test 604 is then made. If further transactions are to occur, the service option screen is displayed in a step 624. If not, a test is done in a step 626 to determine if the card is in the card reader. If it is, the card is ejected in a step 628 and the welcome screen is displayed in a step 630.

The buy money order transaction will be tagged and through the banking network, the printer 76 (FIG. 1) will print the money order. The money order printer 76 is disposed, in this instance, side-by-side with the receipt printer 50, as is shown in FIGS. 1 and 3 and is connected to the computer 21 through the parallel communication device 51, as shown in FIG. 24. The printed money order is dispensed from a money order dispensing slot 78, which is adjacent to the receipt printing slot 72 in the front housing wall 16 of the apparatus 10. The illustrated money order printer may be similar to the receipt printer 50 and is available from Star Micronics America, Inc., Model MP3342F. It includes an automatic cutter.

As shown in FIG. 18C, the user screen display 20 will then display that $500.50 has been withdrawn from the user's account, and that the money order is being printed. Both a money order and a receipt will be issued from the money order slot 78 and the receipt slot 52, respectively.

Figure 19D:
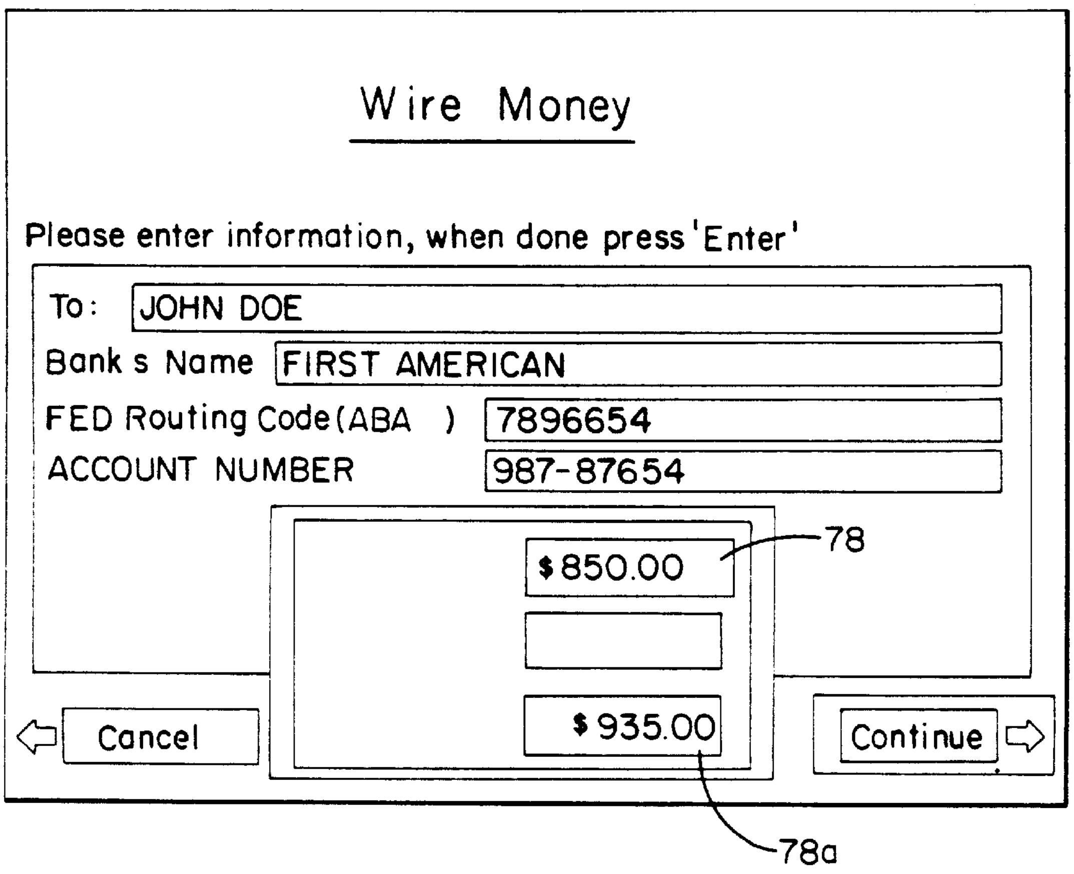
FIG. 19D shows a screen requesting the amount and shows a service charge.

If the user had selected the wire transfer option in FIG. 9 and had depressed the arrow key 27*a* for wire transfer, the screen of FIG. 19 would be displayed on the user's display 20 prompting the user to use the keyboard 18 to enter the name of the person to whom the money is to be wired. Then the screen display 20 would request the name of the bank, as shown in FIG. 19A, which will be entered, such as First American. The next request of the user is shown in FIG. 19B and that is for the Federal routing code or the routing for the bank for the transfer. The routing is to be typed in by the user using the keyboard. The number "7896654" has been typed in as the federal routing code in FIG. 19B. The account number of the receiver is then requested, as shown in FIG.

19C. The account number in this instance is shown as "987-87654" and has been typed in by the user using the keyboard 18.

Figure 19E:
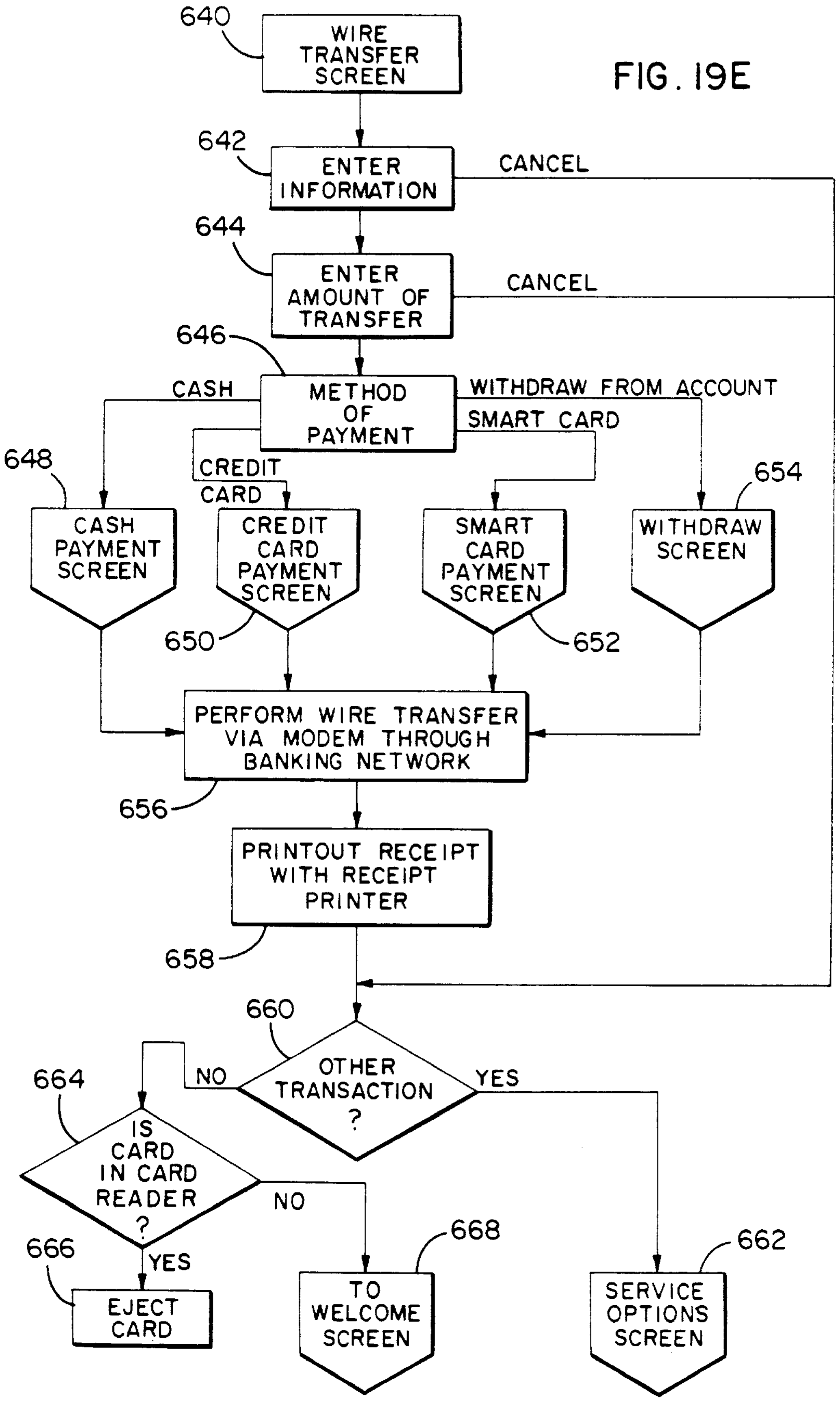
FIG. 19E is a flow chart showing the operations for a wire transfer.

Having entered the information for the wire transfer to a specific account, the screen display 20 requests the amount to be sent, which in this instance, as shown in window 78 is $850.00. A service charge of 10%, or $85.00 of the $850.00 amount charged is shown to the user bringing the transaction total to $935.00, as shown in window 78*a*. The flow chart for a wire transfer of money is shown in FIG. 19E.

The wire transfer process 640 is started with a step 642 for entering information related to the transfer related to the bank the transfer is to be made to as well as the account. In a step 644 the amount to be transferred is entered. In a step 646 the method of paying for the wire transfer is selected, causing control to transfer to a cash payment screen 648, to a credit card screen 650, to a smart card payment screen 652 or to a withdrawal screen 654. Following that, in a step 656 the selected payment transfer occurs and the wire transfer occurs via the modem over the banking network. In a step 658 a receipt is printed and in a step 660 a test is made for whether another transaction is to occur. If it is, a service option screen is displayed in a step 662. If it is not, a test is made in a step 664 to determine if the card is in the reader. If so, the card is ejected in a step 666 and the welcome screen is displayed in a step 668.

Figure 19F:
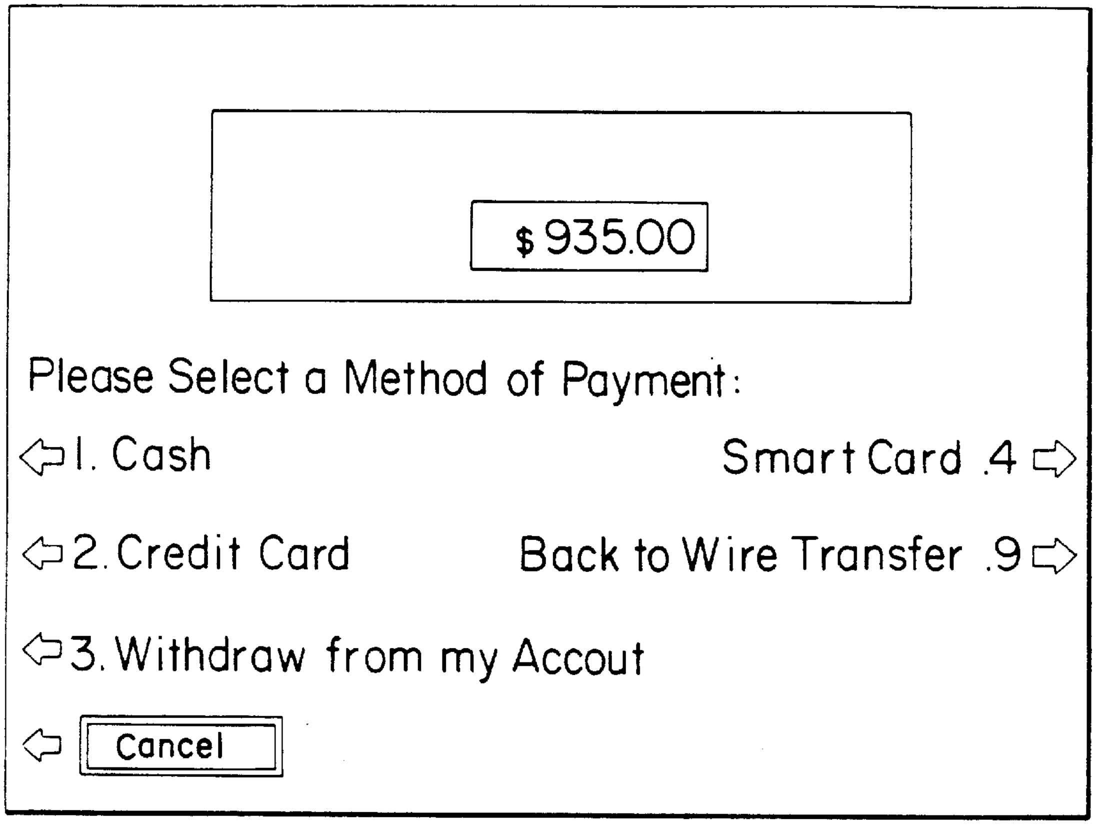
FIG. 19F shows the total of the transaction and requests a selection of the method of payment.

A request for the method, of payment which can be any of four different payment methods, is shown in FIG. 19F. In this instance, the options of cash, credit card, withdrawal from my account, or smart card may be selected by operating the appropriate keypads 26 and 27 along the display 20, shown in FIG. 19F. After selecting the appropriate method of payment, the machine is then connected over the banking network (FIG. 19E) to the bank to deposit $850.00 in John Doe's account no. 987-87654. The printer will cause a printout of the receipt showing a payment and wire transfer to John Doe of $850.00 and a total transaction fee of $935.00, the latter may be charged by credit card, smart card, or withdrawal from my account, as shown in FIG. 19E. On the other hand, the user could have deposited cash of $935.00 to the cash acceptor slot 60, which would then count and hold the cash in the cash acceptor 34. Having finished the transaction, the charge card (if used for payment) would be ejected, as shown in FIG. 19E.

Returning again to the options available as shown in FIG. 9, if the operator had pressed the key 47*c* on the keypad 47 to select the "bill payments" option, then a bill option screen (FIG. 20) would have been shown on the user display 20. The bills which may be paid are listed on the display 20, viz., telephone, electric, gas, cable, water and credit cards. The operator will use one of the keypad buttons on keypads 46 and 47 to select from the screen of FIG. 4 the particular bill to be paid. In the alternative the bill payment selection may be made by touching the appropriately labelled region of the menu display on the touch screen display shown in FIG. 20J. It will be requested on the user display, as shown in FIG. 20A, to enter the amount for the bill selected, such as $129.67 for the telephone bill. Then, the telephone bill may be inserted into the scanning material insert slot 54 where the images of both sides of the bill will be captured. The particular bill payments have to be qualified with the user's account beforehand, and the particular bill has to be recognized so that the amount of the bill and the field of the money can be located as well as the identity of the company—the telephone company, in this instance. The verifier will read the customer's account number, the payee's account number, and the amount of the bill. The position of this data on the bill as well as the script, font, etc. will vary greatly. To aid in reading the bill, a keypad may be provided for operation by the user. Having manually identified for the processor all of the fields on the image of bill, the interpretation of the field image is done in the same manner as analyzing a check or money order. The bill is verified, and if OK, the request is then stated as to the total amount to be paid for the transaction. The user then will receive the request to enter the amount to pay on the telephone bill, as shown in FIG. 20A, which in this instance, is $129.67. The service charge of $0.60 will be also displayed to the user on the user display 20 along with the total, which is shown in the window at the bottom of the screen. For instance, the total charge of $130.27 (FIG. 20A) to pay the particular telephone bill.

When paying a telephone bill the screen will then interrogate the user as to whether she wishes to pay another bill via an inquiry, such as the inquiry shown in FIG. 20C wherein it is desired to pay a gas bill of $45.22. The sum of $45.22 is entered by the user using the keyboard 18. As shown in FIG. 20D, the user is then prompted to load the gas bill into the scanner slot. The gas bill will be read in the same manner as the telephone bill was read by the cameras 58 and 60. The magnetic or the other optical character recognition information on the bill will be analyzed to connect the payment of $45.22 to the appropriate account to the bill paying network. If the user also decides to pay a gas bill, the user will press "continue". Herein, the user decided to pay a credit card bill of $96.82 as shown in FIG. 20E for a third service charge of $0.60, which will bring the of the total service charges to $1.80.

The total amount of the three bills, the telephone bill, the gas bill and the credit card bill plus the service charge will be $273.51.

Figure 20H:
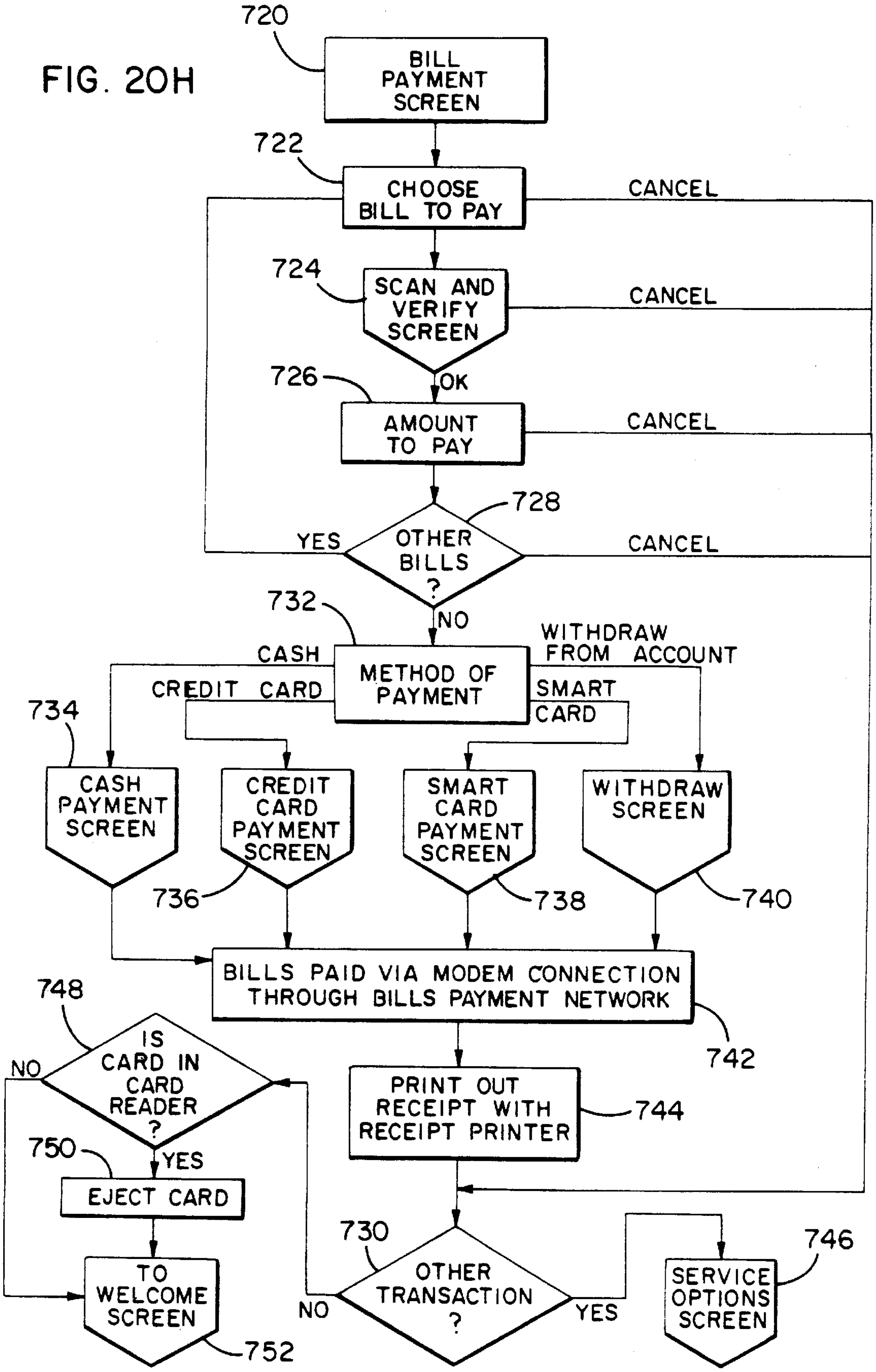
FIG. 20H is a flow chart showing the operations that occur during a bill payment.

Next, the method of payment is requested (FIG. 20F); and if the user elects to pay with credit card, he will press the keypad button 26*b* and cause the screen FIG. 20G to be shown on the user panel 20, requesting that the user insert the credit card bill into the slot. The bill payments have been made over the bills payment network and the bills will have been collected in the receiver bin. This process is set forth as shown in FIG. 20H.

The bill payment process 720 is entered by selecting the type of bill such as telephone bill, electric bill, to be paid in a step 722. The bill is scanned and verified in a step 724 and the amount to be paid is entered manually in a step 726. A test is made in a step 728 to determine whether other bills are to be paid. If so, control is transferred to step 722. If not, control is transferred to a step 730, testing for other transactions. A method of payment inquiry is made in a step 732 and in response thereto, a cash screen is displayed in a step 734 or a credit card payment screen is displayed in a step 736. A smart card payment screen is displayed in a step 738 or a withdrawal screen is displayed in a step 740. After selecting the payment method, the funds are then transferred so that the bill is paid via modem connection in a step 742 and a receipt is printed out in a step 744. If another transaction is desired from step 730, the service option screen is displayed in a step 746. Otherwise, a test is made to determine if the card is in a card reader in a step 748. The card is ejected in a step 750 and the welcome screen is displayed in a step 752.

When finished with the bill payment, the screen display shows that $273.51 has been withdrawn from the account in FIG. 20H with a notation that "your bills are paid". As flow chart for the bill payment shows in FIG. 20H, the receipt is printed by the receipt printer 50 which then ejects the receipt through the slot 52 to the user. The ATM card is then ejected from the card reader back to the user.

Figure 7:
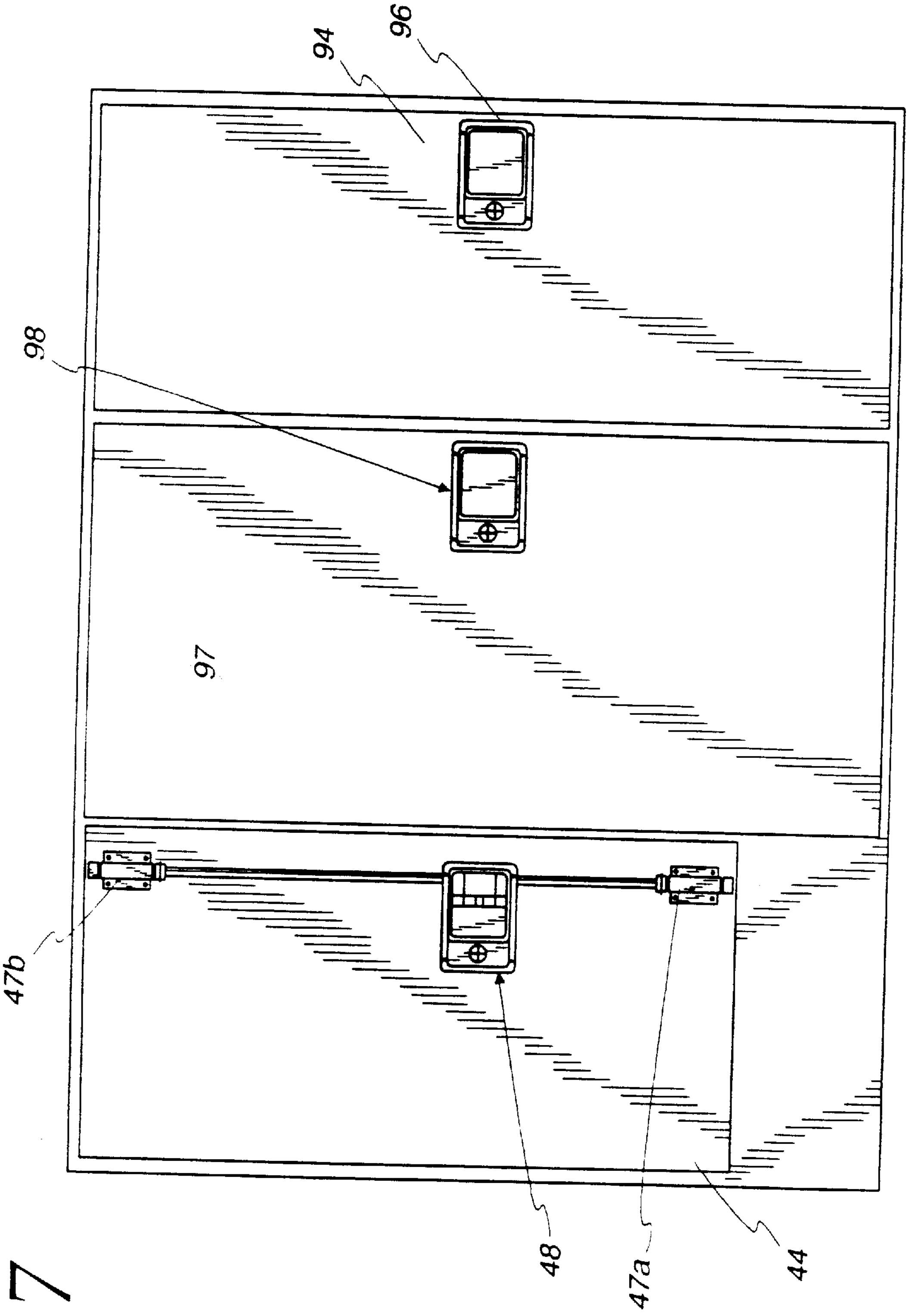
FIG. 7 is a rear view of the machine shown in FIG. 1.
Figure 21:
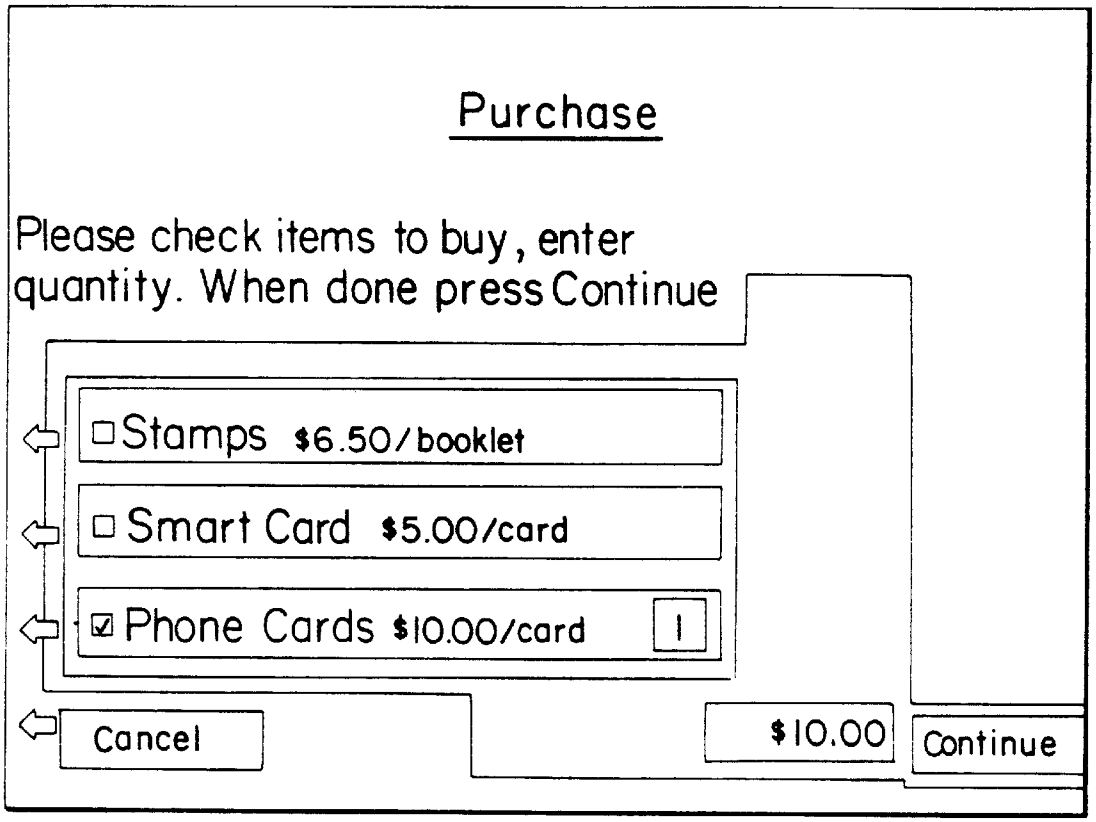
FIG. 21 shows a screen for purchase of items such as stamps, smart cards or telephone cards.

If the user had elected in FIG. 9 to buy lottery tickets, stamps or telephone calling cards, the purchase option would be selected by depressing the keypad button 47*d* to cause the purchase display screen of FIG. 21 to be present on the user display 20, which shows the option of buying stamps at $6.50 a booklet, a smart card at $5.00 a card, or a telephone card at $10.00 a card. Obviously, the number of items to be purchased could be enlarged to include lottery tickets or other end user items, which could be dispensed easily through purchasing goods dispensing slots 84, 85 and 86 shown in FIGS. 1 and 6 below three goods dispenser units comprising a lottery ticket dispenser 87, a stamp dispenser 88, a telephone calling card dispenser 89 and a smart card transaction vendor or handler 89*a*, all connected to the digital I/O board 62*b* via the resistor network 62*a* for communication with the computer 21. The dispenser receiving slots are located in the front wall 16 of the housing 12, and the dispensers for the stamps, telephone cards or smart card are mounted on rails 90, as best seen in FIG. 3. The rails 90 allow for sliding movement so that they can be accessed through a rear service door 94 (FIG. 7). The rear service door 94 has its own security lock 96 for denying unauthorized access to the interior of the housing 12 and to the goods dispensers 87, 88 and 89. A central door 97 having a security lock 98 can be opened to access the central portion of the machine 10 having the checks and the bills 66, the cameras 58 and 60, etc. While a variety of dispensers could be used, the illustrated dispensers are card dispensers which are made by Asahi Seiko USA, Inc., Model CD1000. Manifestly, dispensers may be used other than those card dispensers herein described by way of example.

As shown in FIG. 21, the user may select one or more of the various items to be purchased. A telephone card may be selected by pushing the key 46*c* to select one $10.00 card. By pressing the "continue" button, the user is then provided with a screen display, as shown in FIG. 21B for buying smart cards or stamps. In the alternative the touch screen display shown in FIG. 21I can be used to make the selection by touching the appropriately labelled region of the screen display. In this instance, three smart cards at $5.00 a card have been selected by operating keypad button 46*b* to result in a grand total of $25.00 in purchases. The next screen to be shown on the display 20 prompts the user to select the method of payment for the $25.00 purchase. The user will then operate one of the keypads to select by cash, credit, withdrawal from account or smart card as a payment mode, as shown in FIG. 21C.

Figure 21A:
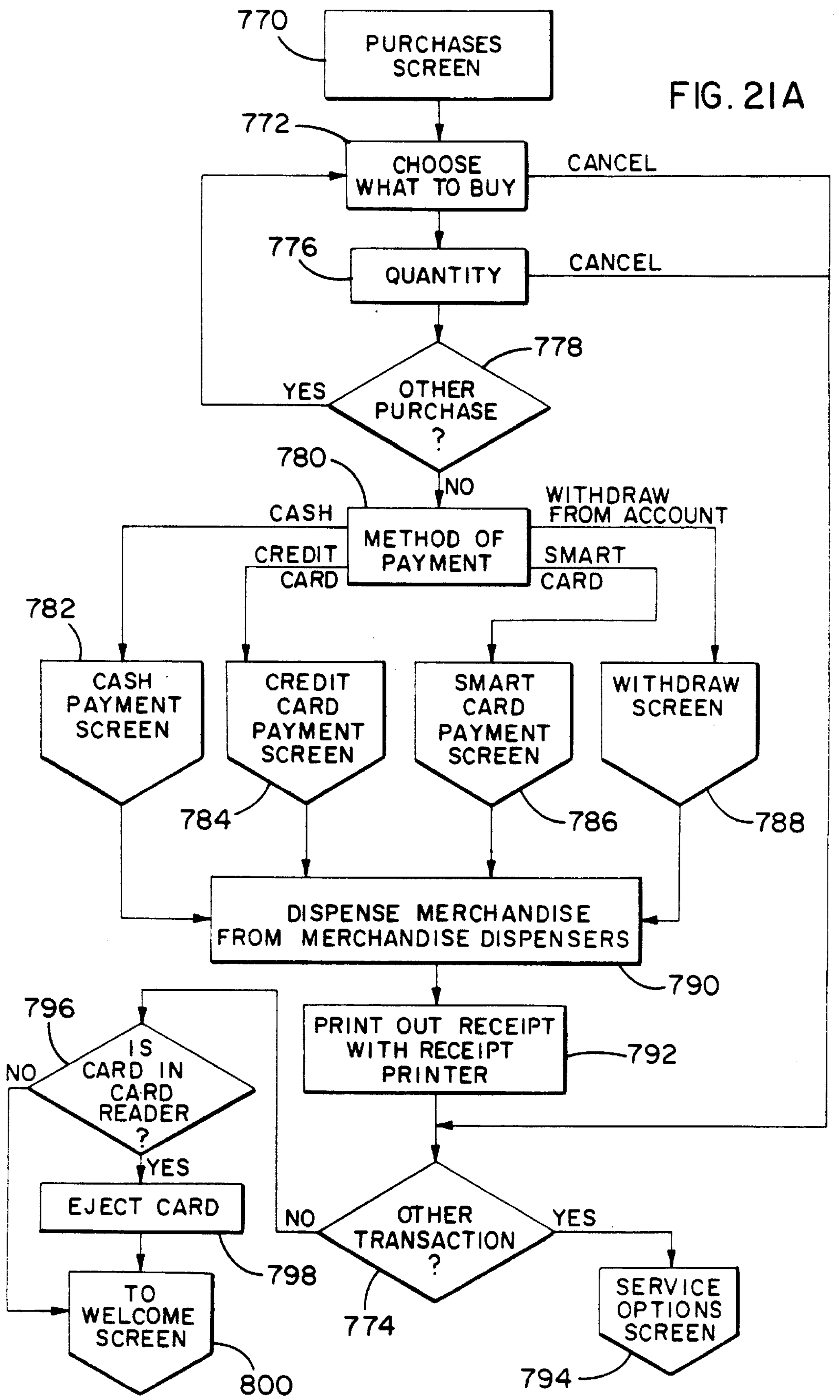
FIG. 21A is a flow chart showing the various operations that occur during the purchasing transaction.

In this instance, the operator has decided to pay with cash and has punched the arrow key 26*a* on the keypad 26. The screen shown in FIG. 21D will then be provided on the display 20 requesting the insertion of the cash into the cash acceptor slot 60. The cash is then verified as counted, FIG. 21E shows that the user has inserted only $20.00, which has been accepted by the cash acceptor 64 and counted. The screen will then show to the user in FIG. 21F that the payment of $21.00 is insufficient for the total transaction of $25.00. If the user only inserts another $3.00, the transaction screen will show that the payment is still $1.00 short, as shown in FIG. 21G wherein the transaction is $25.00. If another dollar bill is inserted into the machine, then the user will see the screen shown in FIG. 21H, which will inform the user to take his merchandise with him. Dispensing of the merchandise occurs as shown in the flow chart of FIG. 21A, and the machine control operates the receipt printer 50 to print a receipt for the user which will be dispensed at the dispensing receipt slot 52.

In order to make a purchase, the purchase process is entered in a step 770. The item to be purchased, such as smart card balance, telephone calling card, stamps or lottery tickets are selected in a step 772, or if desired, the transaction can be cancelled, causing control to be transferred to another transaction test step 774. Assuming that an item is chosen to purchased such as a lottery ticket, the quantity of the item is prompted for in a step 776 and entered, and a test is made in a step 778 as to whether another purchase is to be made. If it is, control is transferred back to step 772. If not, in a step 780 the method of payment is selected, causing a cash payment screen to be displayed in a step 782 or a credit card screen to be displayed in a step 784, or a smart card payment screen to be displayed in a step 786 or a withdrawal screen to be displayed in a step 778, following which the funds are accepted and the merchandise, such as the lottery ticket, is dispensed, in a step 790. The receipt is printed in the step 792 and another transaction is tested for in step 774. If another transaction is desired, the service options display screen is displayed in step 794. If it is not, a test is made to determine if the card is in the card reader in a step 796. The card is ejected in step 798 and the welcome screen is displayed in step 800.

Figure 22:
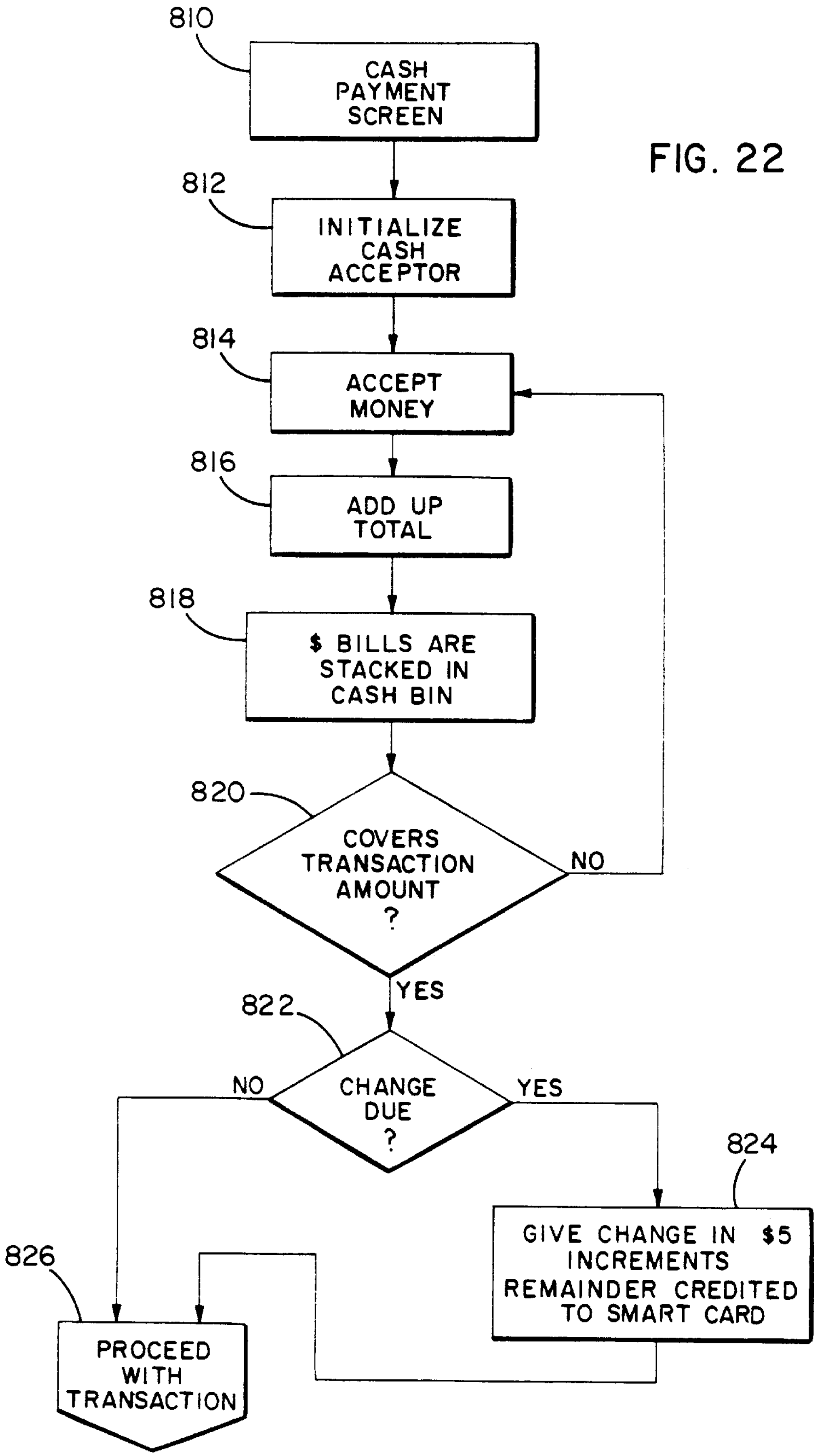
FIG. 22 is a flow chart showing the various operations with respect to cash payment.

As above described herein, it is preferred not to have any coins or coin changers in the machine; and to provide $5.00 bills as the lowest denomination bills that will be paid out in change. Usually, the cash payment process will follow the flow chart shown in FIG. 22.

In order to effect a cash payment for one of the transactions such as the purchase of lottery tickets, transfer of a balance into the smart card or into a checking account or the like, the process is entered in a step 810 and the cash acceptor is initialized in a step 812. The currency is accepted in a step 814 and is totaled in a step 816. The accepted bills are stacked in the holding area in step 818 and a test is made to determine whether the total covers the transaction amount in a step 820. If it does not, more money is accepted in a step 814. If the transaction is covered a step is made in a step 822 to determine if change is due. If change is due, it is given in $5.00 increments with the remainder credited to the smart card in a step 824 and the transaction proceeds in a step 826.

Figure 23:
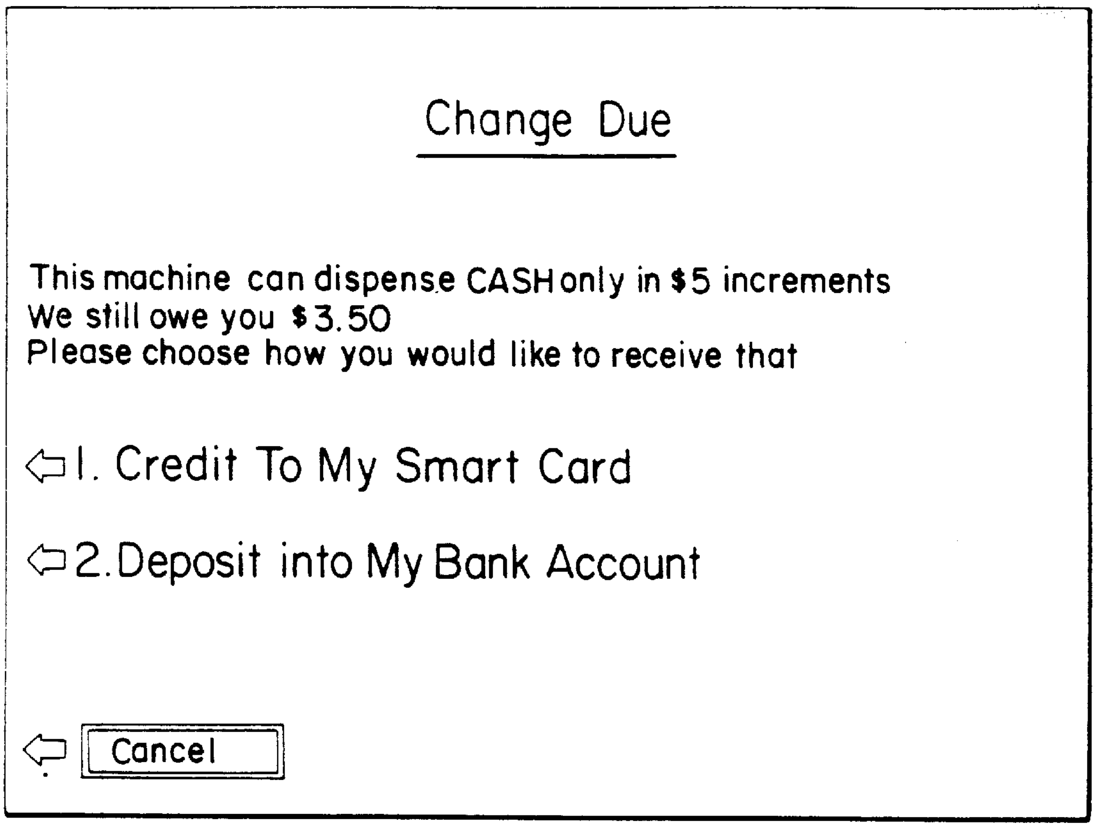
FIG. 23 shows the payment of change either by credit to a card or by a deposit into a bank account.

The $5.00 and $20.00 dollar bills available for change are stacked in the four cash bins. If the payment calculation shows that cash tendered covers the transaction, and that change is due, the change will be in cash in $5.00 increments by operation of the cash dispenser. Alternatively, any remaining change of less than $5.00 will be credited to a smart card or to a bank account to avoid the necessity of storing and handling small denomination bills and coins. The option will be exercised by the user with respect to change as shown on the screen display (FIG. 23). The user can insert a smart card into the card slot 14, and the smart card writer 89*a* (FIG. 1) will write the change by increasing the balance on the smart card, and then return the smart card to the user. If the user wants to deposit the change into his account, the user will operate arrow key 26*b* to cause the deposit transaction to occur over the banking network.

It will be appreciated that although various aspects of the invention have been described with respect to specific embodiments, alternatives and modifications will be apparent from the present disclosure, which are within the spirit and scope of the present invention as set forth in the following claims.

What is claimed is:

1. An automated banking system for receiving payment from an authorized user and for wire transfer of funds to an authorized transferee's account at a bank in a banking network, said system comprising:

an automated machine having a card receiver for receiving a card which identifies the user as being authorized to use the card banking network;

an input device to enter the amount to be transferred to an authorized transferee including an input system to enter the routing information of a bank in which the authorized transferee has an account and the transferee's account in the transferee's bank;

a selective payment acceptor for accepting payment at the automated machine or a charge to the account of the user by the authorized user for the wire transfer;

a verifier to verify that the authorized transferee has the identified account in the banking network for receiving the wire transfer;

a communication system in the banking network operable after receiving a verification from said verifier for wire transfer directly through the banking network to the verified transferee's account in the identified bank; and a second automated machine remote from the first machine operable only after the authorized recipient inserts a card into the second automated machine to identify the second user as an authorized user, and operable by the authorized user to obtain partial or full payment from the wire transfer to the user's authorized account in the banking system.

2. An automated banking system in accordance with claim 1 wherein the payment acceptor comprises a cash receiver for receiving and totalling the cash received.

3. An automated banking system in accordance with claim 1 wherein the payment acceptor comprises:

a card receiver for receiving a card for payment for the wire transfer; and means for reading the card and for causing a debit on the card related to the cash being transferred by wire.

4. An automated banking system in accordance with claim 3 wherein the payment acceptor comprises a credit card reader which reads the credit card and performs a charge transaction over a credit card network for an amount related to the cash being wired.

5. An automated banking system in accordance with claim 1 wherein:

payment is made with a smart card; and a smart card reader and debit system reads the card to ascertain an amount on the card sufficient for payment of the cash being wired, and writes down the smart card by an amount related to the amount of cash being transferred by wire.

6. An automated banking system in accordance with claim 1 wherein:

a printer prints a receipt for the sender of the wire transfer identifying the account receiving the wire transfer; and a transactional record system makes and keeps a record of the wire transfer.

7. A banking system in accordance with claim 6 wherein the input device operable by the sender causes connection to the sender's withdrawal account to withdraw therefrom an amount sufficient to pay the wire transfer.

8. A banking system in accordance with claim 1 wherein a display displays to the user a method of payment from among cash, credit card, smart card or account withdrawal; and a selector is operable by the user to select one of the methods of payment for the wire transfer.

9. A method of providing wire transfer directly of funds from an authorized user of an automated banking machine system to an authorized transferee's bank account in a bank within the banking network, comprising:

providing an automated machine having a card receiver for receiving a card which identifies the transferor user as being authorized to use the machine and banking network;

providing the user with the transferee's account and bank numbers;

inputting into the machine routing information for the transferee's bank to which the transfer is to be made and inputting into the machine the account number of the authorized transferee;

entering the amount to be wire transferred to the authorized transferee;

selecting at the machine a method of payment including paying at the automated machine or paying from the authorized user's account for the wire transfer to the authorized transferee's account and the transferee's bank;

communicating through the bank system the wire transfer through the banking network to the authorized transferee's account in the receiving bank; and providing the user with a receipt showing the amount of the wire transfer transaction and the account number identifying the account which received the transfer.

10. A method in accordance with claim 9 further comprising:

depositing cash for the wire transfer;

counting the cash received in the machine; and verifying it as being an amount to cover the wire transferred amount and a transaction fee therefor.

11. A method in accordance with claim 9 further comprising:

selecting payment for the wire transfer from a card; and reading the card and causing a debit on the card related to the amount of cash being wired to the transferee.

12. A method in accordance with claim 11 wherein the step of providing a card includes the use of a credit card; and further comprising communicating, over a credit card network, the amount of the the funds being wired and the transactional fee which are to be charged to the user's credit card.

13. A method in accordance with claim 11 wherein the payment is being made with a smart card and further comprising:

reading the smart card to ascertain if the amount available from the card is sufficient for payment of the transaction including the the funds to be wired;

debiting the balance of the smart card with the amount of the transaction for the wire transfer; and returning the smart card to the user.

14. A method in accordance with claim 9 further comprising:

printing a receipt for the amount of the transaction of the wire transfer;

providing the receipt to the user; and recording, internally within the machine, a transaction record of the wire transfer.

15. A method in accordance with claim 9 further comprising:

selecting as a method of payment an account of the user; and connecting via a communication network to withdraw from the user's account, an amount sufficient to pay for the wire transfer transaction.

16. A method in accordance with claim 9 wherein there is provided a display to the user requesting a selection for the method of payment from among the options of paying with cash, the user's credit card, a smart card, or withdrawal from the user's account; and selecting the user one of the methods of payment for the wire transfer.

17. A method in accordance with claim 9 including the user inputting a routing code for routing the wire transfer of funds to the transferee's bank.

18. A method in accordance with claim 9 wherein the automated machine is an ATM machine, the ATM machine indicating to the user the amount of the wire transfer and the service fee in connection therewith; and wherein the ATM machine receives cash to pay for the funds being wired and the service fee.

19. A method in accordance with claim 9 further comprising:

providing an ATM machine for the wire transfer;

depositing cash into the ATM machine;

receiving cash from the ATM machine; and depositing checks into the ATM machine.

* * * * *